(12) United States Patent
Hu et al.

(10) Patent No.: US 12,486,314 B2
(45) Date of Patent: Dec. 2, 2025

(54) FUSION POLYPEPTIDES BINDING ANTIBODY Fc DOMAINS AND INTEGRIN AND METHODS OF USE

(71) Applicant: Providence Health & Services—Oregon, Portland, OR (US)

(72) Inventors: Hong-Ming Hu, Portland, OR (US); Jaina Patel, Portland, OR (US); Catherine Dinh, Portland, OR (US)

(73) Assignee: Providence Health & Services—Oregon, Portland, OR (US)

( * ) Notice: Subject to any disclaimer, the term of this patent is extended or adjusted under 35 U.S.C. 154(b) by 925 days.

(21) Appl. No.: 17/762,854

(22) PCT Filed: Sep. 24, 2020

(86) PCT No.: PCT/US2020/052551
§ 371 (c)(1),
(2) Date: Mar. 23, 2022

(87) PCT Pub. No.: WO2021/062033
PCT Pub. Date: Apr. 1, 2021

(65) Prior Publication Data
US 2022/0372110 A1    Nov. 24, 2022

Related U.S. Application Data

(60) Provisional application No. 62/905,083, filed on Sep. 24, 2019.

(51) Int. Cl.
| | | |
|---|---|---|
| C07K 14/78 | (2006.01) | |
| A61K 39/00 | (2006.01) | |
| A61K 39/395 | (2006.01) | |
| A61P 35/00 | (2006.01) | |
| C07K 14/31 | (2006.01) | |
| C07K 16/28 | (2006.01) | |

(52) U.S. Cl.
CPC .......... *C07K 14/78* (2013.01); *A61K 39/3955* (2013.01); *A61P 35/00* (2018.01); *C07K 14/31* (2013.01); *C07K 16/2878* (2013.01); *A61K 2039/505* (2013.01); *A61K 2039/54* (2013.01); *A61K 2039/545* (2013.01); *C07K 2317/75* (2013.01); *C07K 2319/21* (2013.01); *C07K 2319/33* (2013.01); *C07K 2319/705* (2013.01); *C07K 2319/74* (2013.01)

(58) Field of Classification Search
None
See application file for complete search history.

(56) References Cited

U.S. PATENT DOCUMENTS

| | | |
|---|---|---|
| 2010/0239581 A1 | 9/2010 | Joseloff et al. |
| 2014/0017766 A1 | 1/2014 | Chen et al. |
| 2018/0162927 A1* | 6/2018 | Hawkins ............. G01N 33/569 |

FOREIGN PATENT DOCUMENTS

| | | | |
|---|---|---|---|
| WO | WO-2010097394 A1 * | 9/2010 | ............. C07K 16/22 |
| WO | WO 2016/154530 A1 | 9/2016 | |

OTHER PUBLICATIONS

Martino et al. The 12th-14th type III repeats of fibronectin function as a highly promiscuous growth factor-binding domain. FASEB J. Dec. 2010;24(12):4711-21. doi: 10.1096/fj.09-151282. Epub Jul. 29, 2010. PMID: 20671107. (Year: 2010).*
Marabelle et al. Intratumoral anti-CTLA-4 therapy: enhancing efficacy while avoiding toxicity. Clin Cancer Res. Oct. 1, 2013;19(19):5261-3. doi: 10.1158/1078-0432.CCR-13-1923. (Year: 2013).*
Duffy et al. Vascular Endothelial Growth Factor (VEGF) and Its Role in Non-Endothelial Cells: Autocrine Signalling by VEGF. In: Madame Curie Bioscience Database [Internet]. Austin (TX): Landes Bioscience; 2000-2013. Available from: https://www.ncbi.nlm.nih.gov/books/NBK6482/ (Year: 2013).*
ABCAM, ab237651 Nivolumab ELISA Kit (Opdivo®) product datasheet (online), Version 3a, updated Nov. 2, 2020, retrieved on Dec. 17, 2020, https://www.abcam.com/ps/products/237/ab237651/documenta/Nivolumab-ELISA-Kit-protocol-book-v3a-ab237651%20(website).pdf (16 pages).
Genbank Accession No. X96611, Expression vector pCMVPA3 for protein A fusions, Uetz and Zeller, Apr. 4, 1997 (3 pages).
Genbank Accession No. EAW70540, Fibronectin 1, isoform CRA_k (*Homo sapiens*), Venter et al. Mar. 23, 2015 (3 pages).
Ishihara et al., "Matrix-binding checkpoint immunotherapies enhance antitumor efficacy and reduce adverse events," *Sci. Transl. Med.*, vol. 9, Article eean0401, 2017 (14 pages).
Martino et al., "The 12th-14th type III repeats of fibronectin function as a highly promiscuous growth factor-binding domain," *The FASEB Journal*, vol. 24, No. 12, pp. 4711-4721, 2010.

* cited by examiner

*Primary Examiner* — Daniel E Kolker
*Assistant Examiner* — Julia A Rossi
(74) *Attorney, Agent, or Firm* — Klarquist Sparkman, LLP

(57) ABSTRACT

Fusion polypeptides including at least one Fc binding domain linked to at least one integrin binding domain are provided. In some embodiments, the at least one Fc binding domain is one or more Fc binding domains from Protein A, Protein G, or Protein Z and the at least one integrin binding domain comprises one or more fibronectin type III domains (for example repeats 12-14 of fibronectin type III domains and optionally the connecting segment of fibronectin). Protein complexes including the polypeptide and one or more antibodies are also provided. Methods of using the polypeptide and/or polypeptide:antibody complex are provided, including treating a subject with a tumor, inducing an immune response to a tumor, and/or targeting an antibody to a tumor cell.

14 Claims, 33 Drawing Sheets

Specification includes a Sequence Listing.

FIG. 1

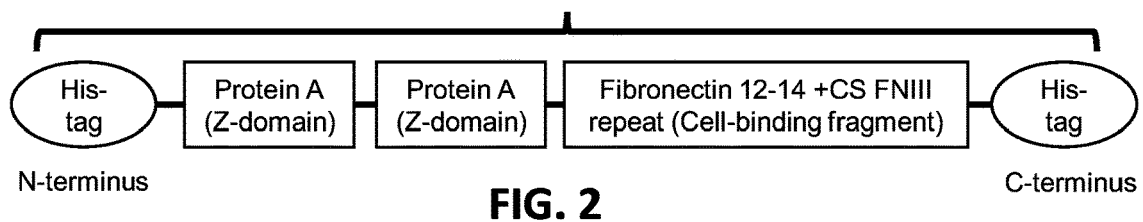

Z-nectin (449 amino acids)

His-tag — Protein A (Z-domain) — Protein A (Z-domain) — Fibronectin 12-14 +CS FNIII repeat (Cell-binding fragment) — His-tag N-terminus          C-terminus

FIG. 2

```
MNHKVHHHHHHMAAAAVTVDNKFNKEQQNAFYEILHLPNLNEEQRNAFIQSLKDD
1         10        20        30        40        50
[His tag]              [Protein A Z domain]

PSQSANLLAEAKKLNDAQAPKVDNKFNKEQQNAFYEILHLPNLNEEQRNAFIQSL
         60        70        80        90       100       110
[Protein A Z domain]              [Protein A Z domain]

KDDPSQSANLLAEAKKLNDAQAPKVDAEFAIPAPTDLKFTQVTPTSLSAQWTPPN
        120       130       140       150       160
[Protein A Z domain]         [Fibronectin 12-14 FNIII repeat]

VQLTGYRVRVTPKEKTGPMKEINLAPDSSSVVVSGLNVATKYEVSVYALKDTLTS
        170       180       190       200       210       220
                [Fibronectin 12-14 FNIII repeat]

RPAQGVVTTLENVSPPRRARVTDATETTITISWRTKTETITGFQVDAVPANGQTP
        230       240       250       260       270
                [Fibronectin 12-14 FNIII repeat]

IQRTIKPDVRSYTITGLQPGTDYKIYLYTLNDNARSSPVVIDASTAIDAPSNLRF
        280       290       300       310       320       330
                [Fibronectin 12-14 FNIII repeat]

LATTPNSLLVSWQPPRARITGYIIKYEKPGSPPREVVPRPRPGVTEATITGLEPG
        340       350       360       370       380
                [Fibronectin 12-14 FNIII repeat]

TEYTIYVIALKNNQKSEPLIGRKKTDELPQLVTLPHPNLHGPEILDVPSTHHHHH
        390       400       410       420       430       440
                [Fibronectin 12-14 FNIII repeat]
                                                  [His C tag]

HGAAEPEA*
        449
[His C tag]
```

FIG. 3
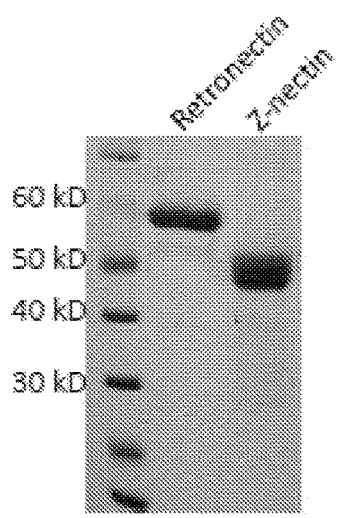
FIG. 4A
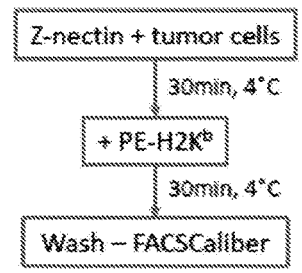
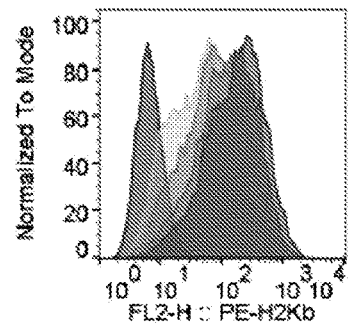
FIG. 4B
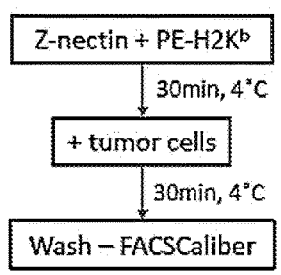
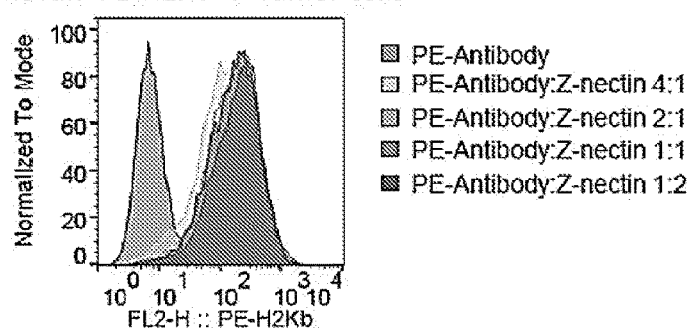

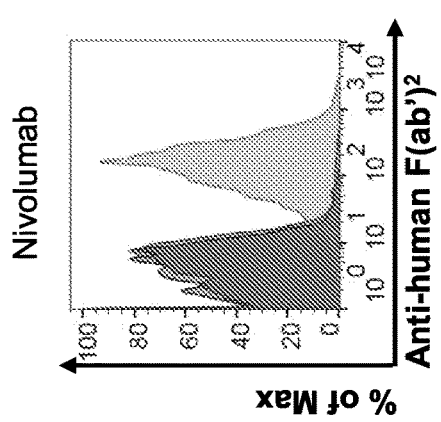
FIG. 6H
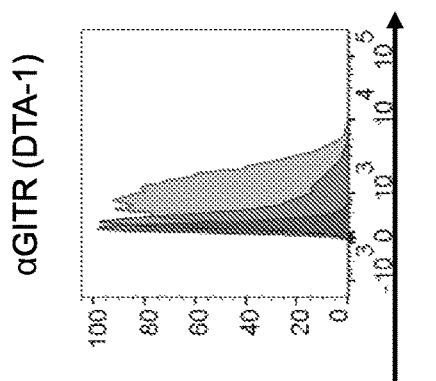
FIG. 6G
FIG. 6F
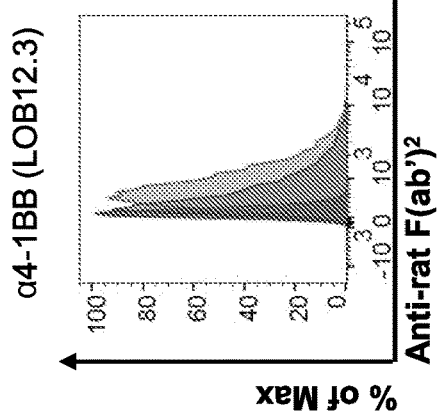
FIG. 6E
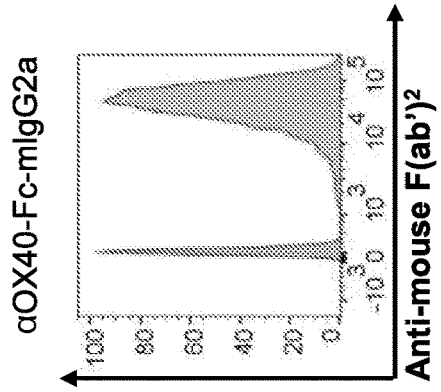

FIG. 12A
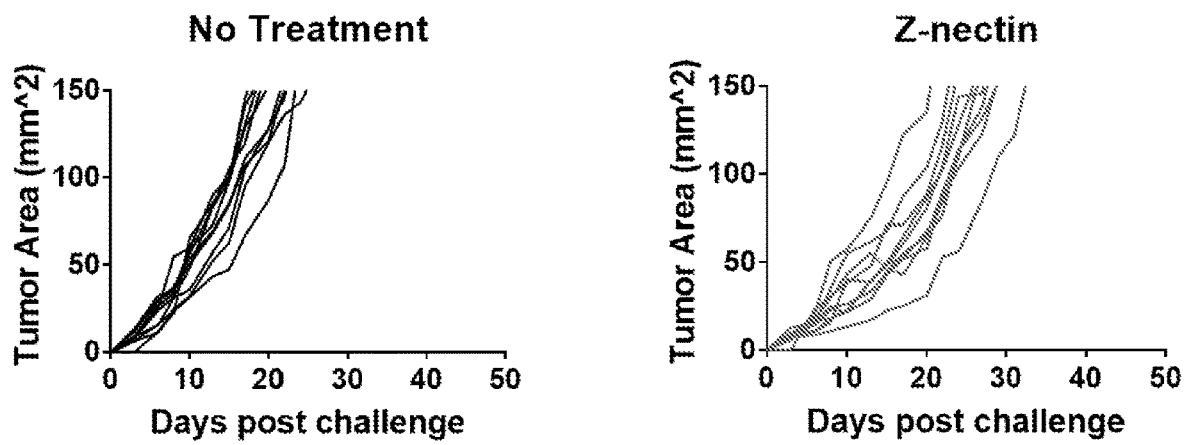
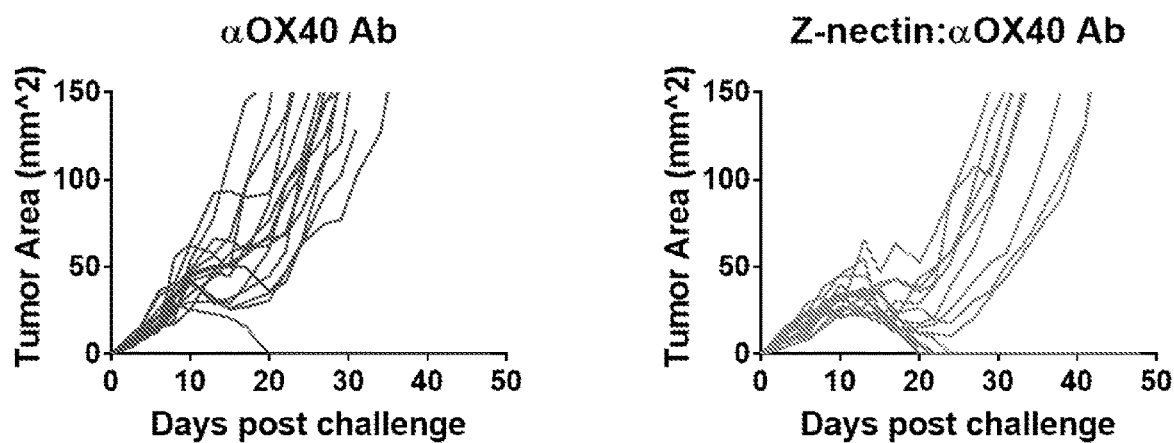
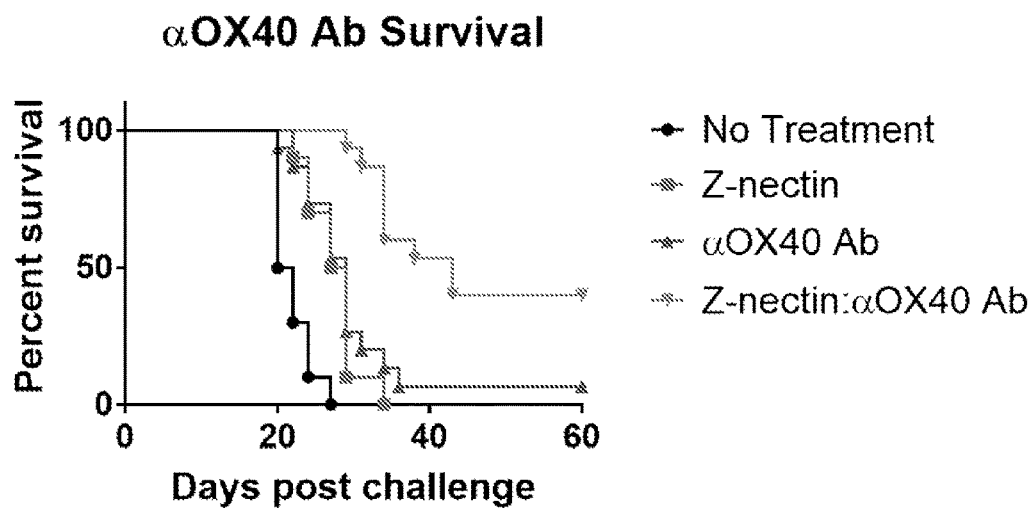

Median Survival – 25 days

Median Survival – 29.5 days

Median Survival – 38 days

Median Survival – 59 days

No Treatment

Z-nectin i.t.

α4-1BB Ab

Z-nectin:α4-1BB Ab

α41BB Survival

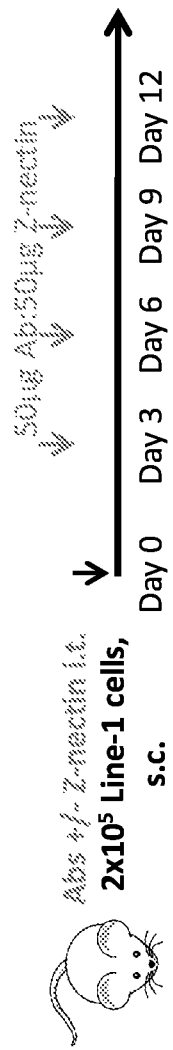
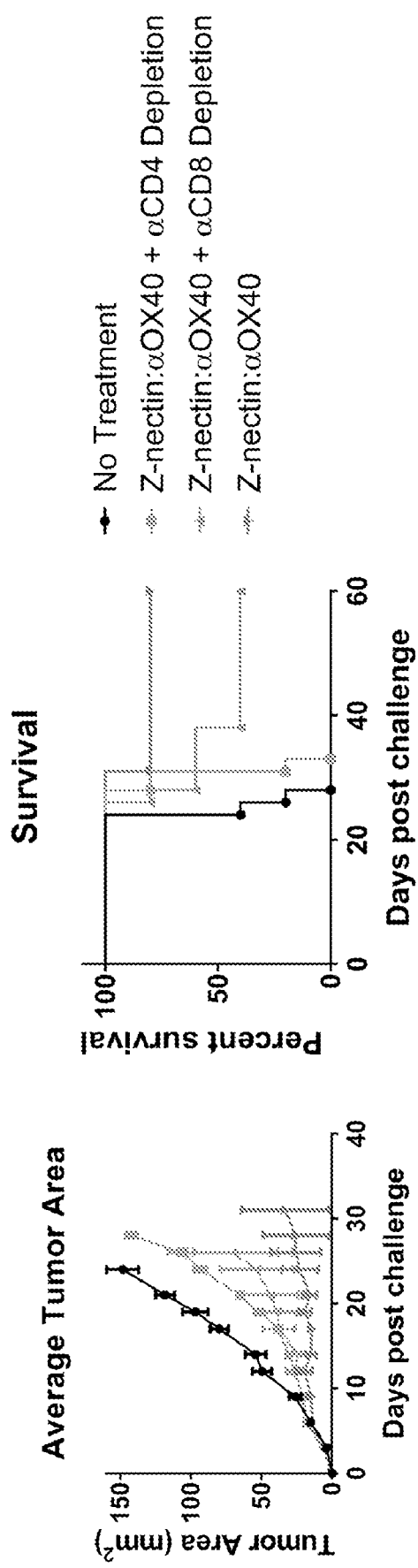
FIG. 19A
FIG. 19B

FIG. 19C
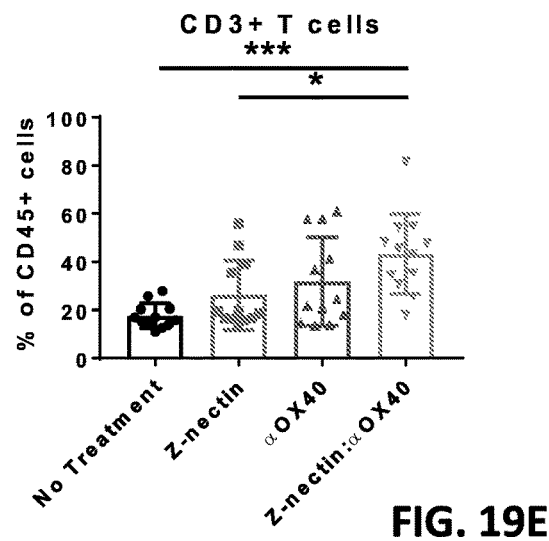
FIG. 19D
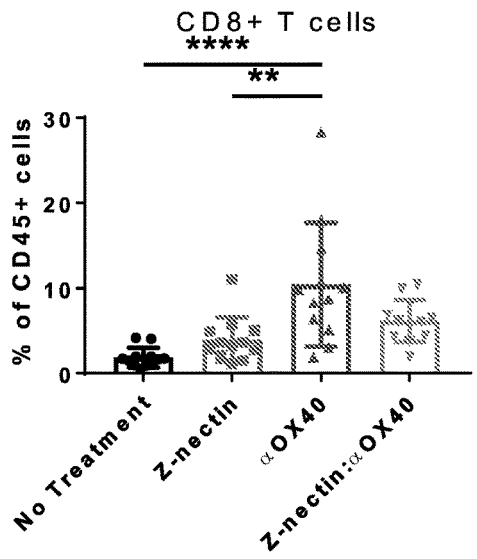
FIG. 19E
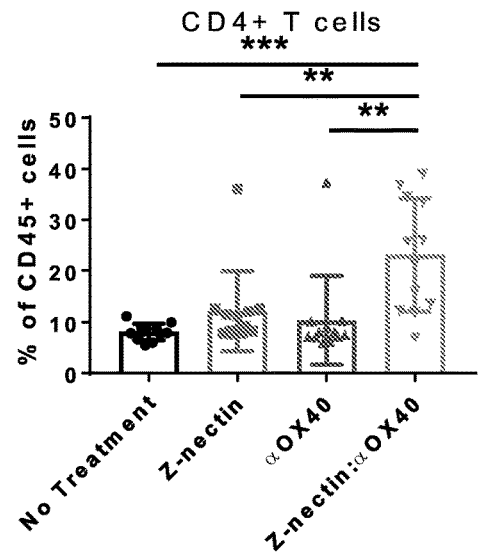
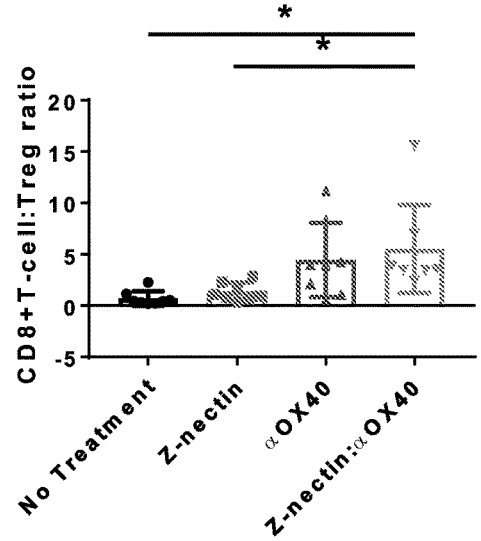
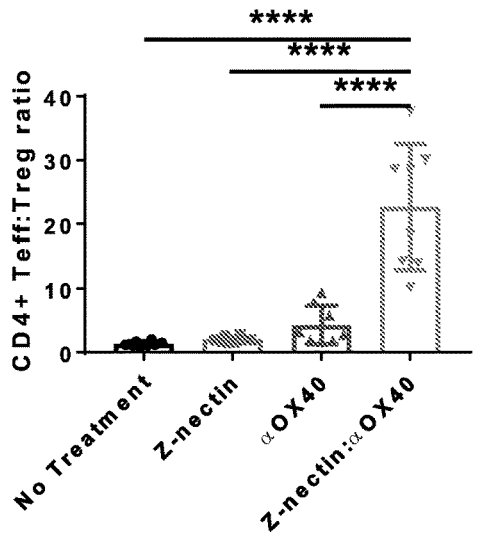
FIG. 19F
FIG. 19G

FIG. 23C
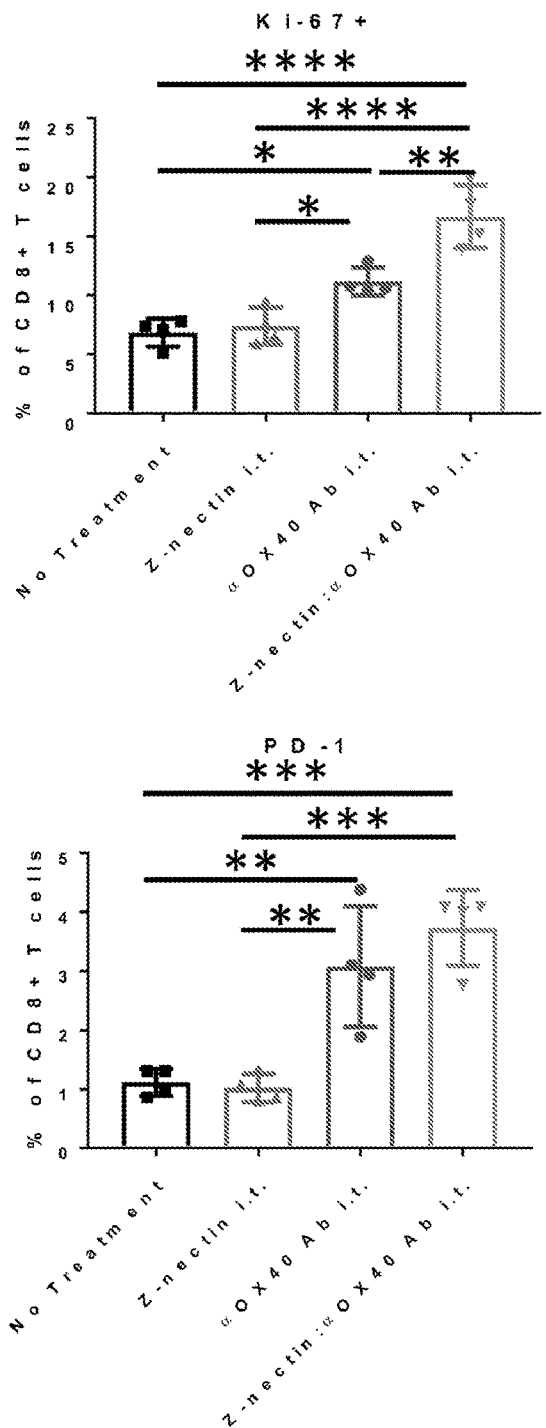
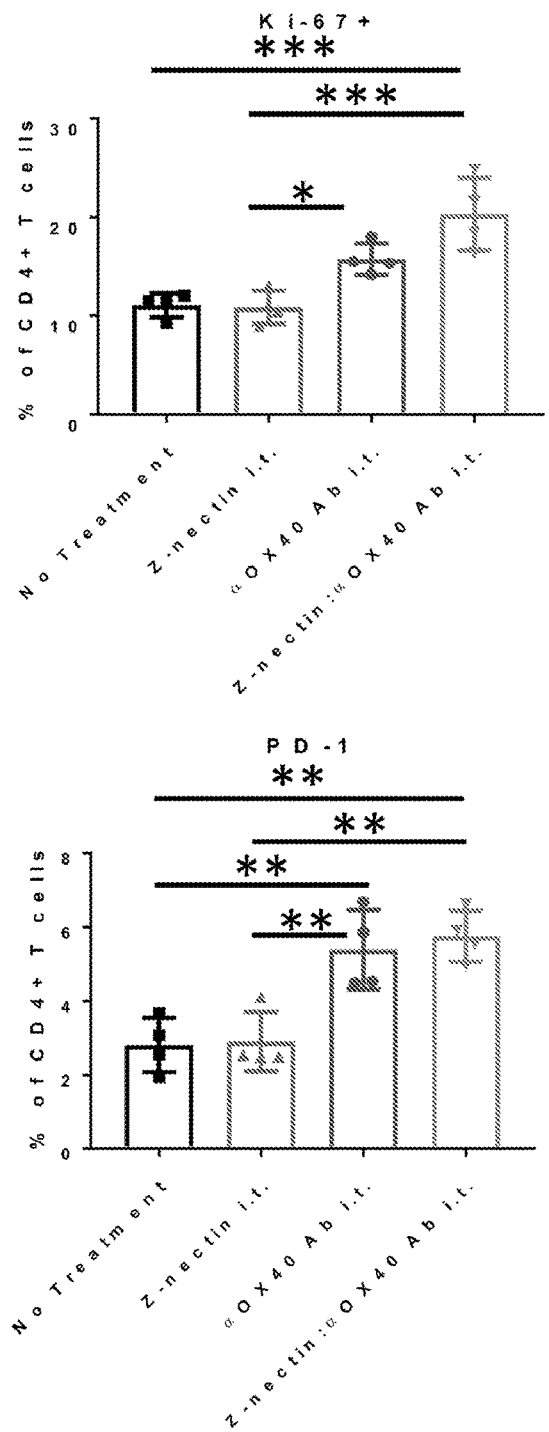

FIG. 23D
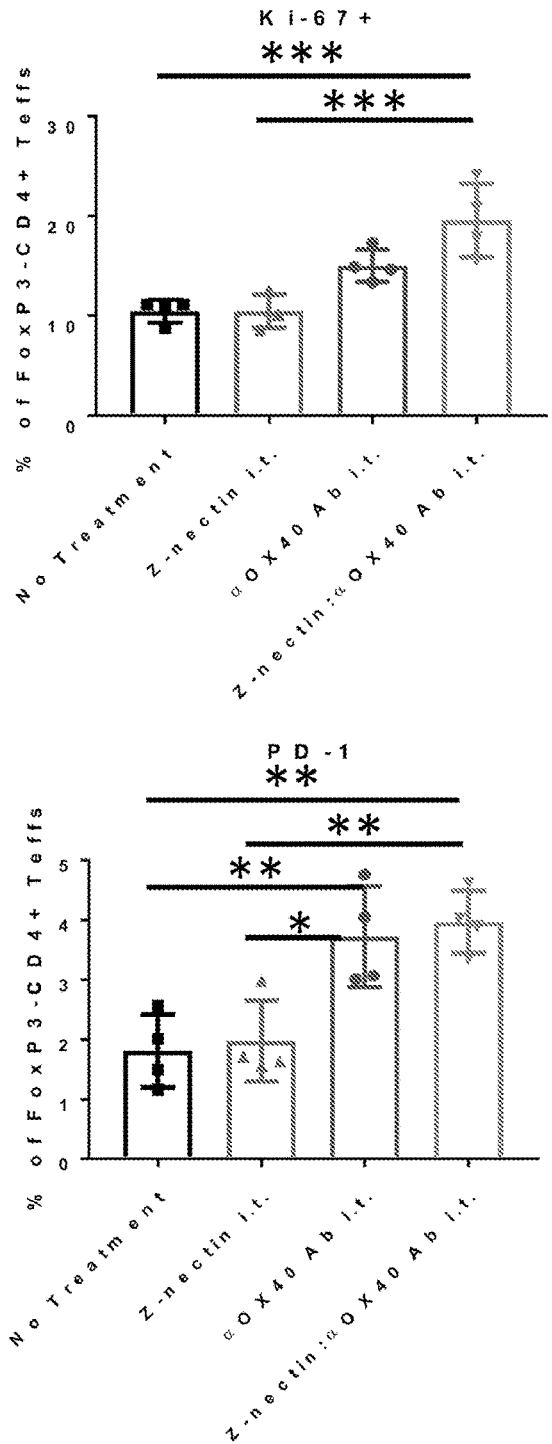
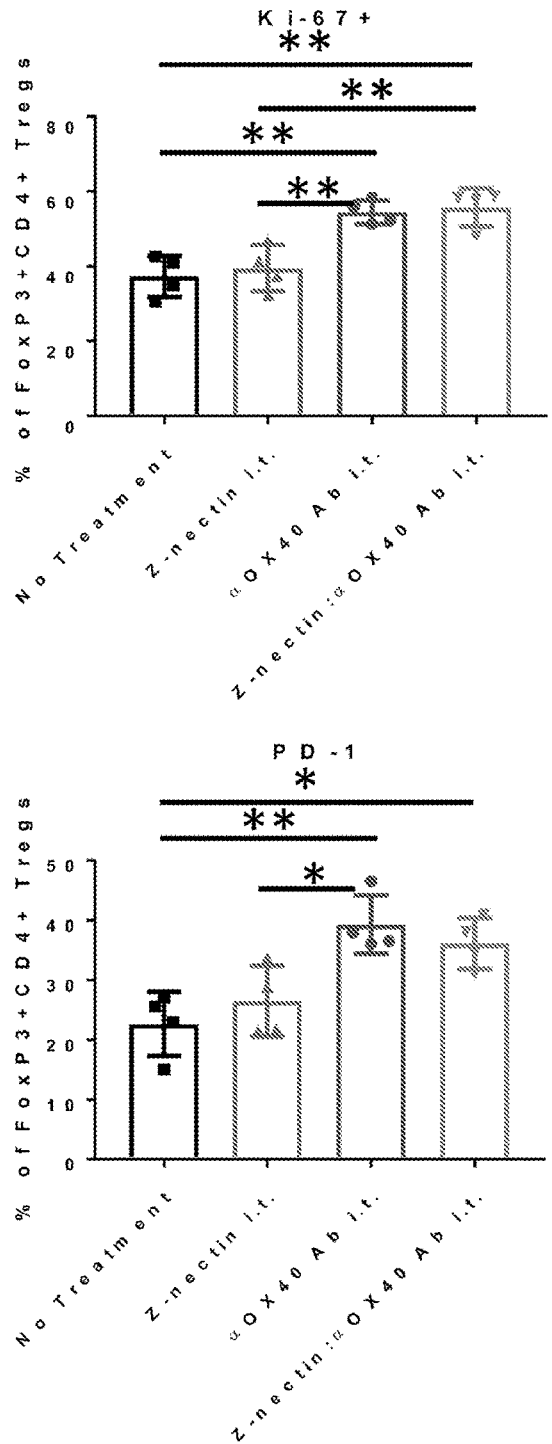

SEQUENCE LISTING

```
<160> NUMBER OF SEQ ID NOS: 4

<210> SEQ ID NO 1
<211> LENGTH: 448
<212> TYPE: PRT
<213> ORGANISM: Artificial Sequence
<220> FEATURE:
<223> OTHER INFORMATION: Z-nectin protein

<400> SEQUENCE: 1

Met Asn His Lys Val His His His His His His Met Ala Ala Ala Ala
1               5                   10                  15

Val Thr Val Asp Asn Lys Phe Asn Lys Glu Gln Gln Asn Ala Phe Tyr
            20                  25                  30

Glu Ile Leu His Leu Pro Asn Leu Asn Glu Glu Gln Arg Asn Ala Phe
        35                  40                  45

Ile Gln Ser Leu Lys Asp Asp Pro Ser Gln Ser Ala Asn Leu Leu Ala
    50                  55                  60

Glu Ala Lys Lys Leu Asn Asp Ala Gln Ala Pro Lys Val Asp Asn Lys
65                  70                  75                  80

Phe Asn Lys Glu Gln Gln Asn Ala Phe Tyr Glu Ile Leu His Leu Pro
                85                  90                  95

Asn Leu Asn Glu Glu Gln Arg Asn Ala Phe Ile Gln Ser Leu Lys Asp
            100                 105                 110

Asp Pro Ser Gln Ser Ala Asn Leu Leu Ala Glu Ala Lys Lys Leu Asn
        115                 120                 125

Asp Ala Gln Ala Pro Lys Val Asp Ala Glu Phe Ala Ile Pro Ala Pro
    130                 135                 140

Thr Asp Leu Lys Phe Thr Gln Val Thr Pro Thr Ser Leu Ser Ala Gln
```

```
        145                 150                 155                 160
Trp Thr Pro Pro Asn Val Gln Leu Thr Gly Tyr Arg Val Arg Val Thr
                165                 170                 175

Pro Lys Glu Lys Thr Gly Pro Met Lys Glu Ile Asn Leu Ala Pro Asp
            180                 185                 190

Ser Ser Ser Val Val Ser Gly Leu Met Val Ala Thr Lys Tyr Glu
        195                 200                 205

Val Ser Val Tyr Ala Leu Lys Asp Thr Leu Thr Ser Arg Pro Ala Gln
    210                 215                 220

Gly Val Val Thr Thr Leu Glu Asn Val Ser Pro Arg Arg Ala Arg
225                 230                 235                 240

Val Thr Asp Ala Thr Glu Thr Thr Ile Thr Ile Ser Trp Arg Thr Lys
                245                 250                 255

Thr Glu Thr Ile Thr Gly Phe Gln Val Asp Ala Val Pro Ala Asn Gly
            260                 265                 270

Gln Thr Pro Ile Gln Arg Thr Ile Lys Pro Asp Val Arg Ser Tyr Thr
        275                 280                 285

Ile Thr Gly Leu Gln Pro Gly Thr Asp Tyr Lys Ile Tyr Leu Tyr Thr
    290                 295                 300

Leu Asn Asp Asn Ala Arg Ser Ser Pro Val Val Ile Asp Ala Ser Thr
305                 310                 315                 320

Ala Ile Asp Ala Pro Ser Asn Leu Arg Phe Leu Ala Thr Thr Pro Asn
                325                 330                 335

Ser Leu Leu Val Ser Trp Gln Pro Pro Arg Ala Arg Ile Thr Gly Tyr
            340                 345                 350

Ile Ile Lys Tyr Glu Lys Pro Gly Ser Pro Arg Glu Val Val Pro
        355                 360                 365

Arg Pro Arg Pro Gly Val Thr Glu Ala Thr Ile Thr Gly Leu Glu Pro
    370                 375                 380

Gly Thr Glu Tyr Thr Ile Tyr Val Ile Ala Leu Lys Asn Asn Gln Lys
385                 390                 395                 400

Ser Glu Pro Leu Ile Gly Arg Lys Lys Thr Asp Glu Leu Pro Gln Leu
                405                 410                 415

Val Thr Leu Pro His Pro Asn Leu His Gly Pro Glu Ile Leu Asp Val
            420                 425                 430

Pro Ser Thr His His His His His His Gly Ala Ala Glu Pro Glu Ala
        435                 440                 445

<210> SEQ ID NO 2
<211> LENGTH: 1347
<212> TYPE: DNA
<213> ORGANISM: Artificial Sequence
<220> FEATURE:
<223> OTHER INFORMATION: Z-nectin nucleic acid sequence

<400> SEQUENCE: 2
atgaatcaca aagtgcatca tcatcatcat catatggcgg ctgcggcggt aaccgtggac      60
aacaaattca caaagaaca acaaaacgcg ttctatgaga tcttacattt acctaactta     120
aacgaagaac aacgaaacgc cttcatccaa agtttaaaag atgacccaag ccaaagcgct     180 aacctttag cagaagctaa aagctaaat gatgctcagg cgccgaaagt agacaacaaa      240
ttcaacaaag aacaacaaaa cgcgttctat gagatcttac atttacctaa cttaaacgaa     300
gaacaacgaa acgccttcat ccaaagttta aaagatgacc caagccaaag cgctaacctt     360
ttagcagaag ctaaaaagct aaatgatgct caggcgccga agtagacgc ggaattcgct      420
```

```
attcctgcac caaccgattt gaagtttacc caagtgaccc cgacgtcgtt aagcgcccaa      480
tggaccccac cgaatgtcca gttaaccgga taccgtgtac gcgtaacacc taaggagaag      540
actggtccta tgaaagaaat caatttggcc ccggattcat cttccgtggt agtttctgga      600
cttatggttg caaccaagta tgaagtgtca gtatacgcct taaaagatac tctgacatca      660
cgtcctgctc aaggagtcgt caccaccttg gaaaacgtat ccccgcctcg tcgtgcgcgc      720
gttacagacg cgacggaaac aaccatcact attagttggc gcaccaaaac ggagaccatc      780
acggggttcc aagttgacgc tgttccggca aatgggcaaa caccgatcca acgtacgatt      840
aagcctgatg tccgctcata cactatcact ggcctgcaac caggaacgga ctacaagatc      900
tacttataca cccttaatga caatgcgcgc agttctcctg tagtaattga cgcctcgaca      960
gcgattgatg caccatcaaa cttacgcttc cttgctacaa ctccaaactc attattggtc     1020
tcttggcaac caccgcgcgc tcgtatcact gggtacatca tcaaatatga gaaaccagga     1080
tcacctccac gcgaagtcgt accacgccca cgtccgggag tcaccgaagc aacaatcacc     1140
ggattagagc ctggcaccga atacaccatt tatgtgatcg cgttaaagaa caaccagaaa     1200
agtgaaccac tgattggacg caaaaagacc gacgaacttc ctcaactggt caccctgccg     1260
catcccaatc ttcatggtcc tgaaatttta gatgttccta gcacccatca tcatcaccat     1320
cacggggccg cagaaccgga agcgtaa                                          1347
```

```
<210> SEQ ID NO 3
<211> LENGTH: 5
<212> TYPE: PRT
<213> ORGANISM: Artificial Sequence
<220> FEATURE:
<223> OTHER INFORMATION: Peptide linker sequence

<400> SEQUENCE: 3

Gly Gly Gly Gly Ser
1               5

<210> SEQ ID NO 4
<211> LENGTH: 6
<212> TYPE: PRT
<213> ORGANISM: Artificial Sequence
<220> FEATURE:
<223> OTHER INFORMATION: Integrin binding peptide
<220> FEATURE:
<221> NAME/KEY: MOD_RES
<222> LOCATION: (3)..(3)
<223> OTHER INFORMATION: X=hydroxyproline

<400> SEQUENCE: 4

Gly Phe Xaa Gly Glu Arg
1               5
```

FUSION POLYPEPTIDES BINDING ANTIBODY Fc DOMAINS AND INTEGRIN AND METHODS OF USE

CROSS REFERENCE TO RELATED APPLICATION

This is the § 371 U.S. National Stage of International Application No. PCT/US2020/052551, filed Sep. 24, 2020, which was published in English under PCT Article 21 (2), which in turn claims the benefit of U.S. Provisional Application No. 62/905,083, filed Sep. 24, 2019, which is incorporated herein by reference in its entirety.

FIELD

This disclosure relates to fusion polypeptides that can bind both antibody Fc domains and integrin, and methods of their use.

BACKGROUND

Treatment of cancers, especially solid tumors, requires diffusion and accumulation of therapeutic agents to tumor beds. For example, therapeutic antibodies targeted to tumor cells or immune cells in the tumor microenvironment can be effective against wide ranges of malignancies. However, their efficacy is limited by inefficient passive diffusion and poor retention in tumor beds. In addition, the tumor microenvironment limits the therapeutic efficacy of antibodies via exclusion and/or active suppression of anti-tumor immune cells.

SUMMARY

There remains a need to improve responses to cancer therapies, including increasing efficacy of agents (such as antibodies) that work in the tumor microenvironment, for example by increasing retention of the agents in the tumor microenvironment and/or facilitating tumor infiltration and function of anti-tumor immune cells.

Disclosed herein are fusion polypeptides including at least one immunoglobulin binding domain (e.g. an Fc binding domain) linked to at least one integrin binding domain. In some embodiments, an Fc binding domain includes one or more Fc binding domains from Protein A, Protein G, or Protein Z (for example, one or more Z domains of protein A), one or more anti-Fc antibodies, or one or more non-antibody Fc binding proteins. In some embodiments, the at least one integrin binding domain comprises one or more fibronectin type III domains (for example repeats 12-14 of fibronectin type III domains). In other embodiments, the at least one integrin binding domain includes repeats 12-14 of fibronectin type III domains and at least a portion of the connecting segment (CS) of fibronectin. The at least one Fc binding domain and the at least one integrin binding protein may be directly or indirectly linked (for example, using a peptide linker).

In some non-limiting examples, the polypeptide includes two Z domains of Protein A linked to fibronectin 12-14 type III domains (and optionally also the fibronectin CS domain). The polypeptide may include an amino acid sequence at least 90% identical to amino acids 12-435 of SEQ ID NO: 1 or an amino acid sequence at least 90% identical to SEQ ID NO: 1.

Also provided are nucleic acids encoding the disclosed polypeptides. In non-limiting examples, the nucleic acid includes a nucleic acid sequence at least 90% identical to nucleotides 34-1305 of SEQ ID NO: 2 or a nucleic acid sequence at least 90% identical to SEQ ID NO: 2. In some examples, the nucleic acid is included in a vector. Also provided are host cells including the nucleic acid or the vector, for example, E. coli cells.

In some embodiments the polypeptide is included in a protein complex with one or more antibodies (e.g., 1, 2, 3, or more antibodies). In some examples, the antibody is a monoclonal antibody, such as an immune checkpoint inhibitor antibody or an immunostimulatory antibody.

Also provided are methods of using the disclosed polypeptides and/or polypeptide:antibody complexes. In some examples, the methods include treating or inhibiting a tumor in a subject by administering to the subject one or more doses of the polypeptide and one or more antibodies (for example, sequentially or simultaneously) or one or more polypeptide: antibody complexes. In some examples, the subject develops a T cell immune response (such as a systemic T cell immune response and/or a memory T cell response).

In other embodiments, provided are methods of inducing a memory T cell immune response to a tumor, including administering to a subject with a tumor one or more doses of the polypeptide and one or more antibodies (for example, sequentially or simultaneously) or one or more polypeptide: antibody complexes.

Also provided are methods of targeting one or more antibodies to a tumor cell, including contacting the tumor cell with the polypeptide and one or more antibodies (for example, sequentially or simultaneously) or one or more polypeptide:antibody complexes. Contacting the tumor cell with the polypeptide and antibody or polypeptide:antibody complex(es) may be in vitro or in vivo.

The foregoing and other features of the disclosure will become more apparent from the following detailed description, which proceeds with reference to the accompanying figures.

BRIEF DESCRIPTION OF THE DRAWINGS

FIG. 1 is a schematic diagram of an exemplary fusion protein including two Protein A Z domains and Fibronectin 12-14 FNIII repeats (referred to herein as "Z-nectin").

FIG. 2 is the amino acid sequence of an exemplary Z-nectin fusion protein that includes N-terminal and C-terminal His tags (SEQ ID NO: 1).

FIG. 3 is a digital image of a gel showing purification of Z-nectin protein.

FIGS. 4A and 4B are plots showing Z-nectin tethering of H2Kb antibody to tumor cells. In FIG. 4A, Line-1 tumor cells and Z-nectin were incubated prior to addition of antibody (PE-anti-H-2Kb clone AF6-88.5, mouse IgG2a), while in FIG. 4B, antibody and Z-nectin were incubated prior to adding the tumor cells.

FIGS. 6A-6H show additional characterization of Z-nectin tethering of antibodies to tumor cells. FIG. 6A shows $\alpha$H-2K$^b$ Ab binding to Line-1 cells with increasing concentrations of Z-nectin and FIG. 6B shows $\alpha$H-2K$^b$ Ab binding to Line-1 cells with constant Z-nectin and increasing concentration of antibody. FIG. 6C shows binding of antibody to the cells in the presence of increasing concentrations of recombinant fibronectin. FIG. 6D is a time course of binding of Z-nectin:antibody to tumor cell surfaces. FIGS. 6E-6H shows binding of murine and rat antibodies against costimulatory molecules OX40 (FIG. 6E), 4-1BB (FIG. 6F), GITR (FIG. 6G), and the clinically approved human-anti-PD-1 checkpoint inhibitor, Nivolumab (FIG. 6H) to Line-1 cells in the presence of Z-nectin.

FIG. 7A shows Z-nectin tethers antibodies to different cell lines, including various mouse tumor cell lines and immune cell lines, such as dendritic cell or macrophage cell lines. Z-nectin tethering of different murine IgG isotypes (FIG. 7B), different rat IgG isotypes (FIG. 7C), and human IgG (FIG. 7D) to Line-1 cells. FIG. 7E shows tethering of two different antibodies to Line-1 cells.

FIG. 10B shows that when anti-OX40 Ab is injected as a precomplex with Z-nectin, less antibody leaks into the serum and binds T cells compared to if the anti-OX40 Ab is injected alone.

FIG. 11C shows survival of the indicated treatment groups.

FIGS. 12A and 12B show efficacy of Z-nectin in a single flank tumor model with Line-1 cells. FIG. 12A shows tumor area in each group of mice (top panel) and overall survival (bottom panel). Mice cured with Z-nectin:αOX40 Ab were protected against Line-1 tumor rechallenge compared to naïve control mice (FIG. 12B, top panel). Tumor area of individual mice is shown in the bottom panel.

FIG. 13F shows a schematic of the experimental protocol.

FIG. 14A shows a summary of the survival for all treatments. Tumor area post-rechallenge is shown for naïve control (FIG. 14B), Z-nectin regressed (FIG. 14C), Z-nectin: anti-GITR regressed (FIG. 14D), Z-nectin:anti-GITR/anti-CTLA-4 regressed (FIG. 14E), and Z-nectin:anti-GITR/antiPDL1 regressed (FIG. 14F) mice.

FIG. 16A shows a summary of tumor growth for all treatments and FIG. 16B shows a summary of the survival for all treatments. Tumor area post-challenge is shown for naïve control (FIG. 16C), Z-nectin treated (FIG. 16D), anti-OX40 alone (FIG. 16E), and Z-nectin:anti-OX40 (FIG. 16F) mice.

FIG. 18A is a schematic of the experimental protocol. FIG. 18B shows average tumor growth (left) and overall survival (right) for each treatment condition. FIG. 18C shows tumor area for each mouse for each treatment condition.

FIGS. 19A-19G show effect of Z-nectin:αOX40 Ab combination therapy on T cells. FIG. 19A is a schematic showing the experimental design. FIG. 19B shows average tumor area (left) and survival (right) in mice with CD4 or CD8 depletion. FIGS. 19C-19E show number of CD3+ T cells (FIG. 19C), CD8+ T cells (FIG. 19D), and CD4+ T cells (FIG. 19E) in mice treated as indicated. FIGS. 19F and 19G show CD8+ T cell:Treg and CD4+ Teff:Treg ratios, respectively.

FIGS. 23A-23D show effect of Z-nectin:αOX40 Abon proliferation of CD8+ T cells and CD4+ T effector cells in spleen (FIG. 23A and FIG. 23B) and lymph nodes (FIG. 23C and FIG. 23D).

SEQUENCE LISTING

Figure 5:
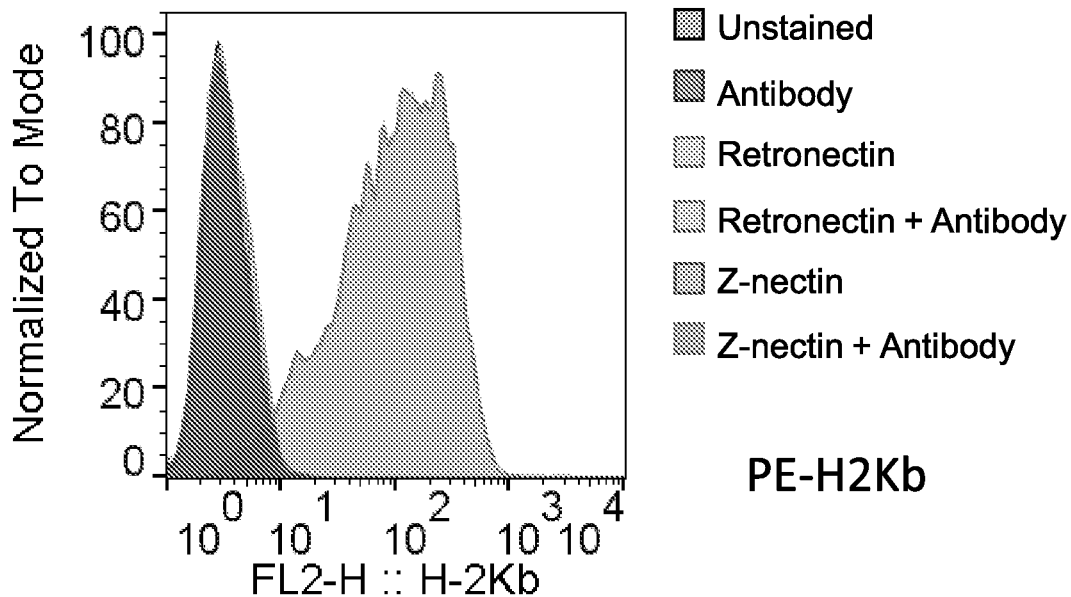
FIG. 5 is a plot comparing tethering of anti-H-2Kb to Line-1 cells by Z-nectin and retronectin.

Any nucleic acid and amino acid sequences provided herein or in the accompanying Sequence Listing are shown using standard letter abbreviations for nucleotide bases and amino acids, as defined in 37 C.F.R. § 1.822. In at least some cases, only one strand of each nucleic acid sequence is shown, but the complementary strand is understood as included by any reference to the displayed strand.

The Sequence Listing is submitted as an ASCII text file in the form of the file named Sequence_Listing.txt, which was created on Mar. 22, 2022, and is 6,597 bytes, which is incorporated by reference herein.

SEQ ID NO: 1 is the amino acid sequence of an exemplary fusion protein of the disclosure ("Z-nectin").

SEQ ID NO: 2 is a nucleic acid sequence encoding SEQ ID NO: 1.

SEQ ID NO: 3 is the amino acid sequence of an exemplary peptide linker, GGGGS.

SEQ ID NO: 4 is an exemplary integrin binding peptide from collagen, GFXGER, where X is hydroxyproline.

DETAILED DESCRIPTION

Disclosed herein are compositions and methods to improve the retention of therapeutic antibodies or other agents while also modulating tumor microenvironment at or near a tumor by engineering fusion proteins of cell matrix proteins and antibody binding domains. One embodiment of these fusion proteins (referred to as "Z-nectin"), includes a cell binding fibronectin fragment and Z-domains of antibody Fc binding fragment of protein A, and is shown to dramatically improve anti-tumor efficacy of T-cell agonist antibodies, such as anti-GITR and anti-OX40. The disclosed fusion proteins utilize cell matrix proteins to prolong the in situ action of antibodies and other agents. In addition, cell matrix proteins are natural ligands for integrin and it is demonstrated that these fusion proteins modulate immune cells in the tumor microenvironment.

I. Terms

Unless otherwise noted, technical terms are used according to conventional usage. Definitions of common terms in molecular biology may be found in *Lewin's Genes X*, ed. Krebs et al., Jones and Bartlett Publishers, 2009 (ISBN 0763766321); Kendrew et al. (eds.), *The Encyclopedia of Molecular Biology*, published by Blackwell Publishers, 1994 (ISBN 0632021829); Robert A. Meyers (ed.), *Molecular Biology and Biotechnology: a Comprehensive Desk Reference*, published by Wiley, John & Sons, Inc., 1995 (ISBN 0471186341); and George P. Rédei, *Encyclopedic Dictionary of Genetics, Genomics, Proteomics and Informatics*, 3$^{rd}$ Edition, Springer, 2008 (ISBN: 1402067534), and other similar references.

Unless otherwise explained, all technical and scientific terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Hence "comprising A or B" means including A, or B, or A and B. It is further to be understood that all base sizes or amino acid sizes, and all molecular weight or molecular mass values, given for nucleic acids or polypeptides are approximate, and are provided for description.

Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including explanations of terms, will control. In addition, the materials, methods, and examples are illustrative only and not intended to be limiting.

In order to facilitate review of the various embodiments of the disclosure, the following explanations of specific terms are provided:

Antibody: An immunoglobulin, antigen-binding fragment, or derivative thereof, that specifically binds and recognizes an antigen. The term "antibody" is used herein in the broadest sense and encompasses various antibody structures, including but not limited to monoclonal antibodies, polyclonal antibodies, multispecific antibodies (e.g., bispecific antibodies), and antigen binding fragments, so long as they exhibit the desired antigen-binding activity.

Non-limiting examples of antibodies include, for example, intact immunoglobulins and variants and antigen binding fragments thereof that retain binding affinity for the antigen. Examples of antigen binding fragments include but are not limited to Fv, Fab, dsFv, Fab', Fab'-SH, F(ab')$_2$; diabodies; linear antibodies; single-chain antibody molecules (e.g. scFv and ds-scFv); and multispecific antibodies formed from antibody fragments. Antibody fragments include antigen binding fragments either produced by the modification of whole antibodies or those synthesized de novo using recombinant DNA methodologies (see, e.g., Kontermann and Dübel (Eds.), *Antibody Engineering*, Vols. 1-2, 2$^{nd}$ ed., Springer-Verlag, 2010). Antibodies also include genetically engineered forms such as chimeric antibodies (such as humanized murine antibodies) and heteroconjugate antibodies (such as bispecific antibodies).

An antibody may have one or more binding sites. If there is more than one binding site, the binding sites may be identical to one another or may be different. For instance, a naturally-occurring immunoglobulin has two identical binding sites, a single-chain antibody or Fab fragment has one binding site, while a bispecific or bifunctional antibody has two different binding sites.

Typically, a naturally occurring immunoglobulin has heavy (H) chains and light (L) chains interconnected by disulfide bonds Immunoglobulin genes include the kappa, lambda, alpha, gamma, delta, epsilon and mu constant region genes, as well as the myriad immunoglobulin variable domain genes. There are two types of light chain, lambda (λ) and kappa (κ). There are five main heavy chain classes (or isotypes) which determine the functional activity of an antibody molecule: IgM, IgD, IgG, IgA and IgE. Each heavy and light chain contains a constant region (or constant domain) and a variable region (or variable domain). In combination, the heavy and the light chain variable regions specifically bind the antigen.

References to "$V_H$" or "VH" refer to the variable region of an antibody heavy chain, including that of an antigen binding fragment, such as Fv, scFv, dsFv or Fab. References to "$V_L$" or "VL" refer to the variable domain of an antibody light chain, including that of an Fv, scFv, ds-scFv or Fab. The $V_H$ and $V_L$ contain a "framework" region interrupted by three hypervariable regions, also called "complementarity-determining regions" or "CDRs" (see, e.g., Kabat et al., *Sequences of Proteins of Immunological Interest*, 5$^{th}$ ed., NIH Publication No. 91-3242, Public Health Service, National Institutes of Health, U.S. Department of Health and Human Services, 1991). The sequences of the framework regions of different light or heavy chains are relatively conserved within a species. The framework region of an antibody, that is the combined framework regions of the constituent light and heavy chains, serves to position and align the CDRs in three-dimensional space.

The CDRs are primarily responsible for binding to an epitope of an antigen. The amino acid sequence boundaries of a given CDR can be readily determined using any of a number of well-known schemes, including those described by Kabat et al. (*Sequences of Proteins of Immunological Interest*, 5$^{th}$ ed., NIH Publication No. 91-3242, Public Health Service, National Institutes of Health, U.S. Department of Health and Human Services, 1991; "Kabat" numbering scheme), Al-Lazikani et al., ("Standard conformations for the canonical structures of immunoglobulins," *J. Mol. Bio.*, 273(4):927-948, 1997; "Chothia" numbering scheme), and Lefranc et al. ("IMGT unique numbering for immunoglobulin and T cell receptor variable domains and Ig superfamily V-like domains," *Dev. Comp. Immunol.*, 27(1):55-77, 2003; "IMGT" numbering scheme). The CDRs of each chain are typically referred to as CDR1, CDR2, and CDR3 (from the N-terminus to C-terminus), and are also typically identified by the chain in which the particular CDR is located. Thus, a $V_H$ CDR3 is the CDR3 from the $V_H$ of the antibody in which it is found, whereas a $V_L$ CDR1 is the CDR1 from the $V_L$ of the antibody in which it is found. Light chain CDRs are sometimes referred to as LCDR1, LCDR2, and LCDR3. Heavy chain CDRs are sometimes referred to as HCDR1, HCDR2, and HCDR3.

A "monoclonal antibody" is an antibody obtained from a population of substantially homogeneous antibodies, e.g., the individual antibodies comprising the population are identical and/or bind the same epitope, except for possible variant antibodies, for example, containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen. A "humanized" antibody or antigen binding fragment includes a human framework region and one or more CDRs from a non-human (such as a mouse, rat, or synthetic) antibody or antigen binding fragment. The non-human antibody or antigen binding fragment providing the CDRs is termed a "donor," and the human antibody or antigen binding fragment providing the framework is termed an "acceptor." In one embodiment, all the CDRs are from the donor immunoglobulin in a humanized immunoglobulin. Constant regions need not be present, but if they are, they can be substantially identical to human immunoglobulin constant regions, such as at least about 85-90%, such as about 95% or more identical. Hence, all parts of a humanized antibody or antigen binding fragment, except possibly the CDRs, are substantially identical to corresponding parts of natural human antibody sequences.

A "chimeric antibody" is an antibody which includes sequences derived from two different antibodies, which typically are of different species. In some examples, a chimeric antibody includes one or more CDRs and/or framework regions from one human antibody and CDRs and/or framework regions from another human antibody.

A "fully human antibody" or "human antibody" is an antibody which includes sequences from (or derived from) the human genome, and does not include sequence from another species. In some embodiments, a human antibody includes CDRs, framework regions, and (if present) an Fc region from (or derived from) the human genome.

Cancer: A malignant neoplasm that has undergone anaplasia with loss of differentiation, increased rate of growth, invasion of surrounding tissue, and/or is capable of metastasis. As used herein, cancer includes both solid tumors and hematological malignancies. Residual cancer is cancer that remains in a subject after any form of treatment is given to the subject to reduce or eradicate cancer. Metastatic cancer is a cancer at one or more sites in the body other than the original site of the cancer from which the metastatic cancer is derived. Local recurrence is a reoccurrence of the cancer at or near the same site as the original cancer, for example, in the same tissue as the original cancer.

Fc region: The Fc region is the constant region of an antibody excluding the first heavy chain constant domain. Fc region generally refers to the last two heavy chain constant domains of IgA, IgD, and IgG, and the last three heavy chain constant domains of IgE and IgM. An Fc region may also include part or all of the flexible hinge N-terminal to these domains. For IgA and IgM, an Fc region may or may not include the tailpiece, and may or may not be bound by the J chain. For IgG, the Fc region is typically understood to include immunoglobulin domains Cγ2 and Cγ3 and optionally the lower part of the hinge between Cγ1 and Cγ2. Although the boundaries of the Fc region may vary, the human IgG heavy chain Fc region is usually defined to include residues following C226 or P230 to the Fc carboxyl-terminus, wherein the numbering is according to Kabat. For IgA, the Fc region includes immunoglobulin domains Cα2 and Cα3 and optionally the lower part of the hinge between Cα1 and Cα2.

Fibronectin type III (FNIII) domain: A protein domain originally identified in fibronectin and found in a wide variety of proteins, including extracellular matrix proteins. The FNIII domain is about 100 amino acids long and has a beta sandwich structure. In some examples, FNIII domains include an Arg-Gly-Asp (RGD) amino acid sequence that is involved in interactions with integrin.

Subject: A living multi-cellular vertebrate organism, a category that includes both human and veterinary subjects, including human and non-human mammals.

T cell: A white blood cell (lymphocyte) that is an important mediator of the immune response. T cells include, but are not limited to, CD4$^+$ T cells and CD8$^+$ T cells. A CD4$^+$ T cell is an immune cell that carries a marker on its surface known as "cluster of differentiation 4" (CD4). These cells, also known as helper T cells, help orchestrate the immune response, including antibody responses as well as killer T cell responses. CD8$^+$ T cells carry the "cluster of differentiation 8" (CD8) marker. In one embodiment, a CD8$^+$ T cell is a cytotoxic T lymphocyte (CTL). In another embodiment, a CD8$^+$ cell is a suppressor T cell. Activated T cells can be detected by an increase in cell proliferation and/or expression of or secretion of one or more cytokines (such as IL-2, IL-4, IL-6, IFNγ, or TNFα). Activation of CD8$^+$ T cells can also be detected by an increase in cytolytic activity in response to an antigen.

"Memory T cells" are antigen-specific CD8$^+$ or CD4$^+$ T cells that persist long-term after an immune response. Upon re-exposure to the antigen, memory T cells expand and become T effector cells. Memory T cells include effector memory T cells, central memory T cells, effector memory Treg cells, and stem cell memory T cells.

Treating or ameliorating a disease: "Treating" refers to a therapeutic intervention that decreases or inhibits a sign or symptom of a disease or pathological condition after it has begun to develop, such as a reduction in tumor size or tumor burden. "Ameliorating" refers to the reduction in the number or severity of signs or symptoms of a disease, such as cancer.

Tumor: All neoplastic cell growth and proliferation, whether malignant or benign, and all pre-cancerous and cancerous cells and tissues. In particular, non-limiting examples, a tumor is a lung tumor, a pancreatic tumor, a breast tumor, a head and neck squamous cell carcinoma, a cervical tumor, or a melanoma. In some examples, "tumor" or "tumor cell" refers to a hematological malignancy or cell of a hematological malignancy.

II. Polypeptides and Polypeptide:Antibody Complexes

Disclosed herein are polypeptides that are capable of binding to both an immunoglobulin domain (such as an Fc domain) of an antibody and to an integrin. In particular examples, the polypeptides are non-naturally occurring polypeptides, such as chimeric or fusion polypeptides.

In some embodiments, the polypeptides include at least one Fc binding domain linked to at least one integrin binding domain. In some examples, the polypeptide includes one or more (e.g., 1, 2, 3, 4, 5, or more) Fc binding domains and one or more (e.g., 1, 2, 3, 4, 5, 6, 7, 8, 9, 10, 11, 12, 13, 14, 15, or more) integrin binding domains.

In some embodiments, an Fc binding domain of the disclosed polypeptides is a polypeptide that is capable of specific binding to the Fc region or domain of an antibody. In some examples, the Fc binding domain is from a bacterial immunoglobulin binding protein, such as protein A, protein G, or protein Z. For example, the Fc binding domain may include the Z domain from protein A (or a portion thereof) or the G domain from protein G (or a portion thereof). In other examples, the Fc binding domain is an Fc binding peptide. Exemplary Fc binding peptides include cyclic or branched peptides, such as PAM, Fc-III, FcBP-1, FcBP-2, FC-III-4C, and FcRM (see, e.g., Choe et al., *Materials Basel*) 9:994, 2016, incorporated herein by reference in its entirety). In further examples, the Fc binding domain is an anti-Fc antibody or fragment thereof, such as an anti-Fc nanobody. In one example, an Fc binding domain is a camel anti-Fc nanobody (e.g., a camelid anti-Fc VHH antibody).

In some embodiments, an integrin binding domain includes at least one fibronectin type III domain. In some examples, the integrin binding domain includes one or more fibronectin type III domains, such as 1, 2, 3, 4, 5, or more fibronectin type III domain. In some examples, the fibronectin type III domain includes one or more of repeats 12-14 of the fibronectin type III domains. In other examples, the at least one integrin binding domain includes repeats 12-14 of fibronectin type III domains and the connecting segment (CS) of fibronectin (e.g., FIG. 1). In other embodiments, an integrin binding domain includes an integrin binding protein, such as collagen, vitronectin, lumican, or laminin, or an integrin-binding portion thereof. Integrin-binding portions or domains are known. For example, integrin α1β1 binds to the triple-helical GFXGER (X=hydroxyproline; SEQ ID NO: 4) sequence in collagen via the metal ion-dependent adhesion site (MIDAS) motif in the α subunit I domain of integrin, vitronectin contains an RGD (45-47) sequence, which is a binding site for membrane-bound integrins, and the integrin binding activity of laminin has been mapped within the "E8" segments, tLMa5E8 (E2655-A3327), comprising the distal part of the coiled-coil domain and three laminin globular domains (LG1-3) of the alpha chain. Recombinant laminin-511 E8 fragments are truncated, functional forms of laminin composed of the C-terminal regions of the alpha, beta, and gamma chains Laminin-511 E8 (150 kDa) retains the full capability for binding to α6β1 integrin.

A non-limiting example of an Fc binding domain is the Z domain of Protein A, for example, a polypeptide with at least 90% sequence identity (for example, at least 91%, at least 92%, at least 93%, at least 94%, at least 95%, at least 96%, at least 97%, at least 98% or at least 99% sequence identity) to amino acids 12-76 or 77-136 of SEQ ID NO: 1, or a polypeptide including or consisting of the amino acid sequence of amino acids 12-76 or 77-136 of SEQ ID NO: 1.

A non-limiting example of an integrin binding domain includes repeats 12-14 of fibronectin type III domain, for example, a polypeptide with at least 90% sequence identity (for example, at least 91%, at least 92%, at least 93%, at least 94%, at least 95%, at least 96%, at least 97%, at least 98% or at least 99% sequence identity) to amino acids 137-435 of SEQ ID NO: 1 or a polypeptide that includes or consists of the amino acid sequence of amino acids 137-435 of SEQ ID NO: 1.

In some non-limiting embodiments, disclosed fusion polypeptide includes two Fc binding domains (e.g., two Fc binding domains from Protein A, Protein G, or Protein Z) and an integrin binding domain of fibronectin 12-14 FNIII repeats. In some examples, the polypeptide has an amino acid sequence with at least 90% sequence identity (for example, at least 91%, at least 92%, at least 93%, at least 94%, at least 95%, at least 96%, at least 97%, at least 98% or at least 99% sequence identity) to amino acids 12-435 of SEQ ID NO: 1, or includes or consists of the amino acid sequence of amino acids 12-435 of SEQ ID NO: 1. In further examples, the polypeptide has an amino acid sequence with at least 90% sequence identity (for example, at least 91%, at least 92%, at least 93%, at least 94%, at least 95%, at least 96%, at least 97%, at least 98% or at least 99% sequence identity) to SEQ ID NO: 1, or includes or consists of the amino acid sequence of SEQ ID NO: 1.

Also provided are functional variants of the polypeptides or the domains thereof described herein, which retain the biological activity of the polypeptide of which it is a variant or retains the biological activity of the particular domain. The functional variant can be at least about 80%, about 85%, about 90%, about 91%, about 92%, about 93%, about 94%, about 95%, about 96%, about 97%, about 98%, about 99% or more identical in amino acid sequence to the parent polypeptide or domain.

In some embodiments, the Fc binding domain and the integrin binding domain of the polypeptide are covalently linked. The Fc binding domain may be directly (for example, without an intervening linker) or indirectly linked (for example, via a linker) to the integrin binding domain. Thus, in some examples, the C-terminus of an Fc binding domain is directly linked (for example, by a peptide bond) to the N-terminus of an integrin binding domain. An example of this configuration is shown in FIG. 2 (e.g., SEQ ID NO: 1). In other examples, the C-terminus of an integrin binding domain is directly linked (for example by a peptide bond) to the N-terminus of an Fc binding domain.

In other examples, the Fc binding domain and integrin binding domain are joined by a linker. Thus, in some examples, the C-terminus of an Fc binding domain is joined by a linker to the N-terminus of an integrin binding domain. In other examples, the C-terminus of an integrin binding domain is joined by a linker to the N-terminus of an Fc binding domain. In some examples, the linker is an amino acid linker (for example, 1-100 amino acids, such as 1-10 amino acids, 5-20 amino acids, 10-30 amino acids, 20-40 amino acids, 30-50 amino acids, 40-60 amino acids, 50-70 amino acids, 60-80 amino acids, 70-90 amino acids, or 80-100 amino acids). The amino acid linker may include two or more repeats of a particular linker sequence. In some non-limiting examples, the linker includes a GS linker or two or more repeats thereof. Another example is GGGGS (SEQ ID NO: 3) or two or more repeats thereof.

In other examples, the linker is a cross-linker (such as a maleimide or succinimide linker) or other type of linker, such as a carbon chain. Exemplary crosslinking agents and techniques are described in *Crosslinking Technology* (Thermo Scientific, available at tools.thermofisher.com/content/sfs/brochures/1602163-Crosslinking-Reagents-Handbook.pdf).

The polypeptide may further include one or more tags for protein purification and/or detection, such as streptavidin (e.g., Strep-tagII), maltose binding protein (MBP), 6×Histidine (6×His), small ubiquitin like modifier (SUMO), glutathione S transferase (GST), or a combination of two or more thereof (e.g., His-MBP). In some examples, the purification tag can be linked to the N- or C-terminus of the polypeptide, a tag may be included at each of the N- and C-terminus of the polypeptide.

In some embodiments, the disclosed polypeptides are associated with (e.g., bound to) one or more antibodies, for example, as a polypeptide:antibody complex. Polypeptide:antibody complexes of the disclosure are formed by contacting the polypeptide and antibody, for example in solution. Suitable solutions include buffers, saline, or other pharmaceutically acceptable carriers. In one non-limiting example, the solution is phosphate buffered saline. The polypeptide and antibody are contacted for a sufficient amount of time for the polypeptide to bind to the antibody. In some examples, the polypeptide and antibody are contacted for about 1 minute to about 4 hours or more, such as about 5 minutes to 30 minutes, about 15 minutes to 1 hour, about 30 minutes to 90 minutes, about 1 hour to 2 hours, about 2 hours to 4 hours, or more (for example, about 1 minute, about 5 minutes, about 10 minutes, about 15 minutes, about 20 minutes, about 30 minutes, about 45 minutes, about 60 minutes, about 90 minutes, about 2 hours, about 3 hours, about 4 hours, or more). In some examples, the fusion polypeptide and antibody are contacted at about 4° C. In some examples, the complex is used immediately after preparation. In other examples, the complex is stored prior to use, for example at 4° C., or is cryopreserved until use. Exemplary methods of forming fusion polypeptide: antibody complexes are described in Examples 1 and 2. In some embodiments the fusion polypeptide:antibody complex has a ratio of fusion protein to polypeptide of about 1:1, about 1:2, about 1:3, about 1:4, or about 1:5. In other embodiments the fusion polypeptide:antibody complex has a ratio of fusion protein to polypeptide of about 2:1, about 3:1, about 4:1, or about 5:1.

In some embodiments, the antibody in the complex with the polypeptide (or the antibody used in the methods disclosed herein, which may not necessarily be in a complex with the fusion polypeptide) is a monoclonal antibody, such as a human monoclonal antibody, a chimeric or humanized monoclonal antibody, a mouse monoclonal antibody, a murinized monoclonal antibody, a rat monoclonal antibody, or a rabbit monoclonal antibody. In some examples, the antibody is an inhibitory immune checkpoint antibody or an immunostimulatory antibody. Exemplary antibodies include, but are not limited to anti-GITR, anti-PDL1, anti-PD1, anti-OX40, anti-CTLA-4, anti-4-1BB, Anti-TIGIT, anti-VISTA, anti-CD73, anti-CD39, anti-HVEM, anti-BTLA, and anti-CD27. In other examples, the antibody is an antibody capable of blocking immunosuppressive cytokines or their production, for example, anti-TGFβ or anti-IL-10. In still further examples, the antibody is an anti-phagocytic antibody, such as an antibody that targets the "don't-eat-me" signal on cancer cells, for example, anti-CD47, anti-CD24, or anti-LILRB1.

Also provided are nucleic acids encoding the polypeptides disclosed herein. In some embodiments, the nucleic acid encodes a polypeptide including at least one immunoglobulin binding domain (e.g., at least one Fc binding domain) and at least one integrin binding domain. In some non-limiting embodiments, the nucleic acid encodes a polypeptide including two Fc binding domains (e.g., two Fc binding domains from Protein A, Protein G, or Protein Z) and an integrin binding domain of fibronectin 12-14 FNIII repeat, such as a nucleic acid sequence with at least 90% sequence identity (for example, at least 91%, at least 92%, at least 93%, at least 94%, at least 95%, at least 96%, at least 97%, at least 98% or at least 99% sequence identity) to nucleotides 34-1305 of SEQ ID NO: 2 or a nucleic acid that includes or consists of the nucleic acid sequence of nucleotides 34-1305 of SEQ ID NO: 2. In other examples, the polypeptide is encoded by a nucleic acid sequence with at least 90% sequence identity (for example, at least 91%, at least 92%, at least 93%, at least 94%, at least 95%, at least 96%, at least 97%, at least 98% or at least 99% sequence identity) to SEQ ID NO: 2 or a nucleic acid that includes or consists of the nucleic acid sequence of SEQ ID NO: 2

Also provided are nucleic acids encoding functional variants of the polypeptides or the domains described herein, which retain the biological activity of the polypeptide of which it is a variant or retains the biological activity of the particular domain. The nucleic acid encoding the functional variant can be at least about 80%, about 85%, about 90%, about 91%, about 92%, about 93%, about 94%, about 95%, about 96%, about 97%, about 98%, about 99% or more identical to the parent nucleic acid.

Also provided are vectors that include a nucleic acid encoding a polypeptide disclosed herein. The vector may also include a nucleic acid encoding one or more tags for protein purification, such as streptavidin (e.g., Strep-tagII), maltose binding protein (MBP), 6×Histidine (6×His), small ubiquitin like modifier (SUMO), or glutathione S transferase (GST), or a combination of two or more thereof (e.g., His-MBP) linked to the nucleic acid encoding the fusion polypeptide. In one non-limiting example, a 6×His tag is included at the N-terminal and/or C-terminal of the nucleic acid encoding the fusion polypeptide.

Also provided herein are host cells (for example, bacterial or mammalian cells) that include a disclosed nucleic acid or vector, and in some examples, express the disclosed polypeptides. The cells are transduced or transfected with a vector including a nucleic acid encoding the fusion polypeptide. In one non-limiting example, the host cell is an *Escherichia coli* cell. In some examples, the constructs are introduced into a vector suitable for expressing the polypeptide in the selected cell type. Numerous prokaryotic and eukaryotic systems are known for the expression and purification of polypeptides. For example, heterologous polypeptides can be produced in prokaryotic cells by placing a strong, regulated promoter and an efficient ribosome binding site upstream of the polypeptide-encoding construct. Suitable promoter sequences include the beta-lactamase, tryptophan (trp), phage T7 and lambda P L promoters. Methods and plasmid vectors for producing heterologous proteins in bacteria or mammalian cells are available.

Suitable prokaryotic cells for expression of large amounts of proteins include *Escherichia coli* and *Bacillus subtilis*. Often, proteins expressed at high levels are found in insoluble inclusion bodies; methods for extracting proteins from these aggregates are available. Recombinant expression of the disclosed polypeptides in prokaryotic cells may alternatively be conveniently obtained using commercial systems designed for optimal expression and purification of fusion proteins. Such fusion proteins typically include a tag that facilitates purification. Examples of such systems include: the pMAL protein fusion and purification system (New England Biolabs, Inc., Beverly, MA); the GST gene fusion system (Amersham Pharmacia Biotech, Inc., Piscataway, NJ); and the pTrcHis expression vector system (Invitrogen, Carlsbad, CA). Additional systems include the His6-tag (e.g., Roche Applied Science, Mannheim, Germany) or streptavidin binding peptide (e.g., Sigma-Aldrich, St. Louis, MO).

The disclosed polypeptides can also be expressed in eukaryotic expression systems, including *Pichia pastoris, Drosophila*, Baculovirus and Sindbis expression systems produced by Invitrogen (Carlsbad, CA). Eukaryotic cells such as Chinese Hamster ovary (CHO), monkey kidney (COS), HeLa, *Spodoptera frugiperda*, and *Saccharomyces cerevisiae* may also be used to express the disclosed polypeptides. Regulatory regions suitable for use in these cells include, for mammalian cells, viral promoters such as those from CMV, adenovirus or SV40, and for yeast cells, the promoter for 3-phosphoglycerate kinase or alcohol dehydrogenase.

In some examples, the vectors are introduced into the recipient cells as pure DNA (transfection) by, for example, precipitation with calcium phosphate or strontium phosphate, electroporation, lipofection, DEAE dextran, microinjection, protoplast fusion, or microprojectile guns. Alternatively, the nucleic acid molecules can be introduced by infection with virus vectors. Systems are developed that use, for example, retroviruses, adenoviruses, or Herpes virus.

One or more of the disclosed polypeptides produced in mammalian cells can be extracted following release of the protein into the supernatant and can be purified using an immunoaffinity column prepared using appropriate antibodies such as anti-CD74 trimerization domain antibodies. Alternatively, the disclosed polypeptides can be expressed as a chimeric protein with, for example, β-globin. Antibody to β-globin is thereafter used to purify the chimeric protein. Corresponding protease cleavage sites engineered between the β-globin gene and the nucleic acid sequence encoding the disclosed polypeptides are then used to separate the two polypeptide fragments from one another after translation. One useful expression vector for generating β-globin chimeric proteins is pSG5 (Stratagene, La Jolla, CA).

Expression of the polypeptides in prokaryotic cells will result in polypeptides that are not glycosylated. Glycosylation of the polypeptides at naturally occurring glycosylation target sites may be achieved by expression of the polypeptides in suitable eukaryotic expression systems, such as mammalian cells. In other examples, the polypeptide can be modified (for example, utilizing site-directed mutagenesis) to include desired post-translational modification sites, such as one or more sites for N-linked glycosylation, phosphorylation, or other modifications.

III. Methods of Using the Fusion Polypeptides

In some embodiments, methods of treating a subject with a tumor, such as a subject with cancer are disclosed herein. In some embodiments, the methods include treating or inhibiting a tumor in a subject. Also disclosed are methods of targeting one or more antibodies to a tumor or cancer cell. Finally, methods of inducing a T cell response to a tumor or cancer, for example, a memory T cell response to a tumor, in a subject are disclosed.

In some embodiments, the methods include treating a subject with a tumor by administering a fusion polypeptide disclosed herein and one or more antibodies to the subject. In other embodiments, the methods include inducing a T cell immune response to a tumor in a subject by administering a fusion polypeptide disclosed herein and one or more antibodies to the subject. In some examples, the T cell immune response is a systemic T cell immune response or a memory T cell response. As demonstrated herein a fusion polypeptide:antibody complex (Z-nectin:anti-OX40 Ab) led to increased memory effector CD8+ and CD4+ T-cells in tumors as characterized by CD44hi CD62L-surface expression. In addition, the treatment resulted in protection from tumor re-challenge, which is suggestive of a memory T cell response being generated. In further embodiments, the methods include targeting one or more antibodies to a tumor cell by contacting a tumor cell with a fusion polypeptide disclosed herein and one or more antibodies. The tumor cell may be contacted with the fusion polypeptide and the one or more antibodies in vitro or in vivo.

In some examples, the fusion polypeptide and the one or more antibodies (such as 1, 2, 3, or more antibodies) are administered to the subject or contacted with the tumor cell simultaneously or substantially simultaneously, for example as a mixture. In other examples, the fusion polypeptide and the one or more antibodies are administered to the subject or contacted with the tumor cell sequentially. The fusion polypeptide and the one or more antibodies can be administered in any order. In particular examples, the fusion polypeptide and the one or more antibodies are administered to the subject or contacted with the tumor cell within about 5 minutes, about 10 minutes, about 15 minutes, about 20 minutes, about 30 minutes, about 45 minutes, about 1 hour, about 2 hours, about 3 hours, about 4 hours, or about 6 hours or more. In other examples, a complex of a fusion polypeptide disclosed herein and one or more antibodies (such as 1, 2, 3, or more antibodies) is administered to the subject or contacted with the tumor cell. In further examples, two or more complexes of a fusion polypeptide and an antibody (which may be the same or different antibodies) are administered to the subject or contacted with the tumor cells. The disclosed methods can utilize one or more of the antibodies described in Section II; however, one of ordinary skill in the art can select other antibodies that can be used, depending on the condition being treated.

The fusion polypeptides or fusion polypeptide:antibody complexes described herein can be incorporated into pharmaceutical compositions. Such compositions typically include a pharmaceutically acceptable carrier. A "pharmaceutically acceptable carrier" includes any and all solvents, dispersion media, coatings, antibacterial and antifungal agents, isotonic and absorption delaying agents, and the like, compatible with pharmaceutical administration (see, e.g., *Remington: The Science and Practice of Pharmacy*, The University of the Sciences in Philadelphia, Editor, Lippincott, Williams, & Wilkins, Philadelphia, PA, 21$^{st}$ Edition, 2005). Examples of such carriers or diluents include, but are not limited to, water, saline, Ringer's solutions, dextrose solution, balanced salt solutions, and 5% human serum albumin. Liposomes and non-aqueous vehicles such as fixed oils may also be used. Supplementary active compounds can also be incorporated into the compositions. Actual methods for preparing administrable compositions include those provided in *Remington: The Science and Practice of Pharmacy*, The University of the Sciences in Philadelphia, Editor, Lippincott, Williams, & Wilkins, Philadelphia, PA, 21$^{st}$ Edition (2005).

Amounts and regimens for the administration of the fusion polypeptide and one or more antibodies (or a complex thereof) will be determined by the attending clinician. Effective doses for therapeutic application will vary depending on the nature and severity of the condition to be treated, the particular fusion polypeptide(s) and antibod(ies) selected, the age and condition of the patient, and other clinical factors. Typically, the dose range will be from about 0.1 μg/kg body weight to about 100 mg/kg body weight. Other suitable ranges include doses of from about 100 μg/kg to 10 mg/kg body weight, about 250 μg/kg to about 1 mg/kg body weight, or about 500 μg/kg to about 5 mg/kg body weight. In other examples, the dose range may be from about 1 ng to about 500 mg of fusion polypeptide or fusion polypeptide: antibody complex (such as about 10 ng to 10 mg, about 1 mg to 25 mg, about 10 mg to about 100 mg, about 50 mg to 250 mg, or about 100 mg to 300 mg).

Multiple doses of the composition can be administered to a subject. For example, the fusion polypeptide and antibod(ies) or fusion polypeptide: antibody complexes described herein can be administered daily, every other day, every three days, twice per week, weekly, every other week, every three weeks, monthly, or less frequently. A skilled clinician can select an administration schedule and number of doses based on the subject, the condition being treated, the previous treatment history, and other factors.

The composition is typically administered locally, for example peritumorally or intratumorally; however, injection or infusion to a tumor or close to a tumor (local administration) or administration to the peritoneal cavity can also be used. In other examples, the composition is administered at the site of a tumor at the time of surgery to resect or remove the tumor or at the time of radiofrequency ablation of the tumor. In some examples, the composition is administered with or without a hydrogel. Administration by other routes, including but not limited to, intravenous administration can also be used. Appropriate routes of administration can be determined based on factors such as the subject, the condition being treated, and other factors.

In some examples, the subject has cancer, such as a solid tumor or a metastasis of a solid tumor. Examples of solid tumors, such as sarcomas and carcinomas, include fibrosarcoma, myxosarcoma, liposarcoma, chondrosarcoma, osteogenic sarcoma, and other sarcomas, synovioma, mesothelioma, Ewing's tumor, leiomyosarcoma, rhabdomyosarcoma, colon carcinoma, lymphoid malignancy, pancreatic cancer, breast cancer (including basal breast carcinoma, ductal carcinoma and lobular breast carcinoma), lung cancers, ovarian cancer, prostate cancer, hepatocellular carcinoma, squamous cell carcinoma, basal cell carcinoma, adenocarcinoma, sweat gland carcinoma, medullary thyroid carcinoma, papillary thyroid carcinoma, pheochromocytoma, sebaceous gland carcinoma, papillary carcinoma, papillary adenocarcinoma, medullary carcinoma, bronchogenic carcinoma, renal cell carcinoma, hepatoma, bile duct carcinoma, choriocarcinoma, Wilms' tumor, cervical cancer, testicular tumor, seminoma, bladder carcinoma, and CNS tumors (such as a glioma, astrocytoma, medulloblastoma, craniopharyrgioma, ependymoma, pinealoma, hemangioblastoma, acoustic neuroma, oligodendroglioma, meningioma, melanoma, neuroblastoma, and retinoblastoma). In non-limiting examples, cancer that can be treated or inhibited by the methods disclosed herein include lung cancer, pancreatic cancer, breast cancer, head and neck squamous cell carcinoma, cervical cancer melanoma, liver cancer, gastric cancer, brain cancer, prostate cancer, and ovarian cancer.

In other examples, the subject has a hematological malignancy. Examples of hematological malignancies include leukemias, including acute leukemias (such as 11q23-positive acute leukemia, acute lymphocytic leukemia (ALL), T-cell ALL, acute myelocytic leukemia, acute myelogenous leukemia (AML), and myeloblastic, promyelocytic, myelomonocytic, monocytic and erythroleukemia), chronic leukemias (such as chronic myelocytic (granulocytic) leukemia, chronic myelogenous leukemia, and chronic lymphocytic leukemia), lymphoblastic leukemia, polycythemia vera, lymphoma, diffuse large B cell lymphoma, Burkitt lymphoma, T cell lymphoma, follicular lymphoma, mantle cell lymphoma, Hodgkin disease, non-Hodgkin lymphoma, multiple myeloma, Waldenstrom macroglobulinemia, heavy chain disease, myelodysplastic syndrome, hairy cell leukemia, and myelodysplasia.

In some examples, the subject may also be treated with one or more of surgery, radiation therapy, and chemotherapy either sequentially (e.g., before or after) or concurrently with the disclosed composition (such as a disclosed fusion polypeptide or fusion polypeptide:antibody complex). A skilled clinician can select appropriate additional therapies and their timing based on the type of tumor being treated, the condition of the subject, prior history, and other factors. Chemotherapeutic agents are selected based on the type of tumor being treated, and include alkylating agents, such as nitrogen mustards (such as mechlorethamine, cyclophosphamide, melphalan, uracil mustard or chlorambucil), alkyl sulfonates (such as busulfan), nitrosoureas (such as carmustine, lomustine, semustine, streptozocin, or dacarbazine); antimetabolites such as folic acid analogs (such as methotrexate), pyrimidine analogs (such as 5-fluorouracil, floxuridine, cytarabine, gemcitabine, capecitabine, azcitidine, and decitabine), and purine analogs (such as mercaptopurine, thioguanine, cladribine, clofarabine, fludarabine, or nelarabine); or natural products, for example vinca alkaloids (such as vinblastine, vincristine, or vindesine), epipodophyllotoxins (such as etoposide or teniposide), antibiotics (such as dactinomycin, daunorubicin, doxorubicin, bleomycin, plicamycin, or mitocycin C), and enzymes (such as L-asparaginase). Additional agents include platinum coordination complexes (such as carboplatin and cis-diamine-dichloroplatinum II, also known as cisplatin), substituted ureas (such as hydroxyurea), methyl hydrazine derivatives (such as procarbazine), and adrenocrotical suppressants (such as mitotane and aminoglutethimide); hormones and antagonists, such as adrenocorticosteroids (such as prednisone), progestins (such as hydroxyprogesterone caproate, medroxyprogesterone acetate, and magestrol acetate), estrogens (such as diethylstilbestrol and ethinyl estradiol), antiestrogens (such as tamoxifen), and androgens (such as testosterone proprionate and fluoxymesterone). Examples of the most commonly used chemotherapy drugs include adriamycin, melphalan (Alkeran®) Ara-C (cytarabine), carmustine, busulfan, lomustine, carboplatinum, cisplatinum, cyclophosphamide (Cytoxan®), daunorubicin, dacarbazine, 5-fluorouracil, fludarabine, hydroxyurea, idarubicin, ifosfamide, methotrexate, mithramycin, mitomycin, mitoxantrone, nitrogen mustard, paclitaxel (or other taxanes, such as docetaxel), vinblastine, vincristine, VP-16, gemcitabine (Gemzar®), irinotecan (CPT-11), leustatin, vinorelbine, imatinib (STI-571), Topotecan (Hycamtin®), capecitabine, and calcitriol.

EXAMPLES

The following examples are provided to illustrate certain particular features and/or embodiments. These examples should not be construed to limit the disclosure to the particular features or embodiments described.

Example 1

Construction and In Vitro Testing of Z-Nectin

Z-nectin is composed of the cell binding fragment of fibronectin (12-14 FNIII repeats) fused to the double Z-domains of protein A, which binds the Fc region of antibodies (FIG. 1). A DNA plasmid vector encoding Z-nectin flanked by 6×-His tags at both the N- and C-terminal ends was transformed into E. coli cells. The transformed E. coli cells were lysed by freeze-thawing in the presence of lysis buffer and Z-nectin was purified from the lysate using a Nickel-column. To further purify Z-nectin, a heparin column was used. (FIG. 3).

To test if Z-nectin could be used to attach antibodies to tumor cells, the Line-1 lung cancer cell line was used. Line-1 cells are derived from a spontaneous lung tumor in a BALB/c mouse, and the anti-H-2K$^b$ antibody that does not bind cells originating from BALB/c mice due to the absence of the H-2K$^b$ antigen was used in these studies. Varying concentrations of Z-nectin were incubated with varying concentrations of antibody in phosphate buffered saline (PBS) for 30 min, 4° C. The Z-nectin: antibody solution was then added to 0.3×10$^6$ tumor cells for 30 min, 4° C. If the antibody was not fluorescently conjugated, then FITC or APC-conjugated secondary-F(ab')$_2$ specific for the antibody was added for 30 min, 4° C. Antibody tethering to cells was assessed by flow cytometry.

Figure 6A:
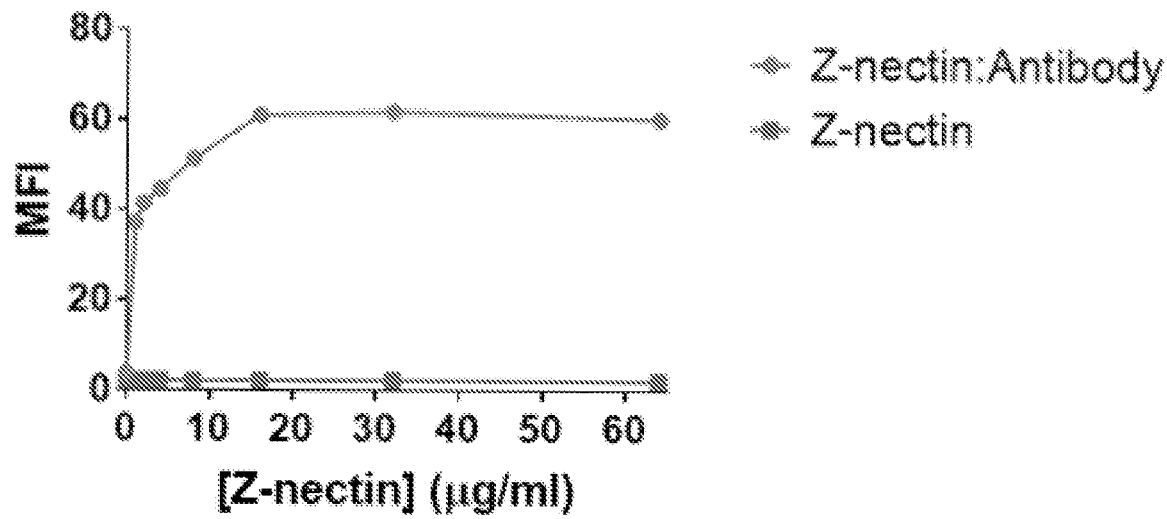
Figure 6B:
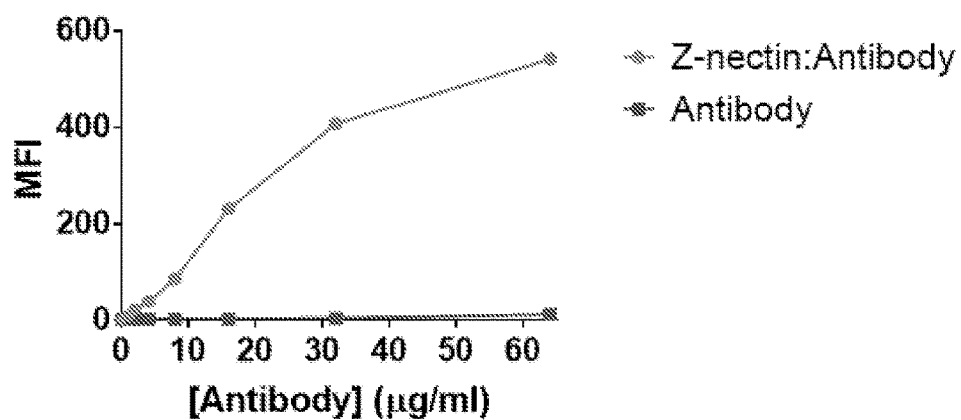
Figure 6C:
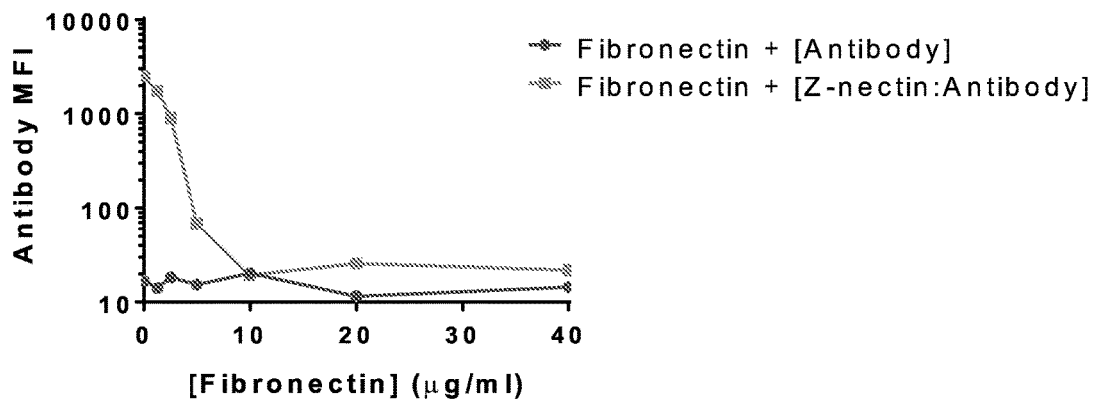
Figure 6D:
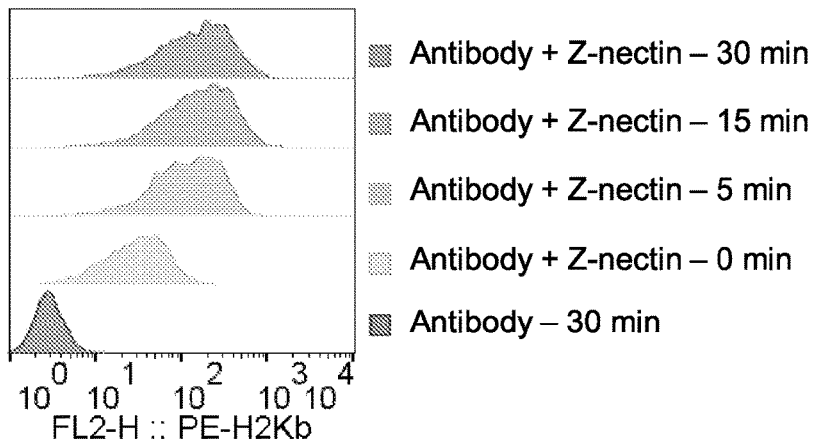

As shown in FIGS. 4A and 4B, Z-nectin was able to bind the anti-H-2Kb Ab to the surface of Line-1 cells. This was the case when Z-nectin was incubated with tumor cells prior to addition of the antibody (FIG. 4A) or when Z-nectin was pre-incubated with the antibody prior to addition to the tumor cells (FIG. 4B). No αH-2K$^b$ Ab binding was found with Ab incubation alone or in the presence of retronectin, a shortened version of fibronectin which contains most of the FNIII domains found within Z-nectin but does not contain the Z-domains (FIG. 5). In addition, increasing concentrations of Z-nectin, led to increased αH-2K$^b$ Ab binding to Line-1 cells (FIG. 6A). The same held true as the concentration of αH-2K$^b$ Ab was increased while Z-nectin was kept constant (FIG. 6B). Therefore, Z-nectin was able to attach antibody to Line-1 tumor cells in a Z-nectin and antibody concentration-dependent manner Moreover, increasing concentrations of recombinant fibronectin (lacking the protein A Z-domains) prevented Z-nectin's ability to tether antibody onto tumor cells in a competition assay (FIG. 6C), suggesting that antibody tethering was occurring specifically through Z-nectin's fibronectin domain. Z-nectin tethered antibody to tumor cell surfaces within 5 minutes (FIG. 6D). FIGS. 6E-6H show binding of murine and rat antibodies against costimulatory molecules OX40 (FIG. 6E), 4-1BB (FIG. 6F), GITR (FIG. 6G), and the clinically approved human-anti-PD-1 checkpoint inhibitor, Nivolumab (FIG. 6H) to Line-1 cells in the presence of Z-nectin.

Figure 7A:
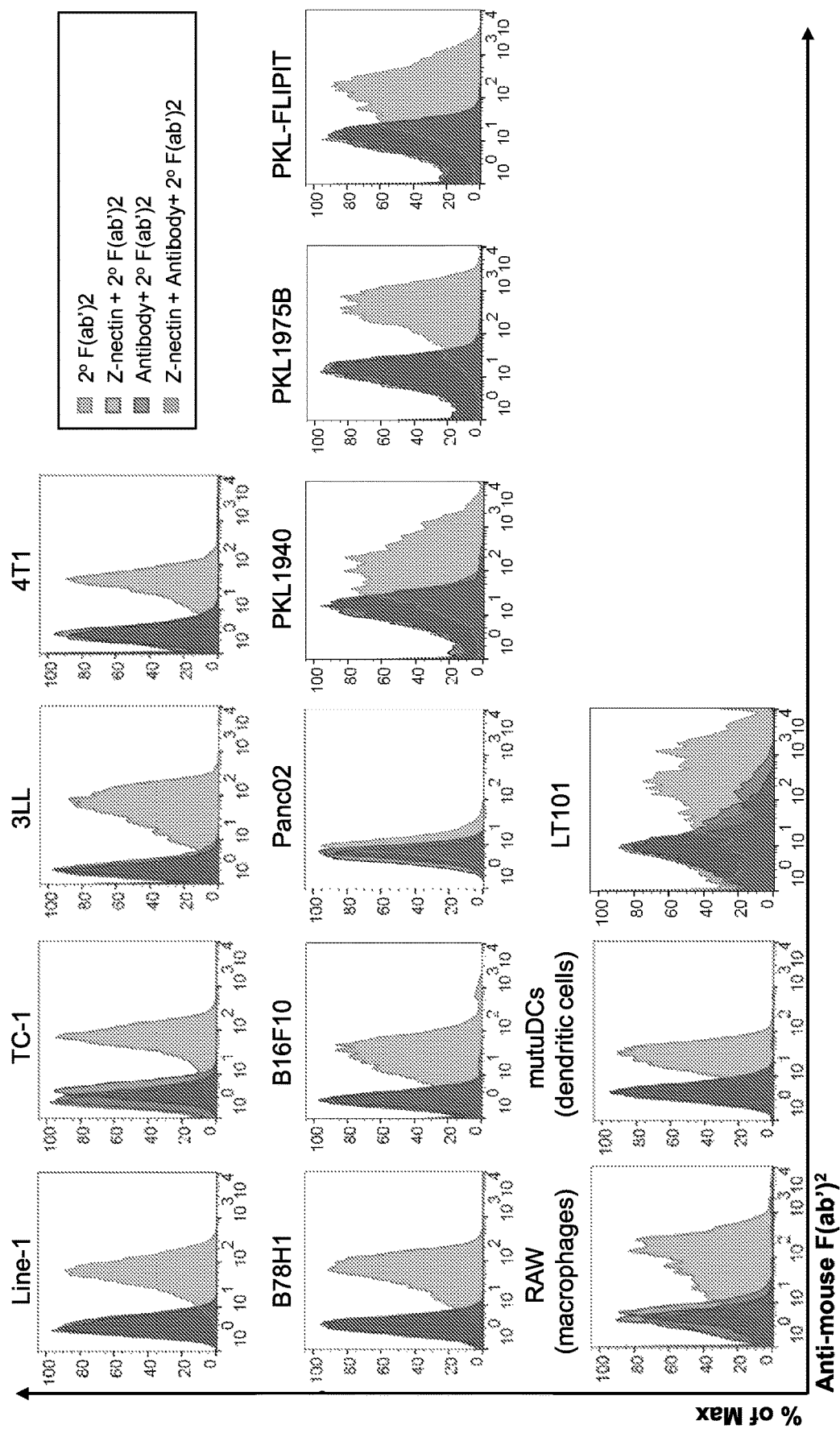
FIGS. 7A-7E shows characterization of Z-nectin tethering of different antibodies to different cell lines.

Z-nectin could be used to tether antibodies to different cell lines, including various mouse tumor cell lines and immune cell lines, such as dendritic cell or macrophage cell lines and human cells (FIG. 7A). To tether antibodies to different cells, a pre-complex of Z-nectin:Ab was made by incubating 1.2 μg of Z-nectin with 1.2 μg of anti-GP120 antibody for 30 minutes at 4° C. The pre-complexed Z-nectin:Ab solution was then added to 3×10$^5$ of the specified cells and incubated for an additional 30 minutes at 4° C. The cells were then washed and antibody binding was assessed by incubating the cells with 50 μL of 1:100 diluted APC-anti-mouse F(ab')$_2$, which cannot bind to Z-nectin, for 30 minutes at 4° C. The cells were washed and analyzed using a FACSCalibur or BD LSRII.

Figure 7B:
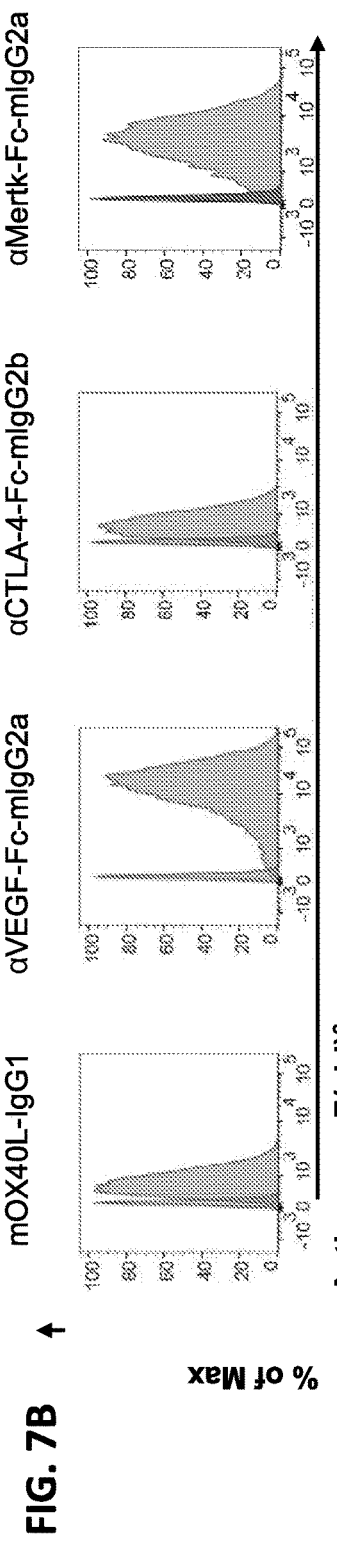
Figure 7C:
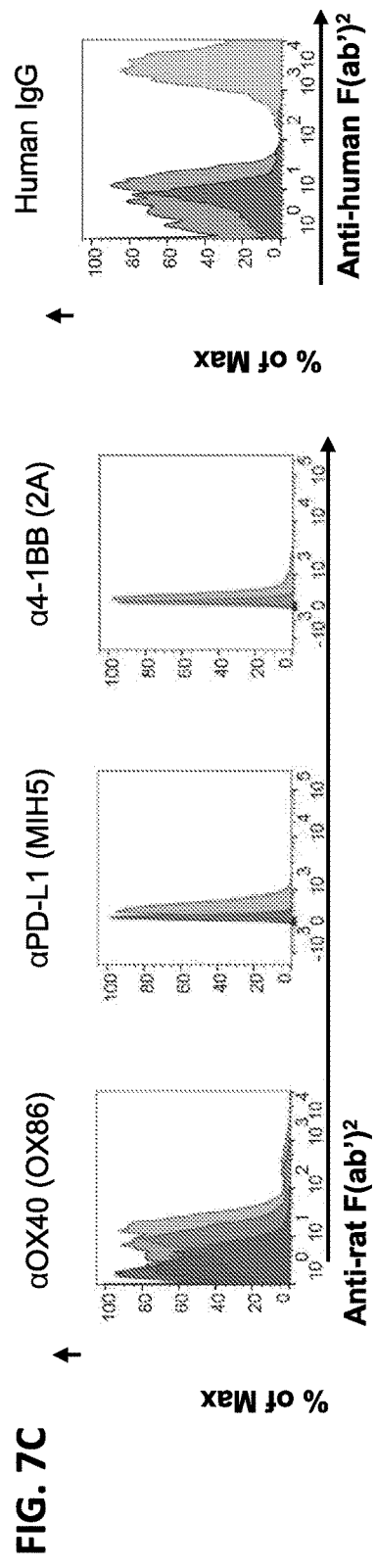
Figure 7D:
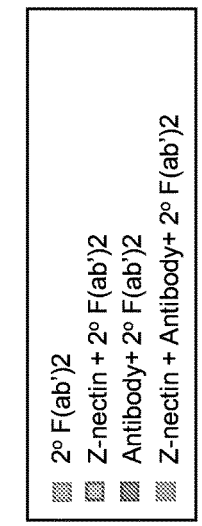
Figure 7E:
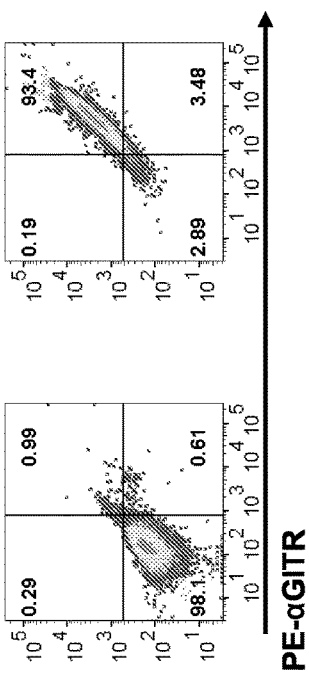

Z-nectin could tether many different murine IgG isotypes to Line-1 cells (FIG. 7B) demonstrating the versatility of the protein and its ability to be used with an expanse repertoire of antibodies and settings. Murine IgG2a was tethered via Z-nectin to a higher degree than IgG2b and IgG1, consistent with the binding pattern of the Z-domain of Protein A. In addition, although Protein A Z-domain is not considered to bind to rat IgG, we were able to detect some degree of tethering of rat IgG isotypes to Line-1 cells (FIG. 7C), albeit to a lesser degree. Human IgG, however, could be expressed at high levels on the tumor cell surface via Z-nectin (FIG. 7D), demonstrating the high degree of translatability of the protein into the clinic. Z-nectin can also tether multiple mAbs onto tumor cell surfaces simultaneously (FIG. 7E).

Figure 8:
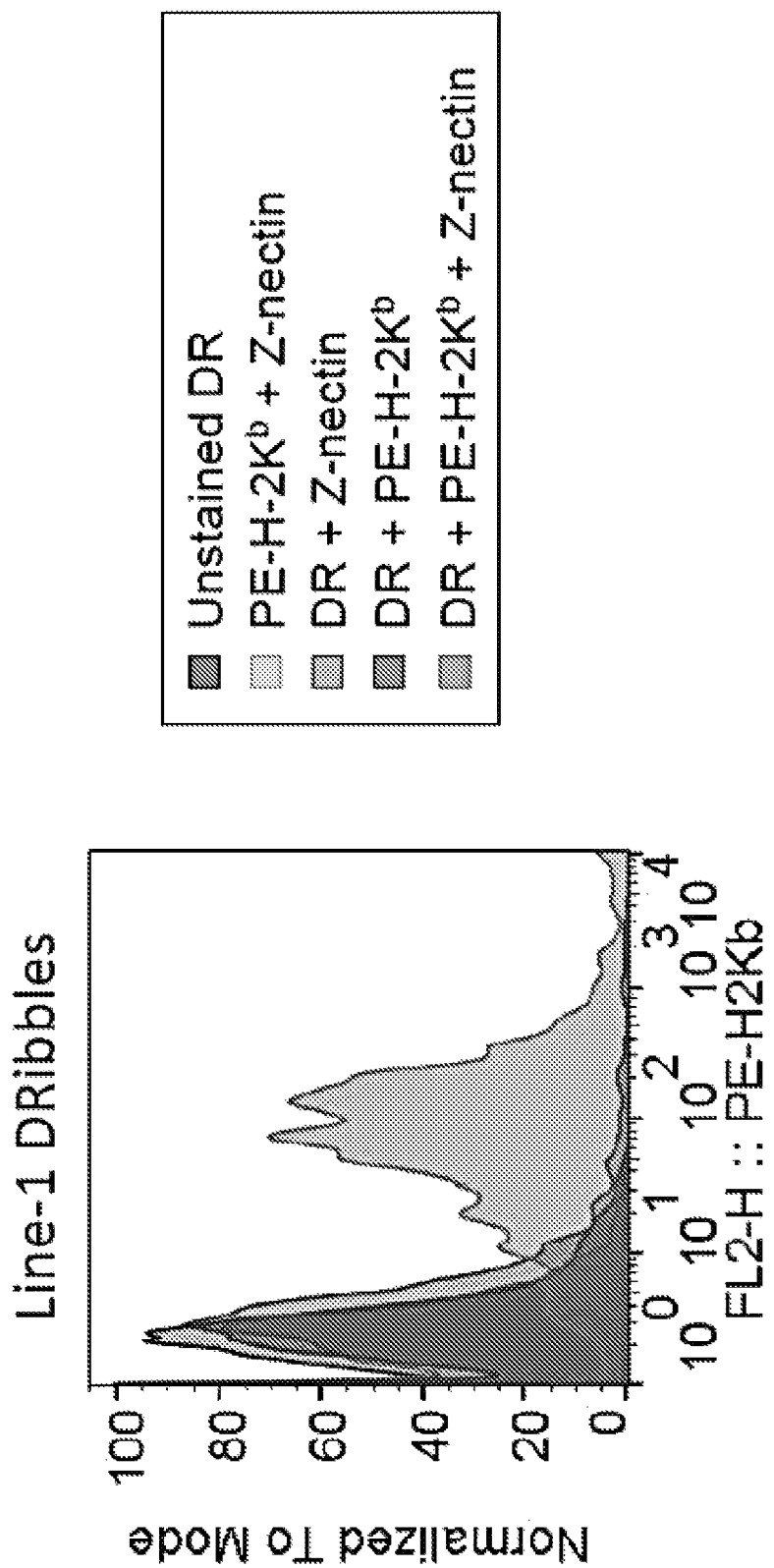
FIG. 8 is a plot showing tethering of anti-H-2Kb to Line-1 Dribbles by Z-nectin.

In addition, Z-nectin could tether anti-H-2Kb antibody to Line-1 DRibbles (FIG. 8). DRibbles are tumor-derived autophagosomes that contain many tumor antigens as well as adjuvants to activate an immune response. They were prepared from Line-1 tumor cells by adding 100 nmol/L bortezomib and 10 mmol/L NH$_4$Cl to the cells for 18 h. DRibbles were then released from the cells by three rounds of vigorous pipetting and collected by centrifuging the cells at 1000 rpm for 7 minutes. The supernatant containing DRibbles was further washed three times by centrifugation at 7500 rpm for 15 minutes at 4° C. The resulting DRibbles pellet was resuspended in 6% hetastarch and stored at −80° C. until further use.

To tether PE-conjugated-anti-H2-K$^b$ antibody to DRibbles, all stocks of antibody and Z-nectin were centrifuged at 15,000 rpm for 10 min to remove any insoluble particles. The supernatants containing solubilized PE-anti-H2-K$^b$ Ab and Z-nectin were used to form the Z-nectin:Ab pre-complex by incubating 1.2 μg of PE-anti-H2-K$^b$ with 1.2 μg Z-nectin for 30 minutes at 4° C. The pre-complexed Z-nectin:Ab solution was then added to 10 μg of the prepared Line-1 DRibbles and incubated further for 30 minutes at 4° C. The DRibbles solution was centrifuged at 15,000 rpm for 5 minutes and washed three times before analysis on the FACSCalibur. These experiments show that Z-nectin can tether antibody to not only a variety of cells but also to particles that are derived from cells and possibly other particles that express integrins.

Figure 9:
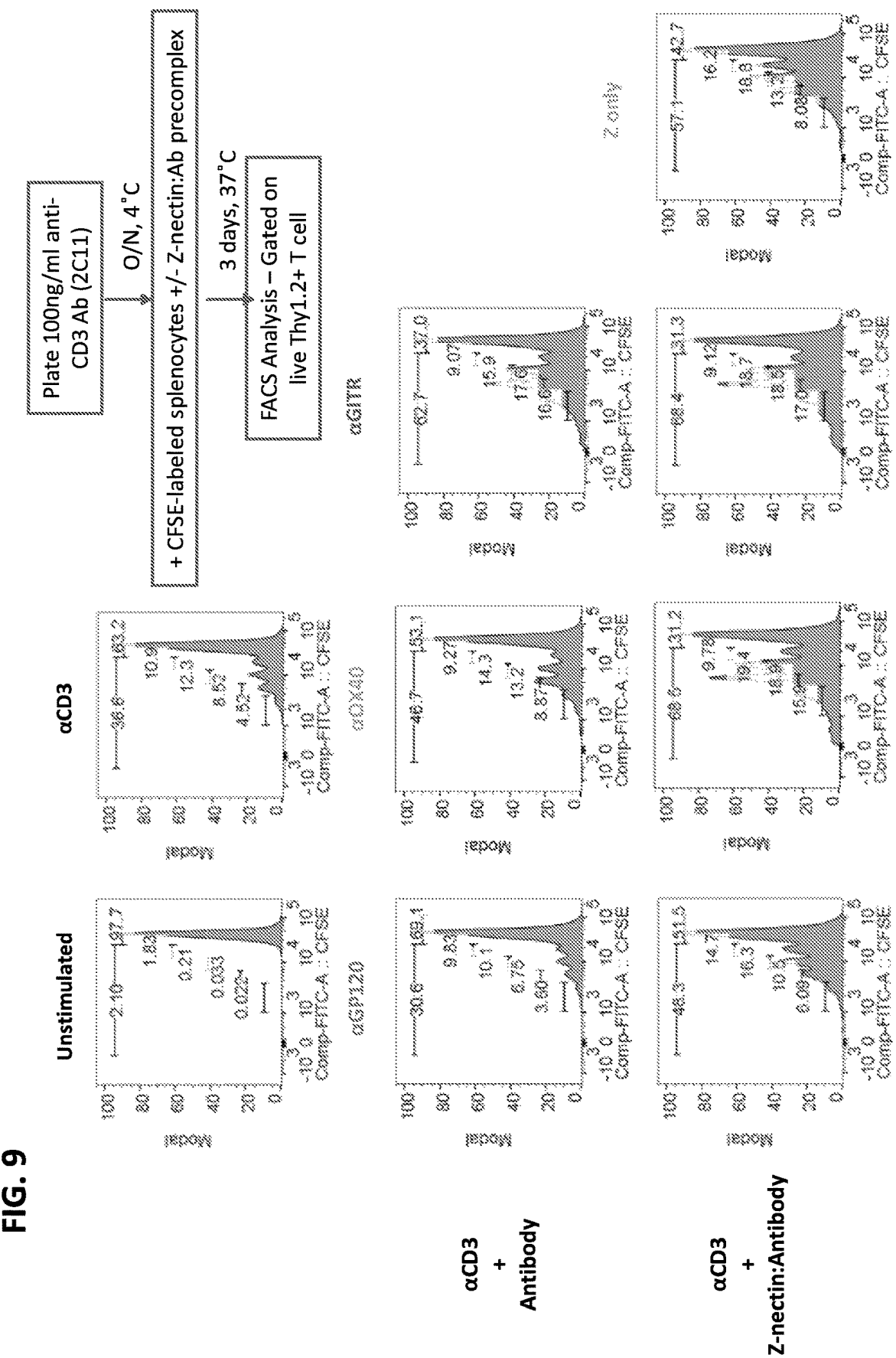
FIG. 9 shows agonist co-stimulatory antibodies are functional after pre-complexing with Z-nectin. CFSE-labeled splenocytes were incubated with Z-nectin:antibody pre-complexes and anti-CD3 antibody for 3 days, then analyzed by FACS analysis.
Figure 10A:
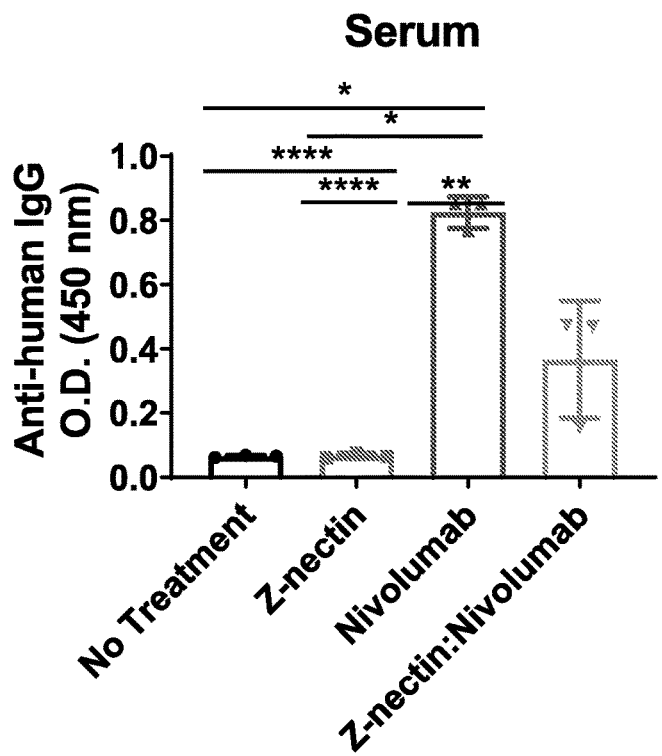
FIGS. 10A and 10B show antibody levels within the serum of mice after administering pre-complexed Z-nectin: nivolumab (FIG. 10A) or Z-nectin:anti-OX40-Fc-mIgG2a Ab (FIG. 10B) intratumorally into Line-1-tumor bearing mice. PE-OX86 binds the same epitope as the injected anti-OX40-Fc-mIgG2a, therefore, if the injected Ab is bound to Thy1.2+ T cells or CD4+ T cells, PE-OX86 MFI signal is lower than control. Therefore.
Figure 10B:
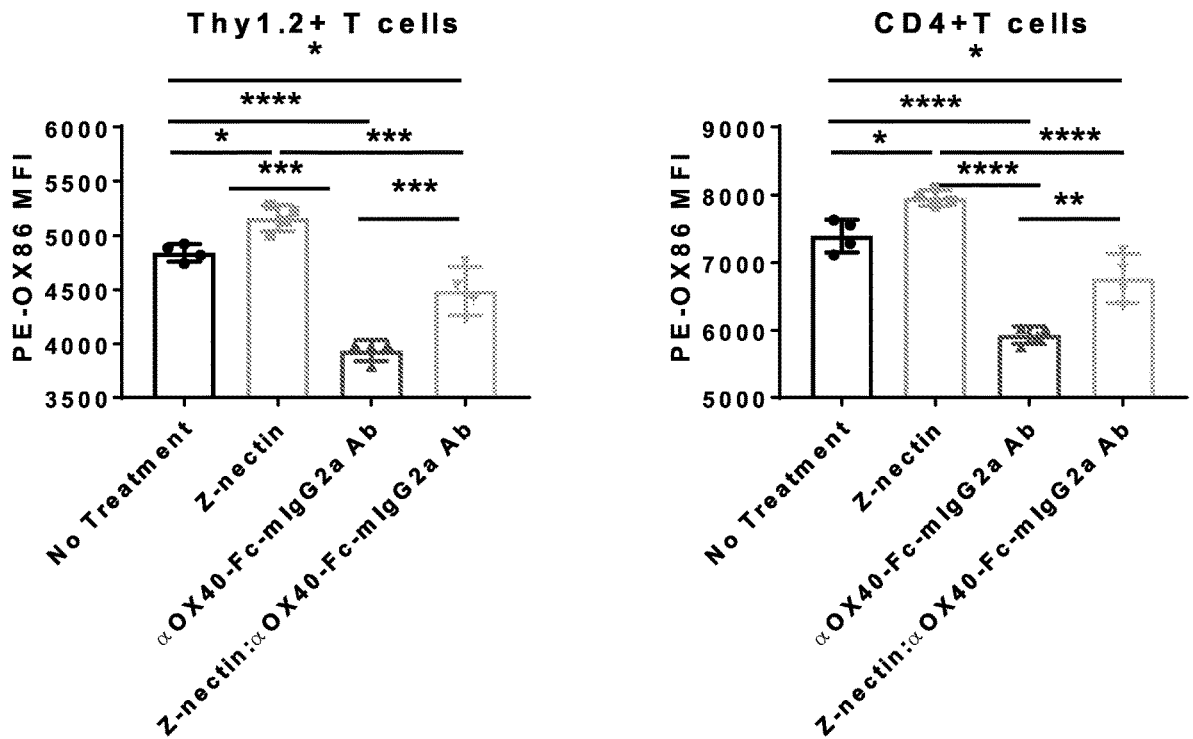

Before assessing in vivo efficacy of Z-nectin complexed with agonist antibodies against costimulatory molecules, the ability of Z-nectin-complexed antibodies to retain functional activity was first tested. Agonist antibodies against OX40 or GITR alone or pre-complexed with Z-nectin were incubated with CD3-stimulated CFSE-labeled splenocytes for 3 days, and T cell proliferation was assessed. Agonist antibody treatment alone led to increased proliferation of T cells compared to control CD3-stimulated cells or anti-GP120 antibody (FIG. 9, middle panel). Pretreatment of antibody with Z-nectin still promoted T cell proliferation, in some cases more than agonist antibody alone (FIG. 9, bottom panel). In addition, Z-nectin alone also led to T-cell proliferation suggesting that Z-nectin has T-cell activating capabilities.

Example 2

Z-Nectin Reduces Antibody Release into Serum after Intratumoral Injection

Since there was increased tethering of antibody to tumor cells with Z-nectin, it was hypothesized that intratumoral injections of antibody precomplex with Z-nectin would lead to increased retention of the antibody within the tumor microenvironment and less systemic release into the serum. To test this, anti-PD-1 (nivolumab) antibody levels within the serum of mice was tested after administering precomplexed Z-nectin:nivolumab intratumorally into Line-1-tumor bearing mice. By ELISA, nivolumab antibody was detected within the serum of mice injected with Z-nectin: nivolumab intratumorally, however at significantly lower levels compared to mice that received the same concentration of nivolumab alone intratumorally (FIG. 10A). Similar results were seen with intratumoral administration of Z-nectin precomplexed with murinized $\alpha$OX40 Ab (FIG. 10B). Interestingly, despite injecting equivalent antibody concentrations intratumorally, 48 h after intratumoral delivery, tumor lysates of mice treated with Z-nectin precomplexed with nivolumab had decreased Ab as detected by ELISA compared to mice intratumorally injected with nivolumab alone. These results might be explained by Z-nectin blocking the detection of the Ab via ELISA due to its complex with the Fc region, however, Z-nectin was undetectable in the serum of the mice by cell binding assays. Another possibility is that Z-nectin might be leading to enhanced turnover of the antibody that is attached to cell surfaces within the tumor. Nevertheless, these results demonstrated that intratumorally administering antibody precomplexed with Z-nectin led to decreased systemic release of the antibody from the tumor into the serum, suggesting that more antibody retention was observed within the tumors.

Example 3

Effect of Z-Nectin on Efficacy of Intratumorally Administered Antibodies

Figure 11A:
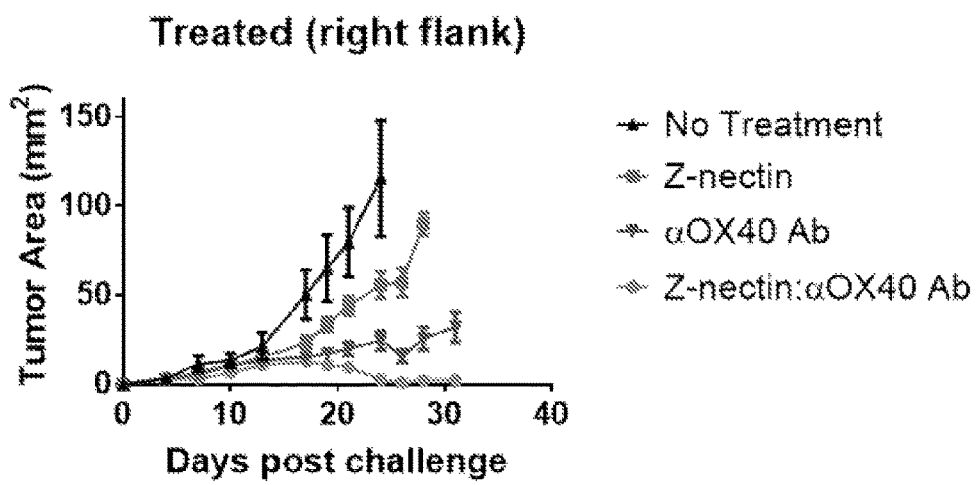
FIGS. 11A-11C show abscopal effect of Z-nectin:antibody treatment. Tumor growth in right flank (FIG. 11A) and left flank (FIG. 11B) was measured following intratumoral injection with Z-nectin precomplexed with αOX40-Fc-mIgG2a Ab in the right flank.
Figure 11B:
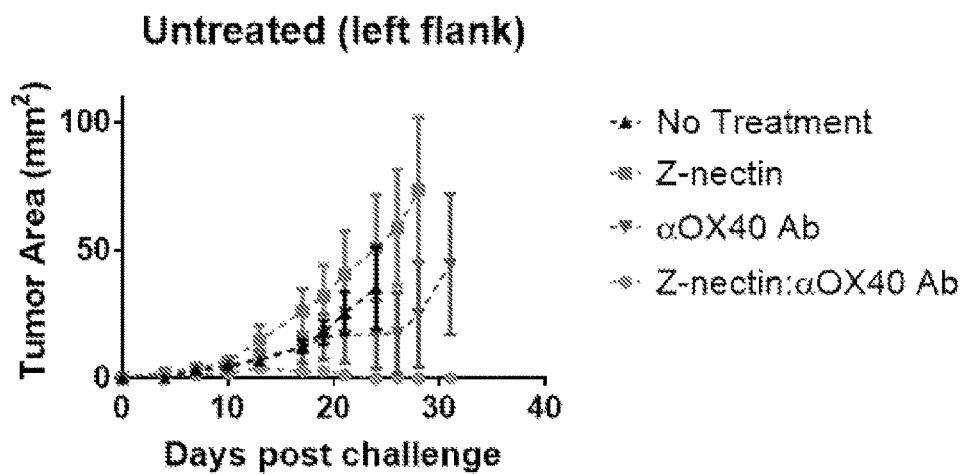
Figure 11C:
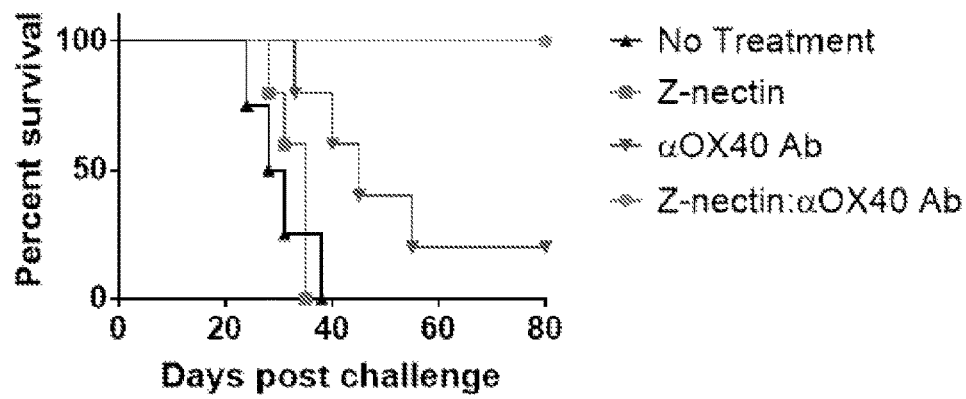

To test if Z-nectin can increase the efficacy of antibodies in vivo, Z-nectin was assessed with the intratumoral delivery of agonist antibodies targeting costimulatory TNFR family members. For drugs that are administered intratumorally, it is important to show the systemic abscopal response since not all tumors are accessible. Therefore, the abscopal response of intratumoral administration of Z-nectin precomplexed with murinized αOX40 Ab was tested. Using a dual flank tumor model system in which only one tumor is treated, Z-nectin precomplexed with αOX40-Fc-mIgG2a Ab was intratumorally injected four times 3 days apart. Mice treated with Z-nectin:αOX40 Ab in the right tumor led to enhanced tumor regression in both treated and untreated tumors and led to 100% cures compared to mice treated with αOX40 Ab only (20% cures) (FIGS. 11A-C). Intratumoral administration of αOX40 Ab alone did lead to delayed tumor growth of treated as well as untreated tumors compared to control mice, albeit not as well as Z-nectin:αOX40 Ab. Therefore, intratumoral delivery of Z-nectin:αOX40 Ab also led to enhanced systemic effects after intratumoral injection and survival of tumor-bearing mice compared to intratumoral αOX40 Ab alone.

Figure 12B:
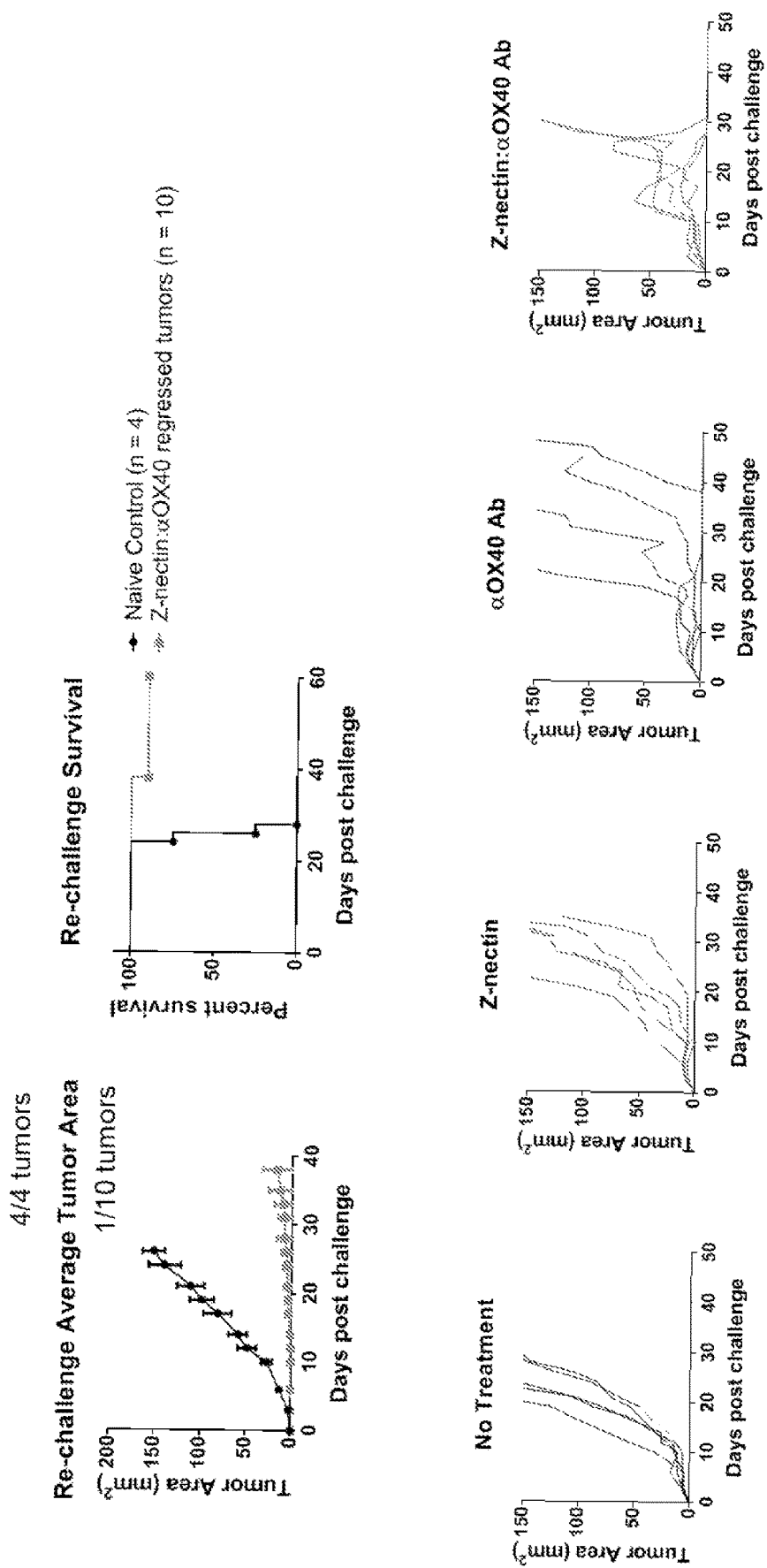
Figure 13A:
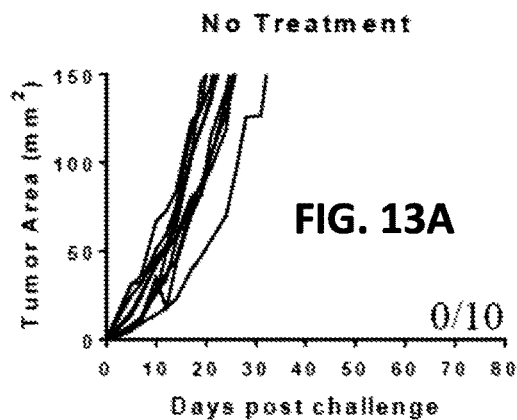
FIGS. 13A-13F are graphs showing tumor volume in mice with Line-1 tumors with no treatment (FIG. 13A), Z-nectin alone (FIG. 13B), anti-GITR antibody alone (FIG. 13C), Z-nectin and anti-GITR antibody (FIG. 13D) and a summary of the survival for all treatments (FIG. 13E).
Figure 13B:
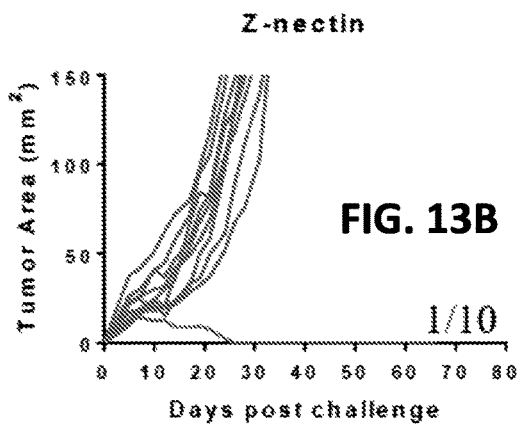
Figure 13C:
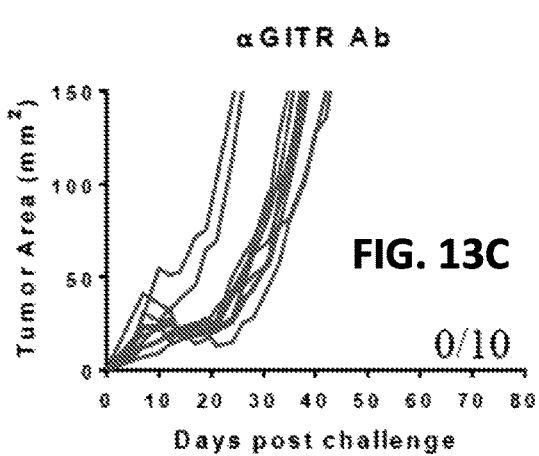
Figure 13D:
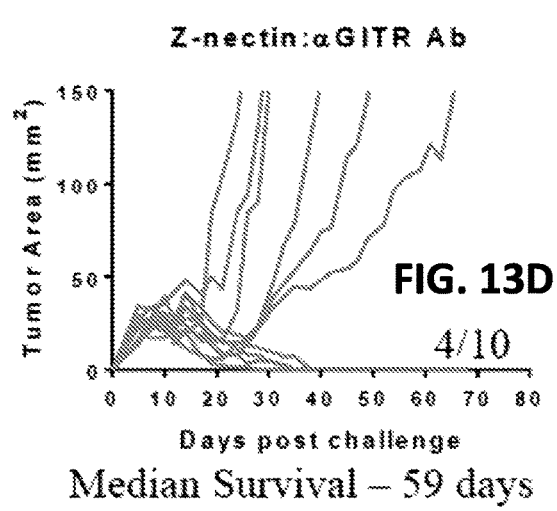
Figure 13E:
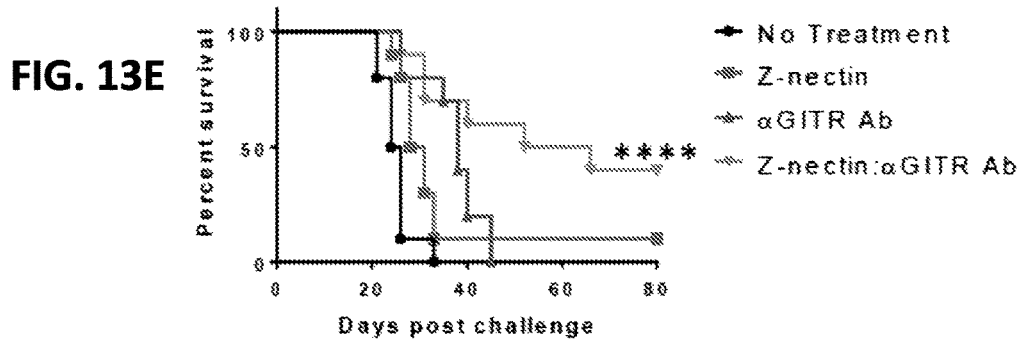
Figure 13F:
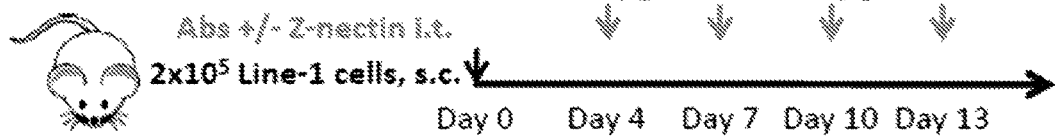

The efficacy of Z-nectin in a more aggressive single flank syngeneic tumor model with an initial implantation of higher number of Line-1 tumor cells (200,000 cells) was also assessed. Z-nectin:αOX40 Ab delayed tumor growth and increased survival (median survival—43 days) compared to untreated mice (median survival—21 days), Z-nectin treated (median survival—28 days), or αOX40 Ab treated (median survival—29 days) mice (FIG. 12A). 40% of mice were cured with Z-nectin:αOX40 Ab compared to 10% cures seen with αOX40 Ab alone. No cures were seen with Z-nectin alone or in the untreated group. Mice cured with Z-nectin:αOX40 Ab were protected against Line-1 tumor rechallenge compared to naïve control mice (FIG. 12B) with tumor outgrowth in only one out of ten mice after rechallenge, however the tumor that did develop began to grow at a delayed time (beginning at day 14) compared to naïve control mice which all grew tumors by 6 days. These results suggest that precomplexing with Z-nectin increases the efficacy of intratumoral αOX40 Ab administration by generating systemic antitumor immunity and memory responses.

The effect of Z-nectin on the efficacy of agonist anti-GITR antibody in vivo was also tested using the poorly immunogenic lung cancer model, Line-1, in BALB/c mice. Line-1 tumor-bearing mice were left untreated or were treated peritumorally with 50 µg Z-nectin, 50 µg anti-GITR antibody, or a combination of pre-complexed 50 µg Z-nectin and 50 µg anti-GITR antibody on days 4, 7, 10 and 13. As shown in FIGS. 13A-13F, mice treated with anti-GITR Ab peritumorally demonstrated an increased median survival of 38 days compared to untreated mice (median survival of 25 days) and mice treated with Z-nectin alone (median survival of 29.5 days). However, mice treated with Z-nectin:anti-GITR Ab had a further increased median survival of 59 days with 40% of mice demonstrating complete tumor regression, whereas no tumors fully regressed with anti-GITR Ab alone and only 10% regressed with Z-nectin alone.

Figure 14A:
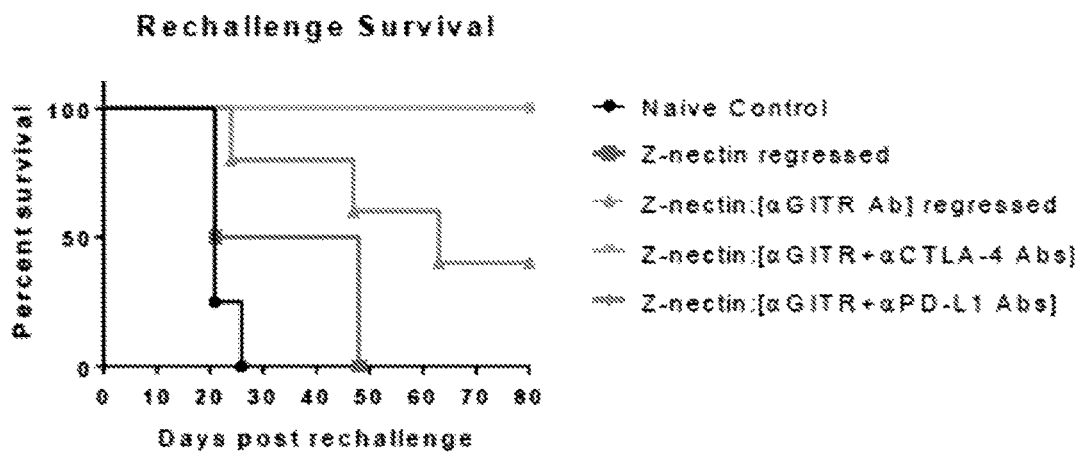
FIGS. 14A-14F are graphs showing survival of mice treated with Z-nectin and antibody following Line-1 re-challenge.
Figure 14B:
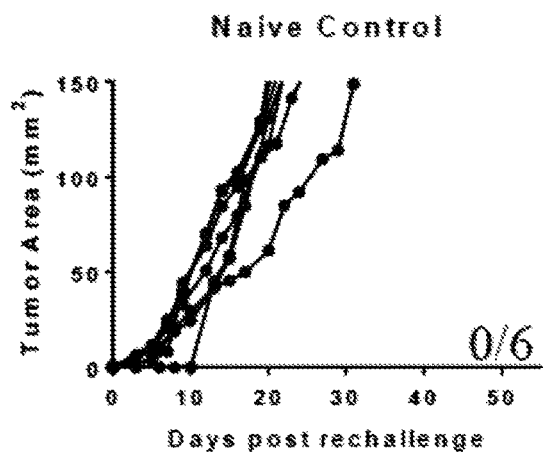
Figure 14C:
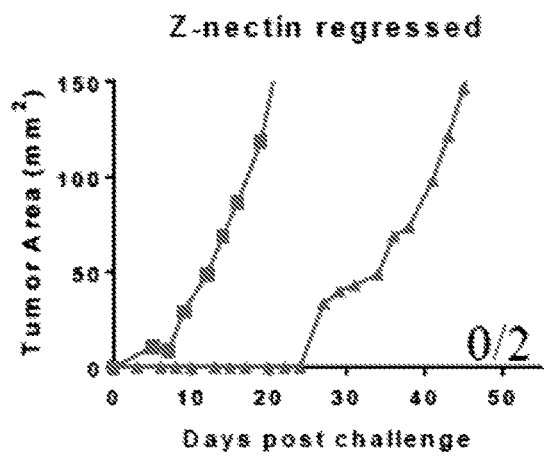
Figure 14D:
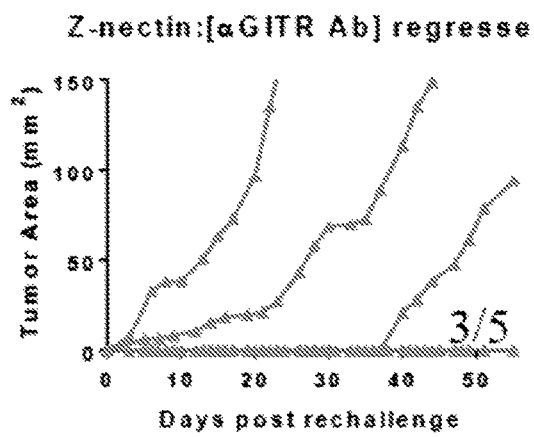
Figure 14E:
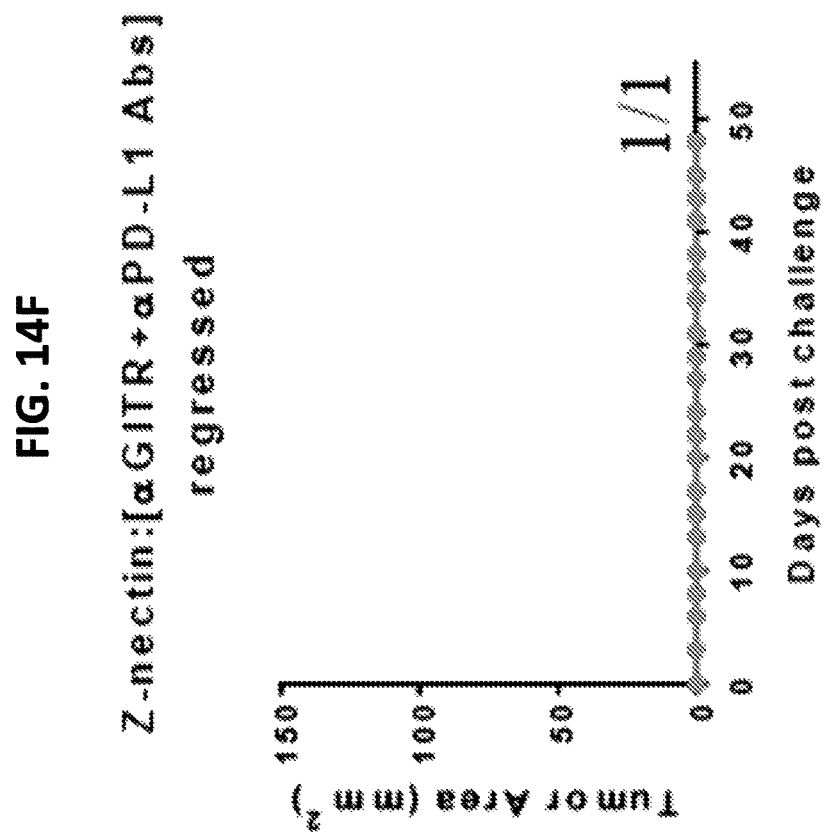
Figure 14F:
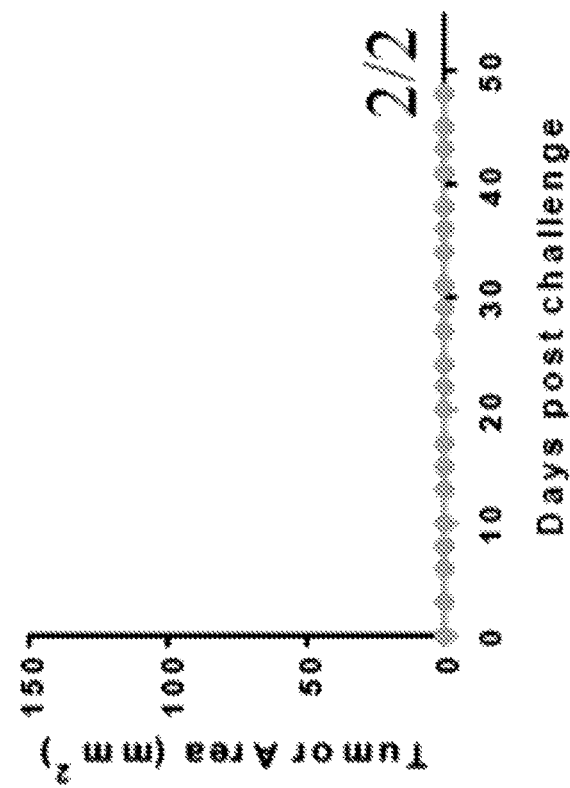
Figure 15A:
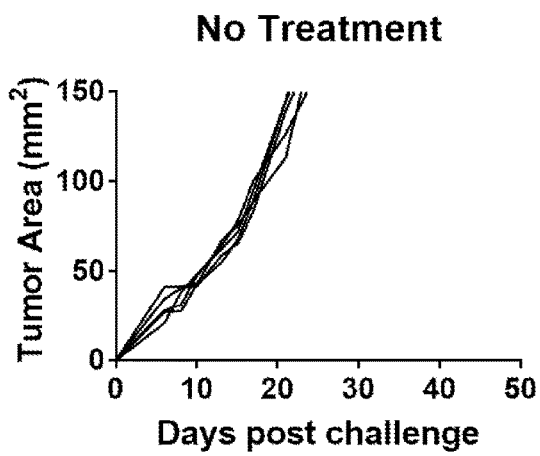
FIGS. 15A-15E show effect of Z-nectin on efficacy of anti-4-1BB antibody in Line-1 tumor bearing mice. Tumor area is shown for no treatment (FIG. 15A), Z-nectin alone (FIG. 15B), anti-4-1BB alone (FIG. 15C), and Z-nectin and anti-4-1BB (FIG. 15D). Survival is shown in FIG. 15E.
Figure 15B:
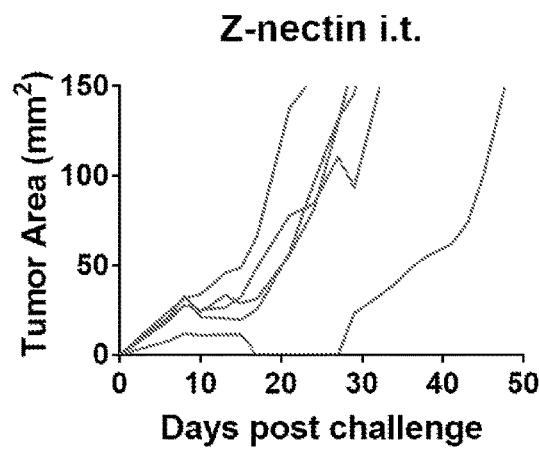
Figure 15C:
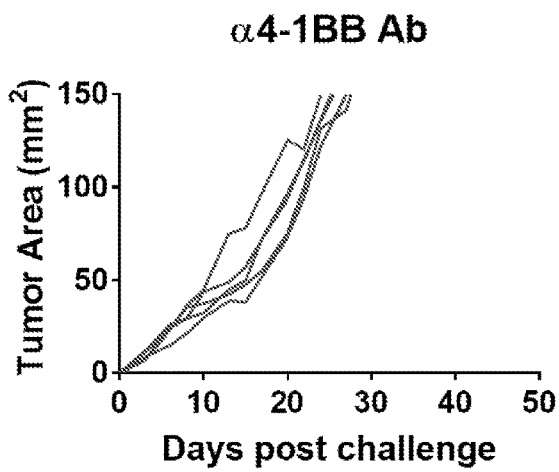
Figure 15D:
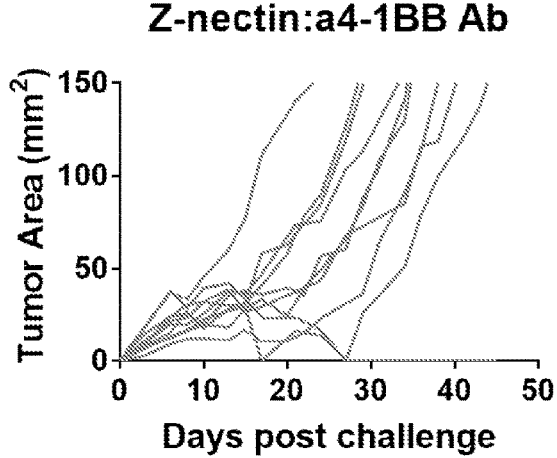
Figure 15E:
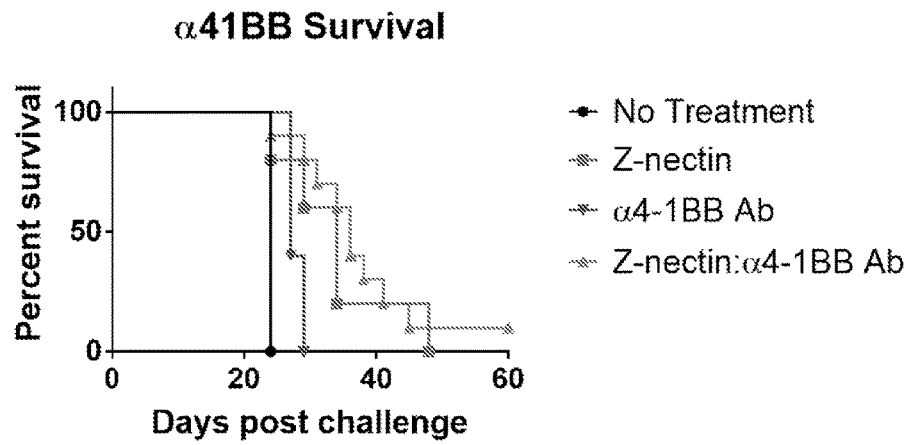

To determine if mice cured from Z-nectin:anti-GITR Ab treatment generated a memory immune response, cured mice were re-challenged with Line-1 cells on the opposite flank. As shown in FIG. 14D, 40% of previously cured mice remained tumor-free after re-challenge. The majority of the remaining mice that did grow tumors upon re-challenge demonstrated delayed tumor growth kinetics with a median survival of 63 days compared to 22 days seen in control previously naïve mice (FIG. 14B). Tumors grew after re-challenge in all mice previously cured by Z-nectin treatment alone (FIG. 14C). Mice previously cured by Z-nectin:[anti-GITR+anti-CTLA-4] or Z-nectin:[anti-GITR+anti-PDL1] treatment were all protected from Line-1 tumor re-challenge (FIGS. 14E and 14F). Therefore, Z-nectin:anti-GITR Ab peritumoral treatment generated a memory immune response that protected mice against tumor re-challenge.

The efficacy of Z-nectin precomplexed with α4-1BB Ab was also tested. Intratumoral administration of Z-nectin:α4-1BB Ab led to delayed tumor growth, increased cures (10%) and survival in tumor-bearing mice compared to mice receiving α4-1BB Ab alone (0% cures) (FIGS. 15A-15E). The slightly improved cures of tumor-bearing mice receiving Z-nectin:α4-1BB Ab compared to α4-1BB Ab alone could be due to the minimal binding to Z-nectin to the α4-1BB Ab compared to αOX40-Fc-mIgG2a or αGITR Ab (FIG. 7C). Overall, Z-nectin was able to increase the efficacy of agonist antibodies targeting TNFR family members when administered intratumorally.

Figure 16A:
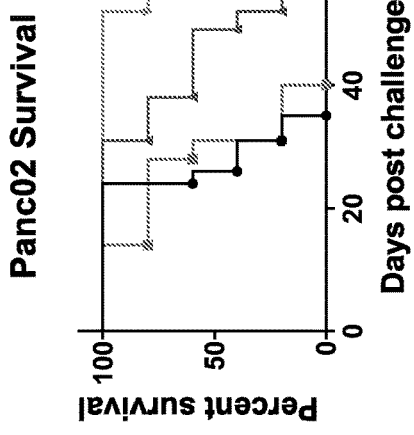
FIGS. 16A-16F show effect of Z-nectin on efficacy of anti-Ox40 antibody in Panc02 tumor bearing mice.
Figure 16B:
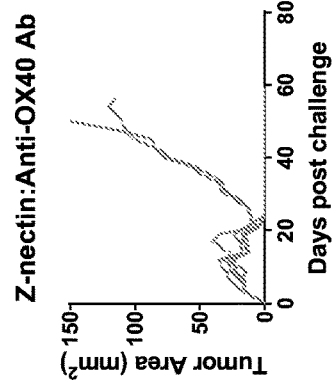
Figure 16C:
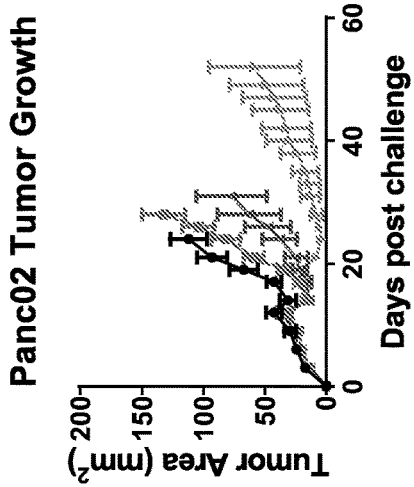
Figure 16D:
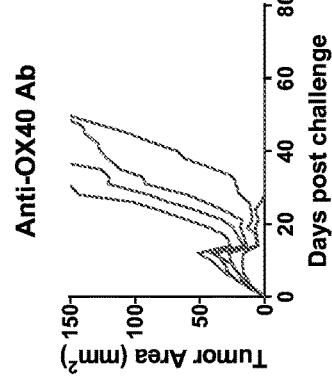
Figure 16E:
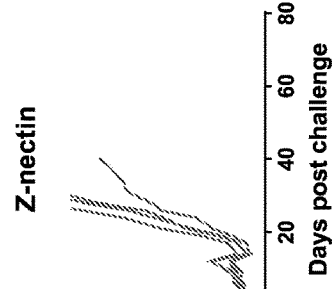
Figure 16F:
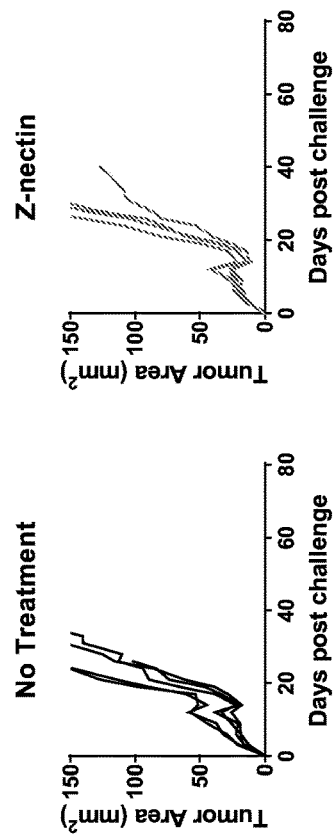
Figure 16G:
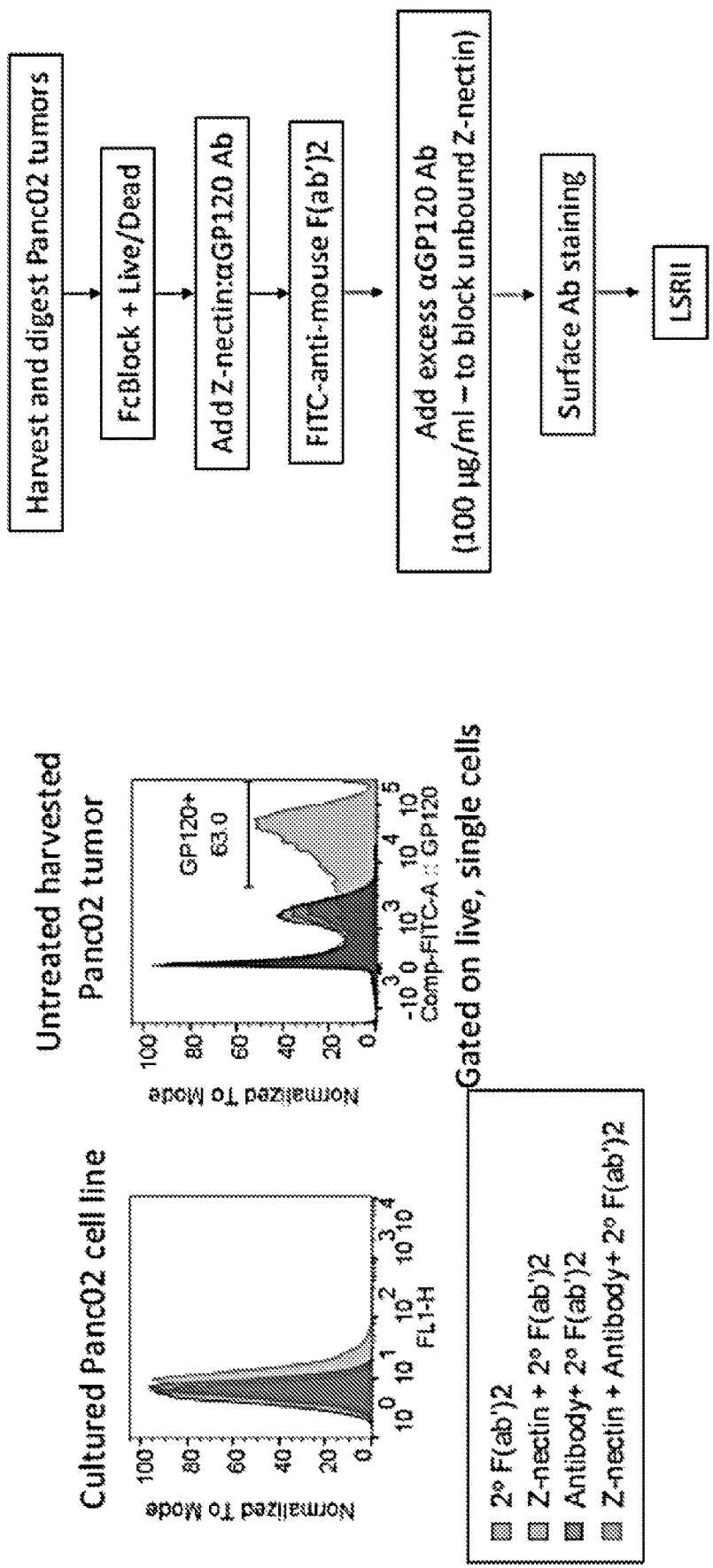
FIG. 16G shows binding of Z-nectin:antibody complex to cultured Panc02 cells and freshly harvested Panc02 cells.
Figure 17A:
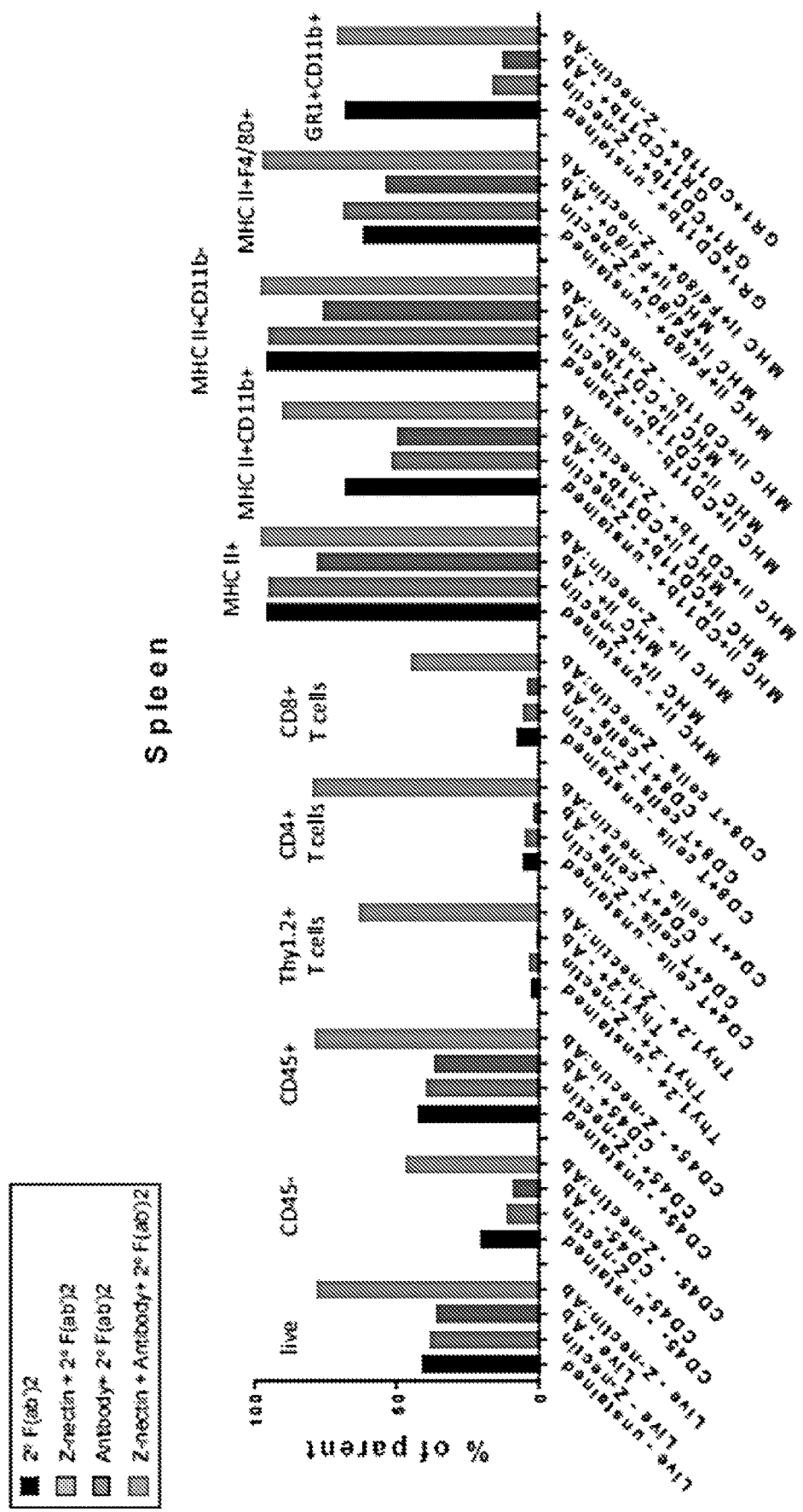
FIGS. 17A and 17B show Z-nectin tethers antibody to various immune cells in a Panc02 tumor (FIG. 17A) and in the spleen (FIG. 17B).
Figure 17B:
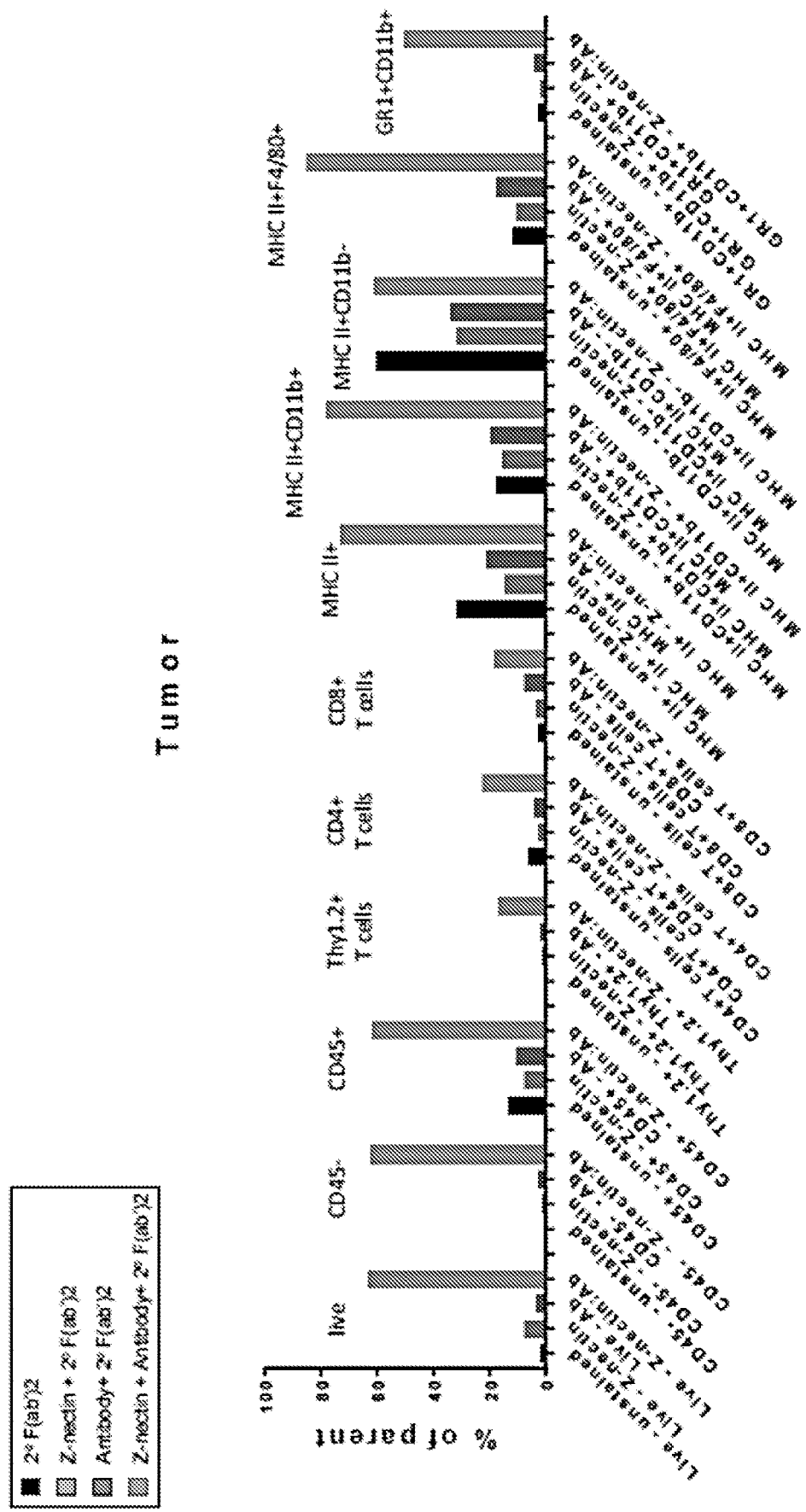

As Z-nectin tethered antibody to a variety of tumor cells in vitro, the in vivo efficacy in different tumor mouse models was tested. Z-nectin:αOX40 Ab treated mice delayed tumor growth and increased survival compared to αOX40 Ab alone in the Panc02 pancreatic cancer model (FIGS. 16A-16F). Interestingly, in vitro, Z-nectin could not attach Ab well to Panc02 tumor cells, however, the combination of Z-nectin:αOX40 Ab significantly improved survival of Panc02-tumor bearing mice. To test whether the tumor microenvironment may be contributing to Panc02 cells being able to be tethered by Z-nectin, tumor cells from growing Panc02 tumors were harvested. Z-nectin tethered antibody to freshly isolated Panc02 tumor cells, suggesting that in vivo, the tumor microenvironment may alter integrin receptor expression on Panc02 tumor cells allowing for better binding by Z-nectin (FIG. 16G). Z-nectin could also tether antibody to a variety of immune cells in a Panc02 tumor (FIG. 17A) and in the spleen (FIG. 17B).

Figure 18A:
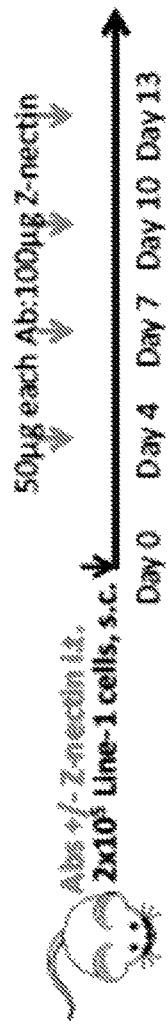
FIGS. 18A-18C show effect of treatment with Z-nectin and multiple antibodies in Line-1 tumor-bearing mice.
Figure 18B:
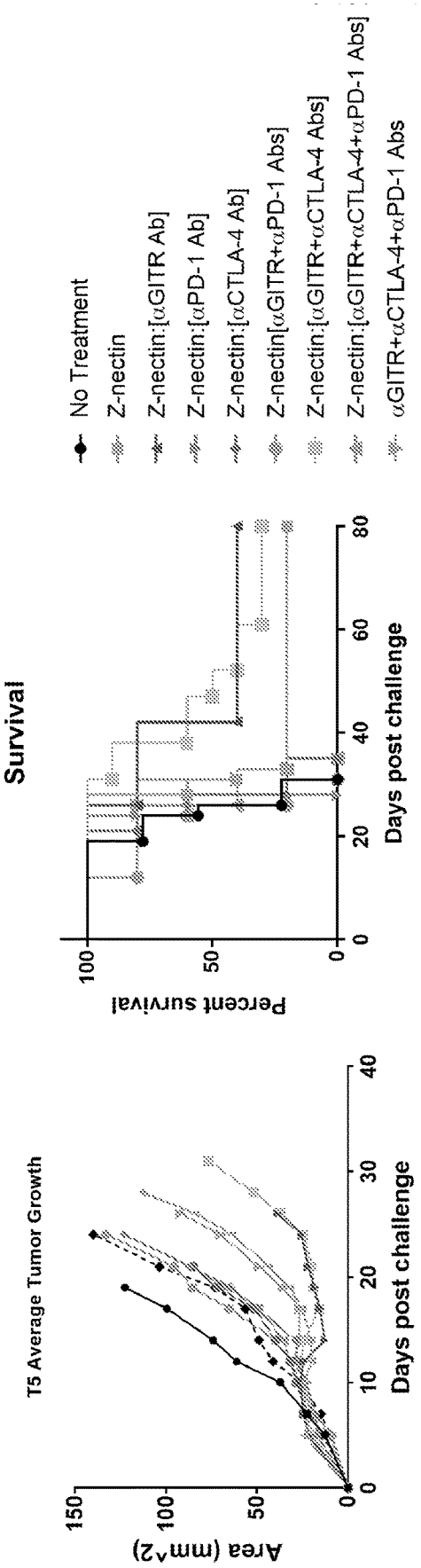
Figure 18C:
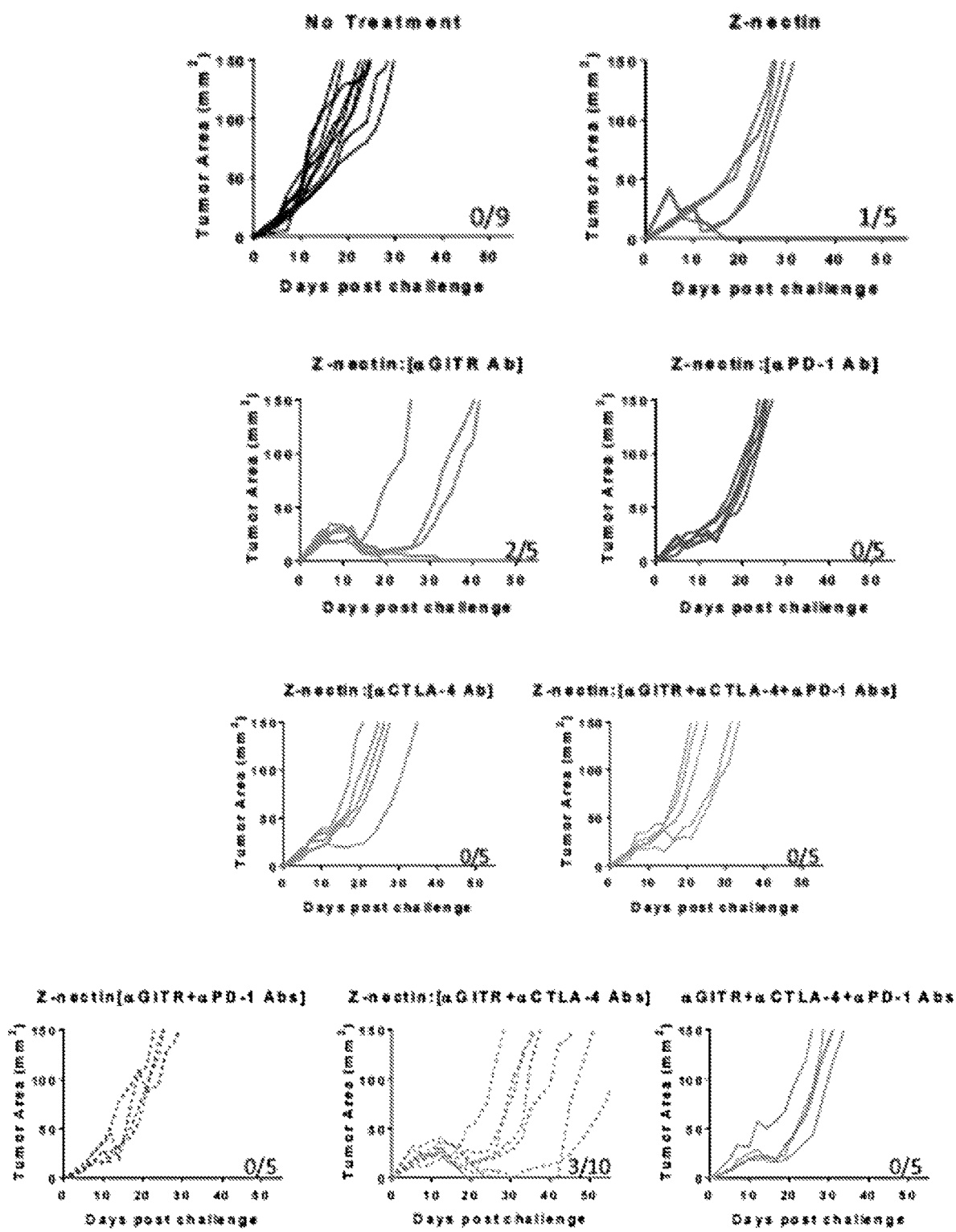

The efficacy of Z-nectin precomplexed with more than one antibody was also tested. Intratumoral administration of Z-nectin:anti-GITR antibody led to delayed tumor growth and increased survival (40%) compared to Z-nectin alone (FIGS. 18B and 18C). Combination treatment with Z-nectin:anti-GITR+anti-CTLA-4 also led to delayed tumor growth and survival, similar to Z-nectin:anti-GITR antibody (FIGS. 18B and 18C).

Example 4

Effects of Z-Nectin on T Cells

The therapeutic effects of the Z-nectin:αOX40 Ab combination therapy on T cells was assessed. Depletion of CD8+ T cells partially abrogated the effects of the combination therapy, whereas depletion of CD4+ T cells completely abrogated the effects of the combination therapy, suggesting the importance of T cells for the combination therapy's efficacy (FIGS. 19A and 19B).

Figure 20A:
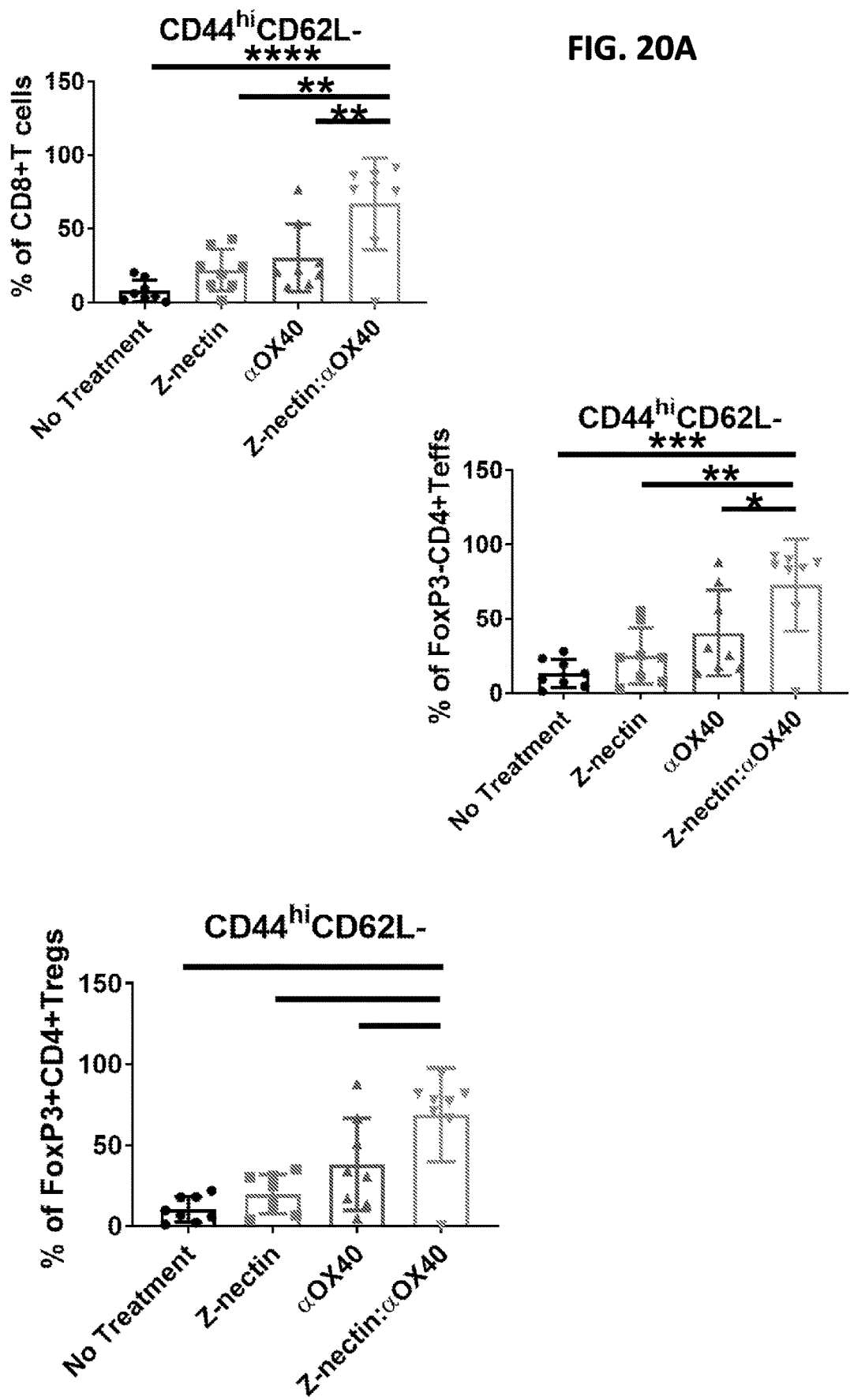
FIGS. 20A and 20B show percentages of $CD44^{hi}CD62L-$ CD8+ T cells within the tumor with the indicated treatments (FIG. 20A) and amounts of granzyme A, CD107, and Ki-67 as a percentage of CD8+ T cells (FIG. 20B).
Figure 20B:
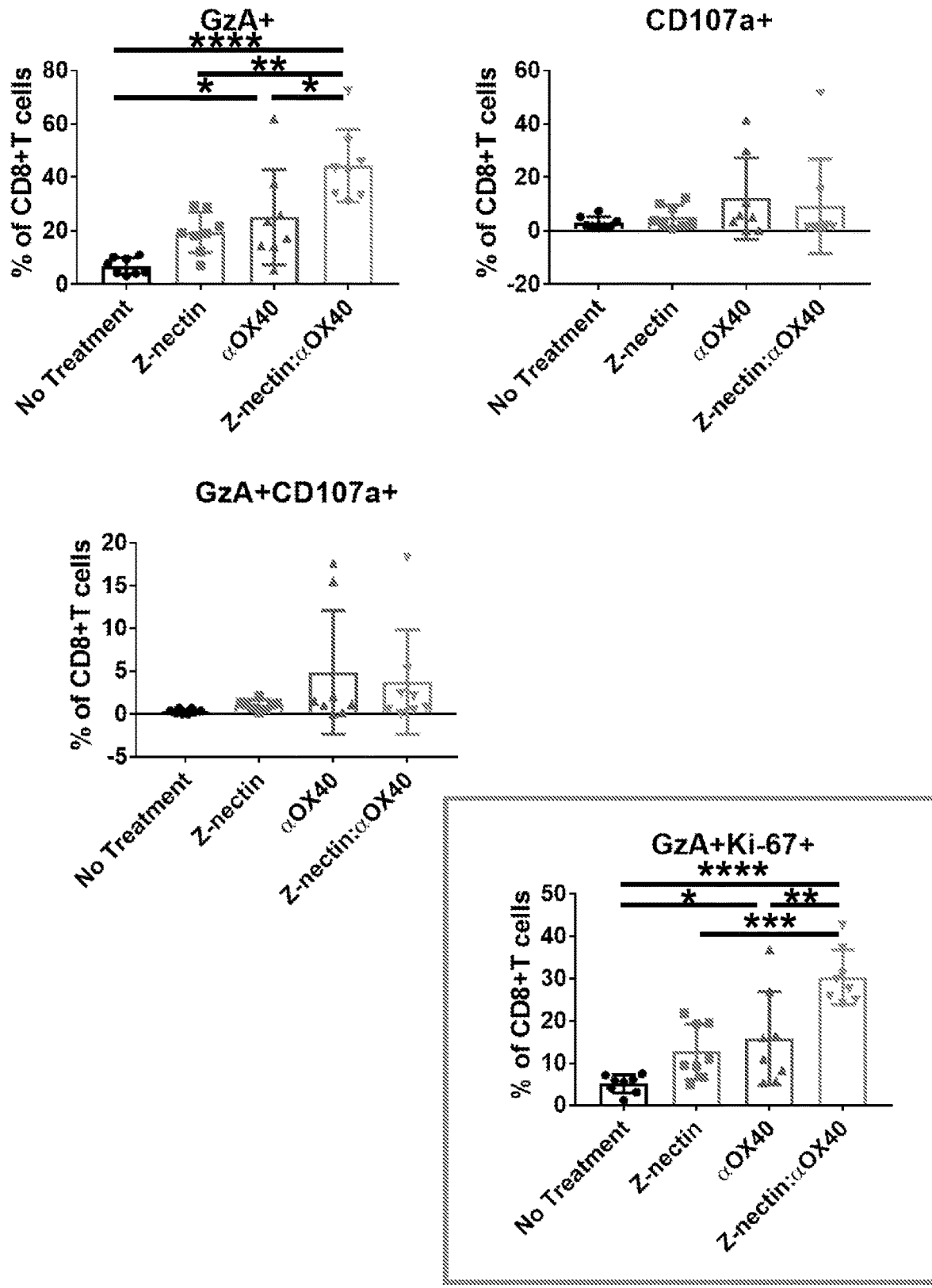

When assessing tumor infiltration, it was observed that mice treated with combination therapy had increased percentages of total CD3+ T cells (FIG. 19C). Mice treated with αOX40 Ab had increased CD8+ T cells within the tumors of the mice, with no additional difference seen with mice treated with combination therapy (FIG. 19D), suggesting that αOX40 Ab specifically increased CD8+ T cell infiltration in the tumor. However, when assessing effector function, Z-nectin:αOX40 Ab treatment led to significantly enhanced percentages of $CD44^{hi}CD62L\text{-}CD8+$ T cells within the tumor compared to all other treatment groups (FIG. 20A). CD8+ T cells within the tumors of Z-nectin:αOX40 Ab treated mice also had increased granzyme A and Ki-67, demonstrating enhanced cytolytic and proliferative capabilities, respectively (FIG. 20B and FIG. 21D).

Figure 21A:
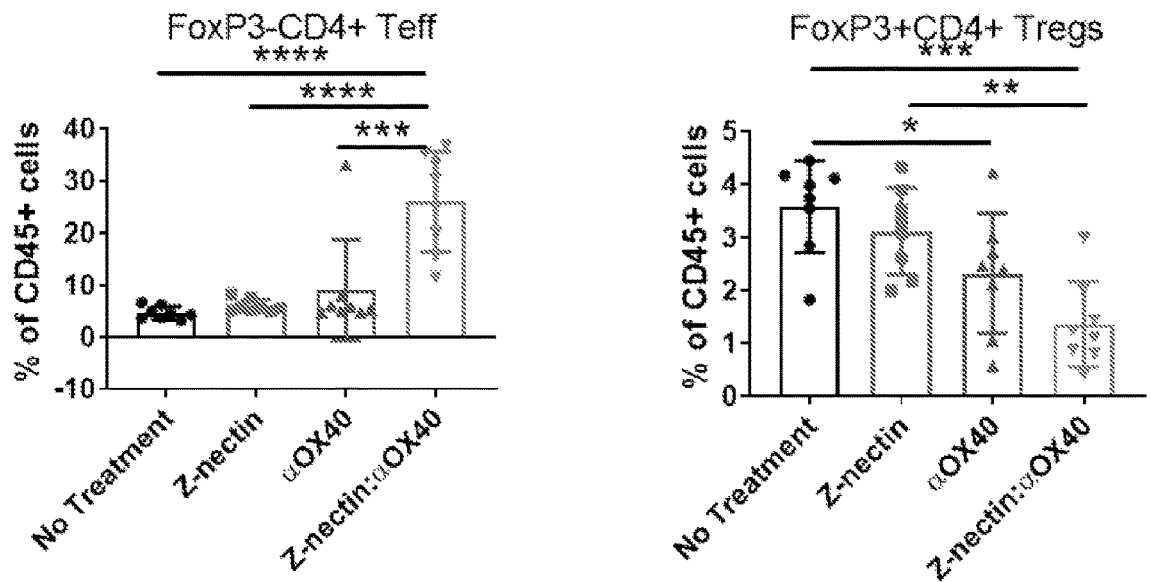
FIGS. 21A and 21B show additional effects of Z-nectin: αOX40 Ab combination therapy on T cells. FoxP3-CD4+ T effector cells (Teffs) and FoxP3+CD4+ T regulatory cells (Tregs) (FIG. 21A) and proliferating Ki-67+ cells (FIG. 21B) within the tumors of mice treated as indicated.
Figure 21B:
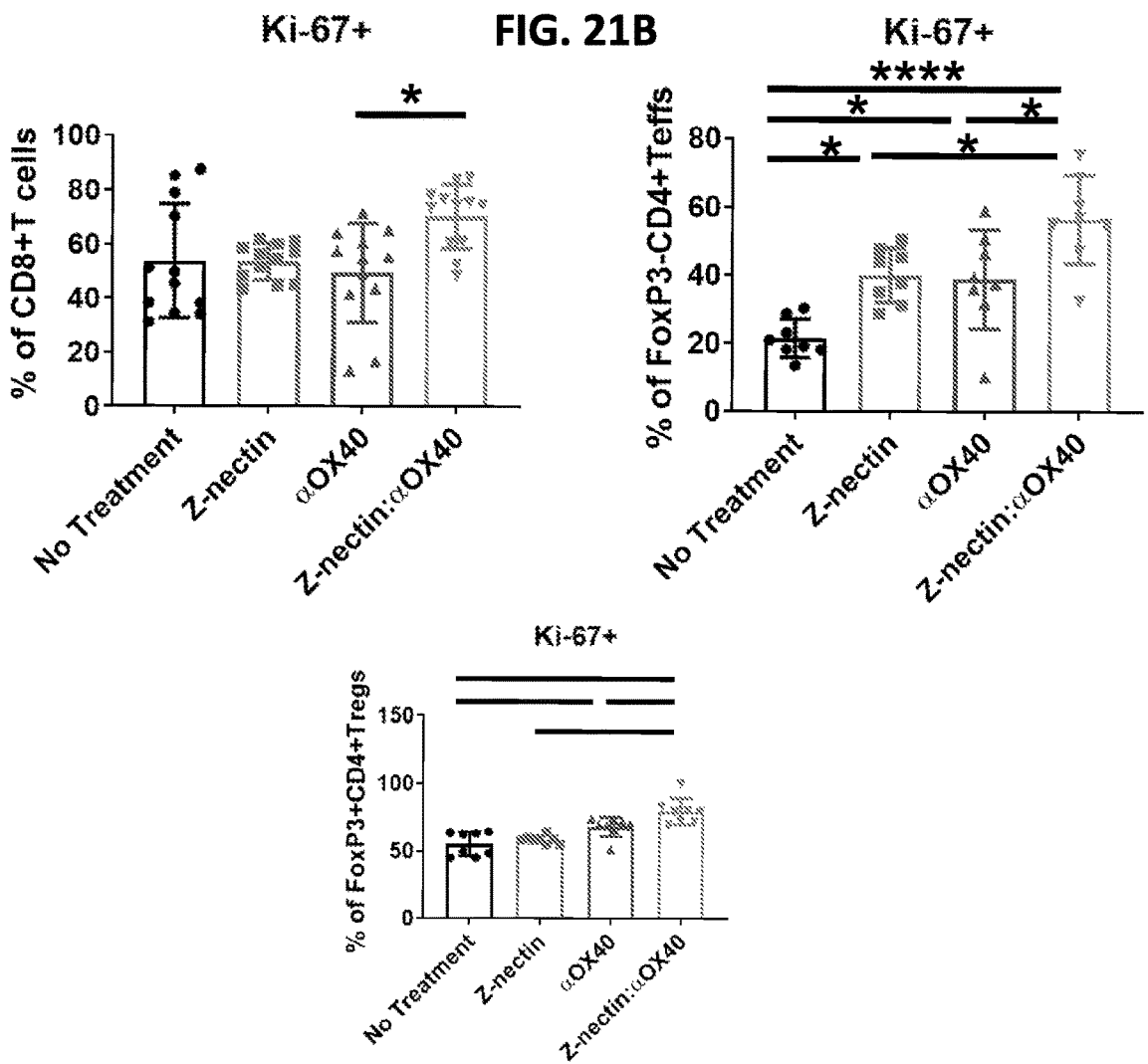

CD4+ T cells showed a significant increase in FoxP3-CD4+ T effector cells (Teffs) and decrease in FoxP3+CD4+ T regulatory cells (Tregs) within the tumors of mice treated with combination Z-nectin:αOX40 Ab compared to all other groups (FIG. 21A). This resulted in significantly increased ratios of CD4+Teff:Tregs in the combination therapy treated mice compared all other groups (FIG. 19G). The ratio of CD8+ T cells:Tregs was also increased in Z-nectin:αOX40 Ab treated mice, however this appeared to be driven by αOX40 Ab, as the ratio was increased in these mice, but not significantly (FIG. 19F). Of note, Z-nectin:αOX40 Ab combination therapy also led to dramatically enhanced percentages of effector memory $CD44^{hi}CD62L\text{-}CD4+$ T cells (FIG. 20A) and proliferating Ki-67+CD4+ Teffs (FIG. 21B).

Figure 22A:
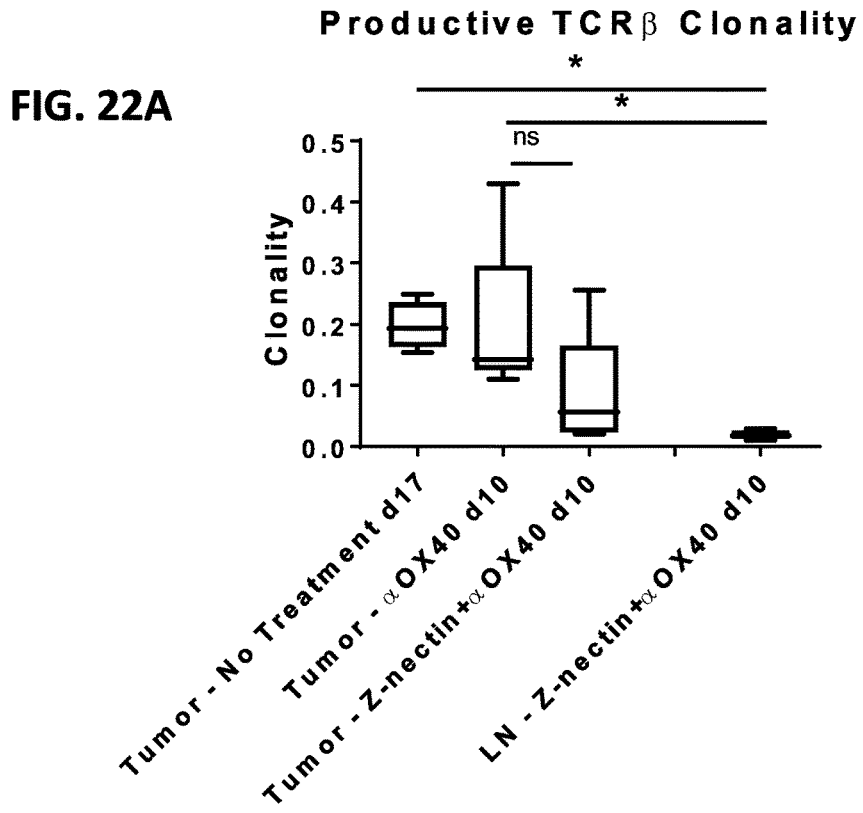
FIGS. 22A and 22B show productive TCRP clonality in mice with the indicated treatments (FIG. 22A) and the frequency of the top 500 clones in individual mice with each treatment (FIG. 22B).
Figure 22B:
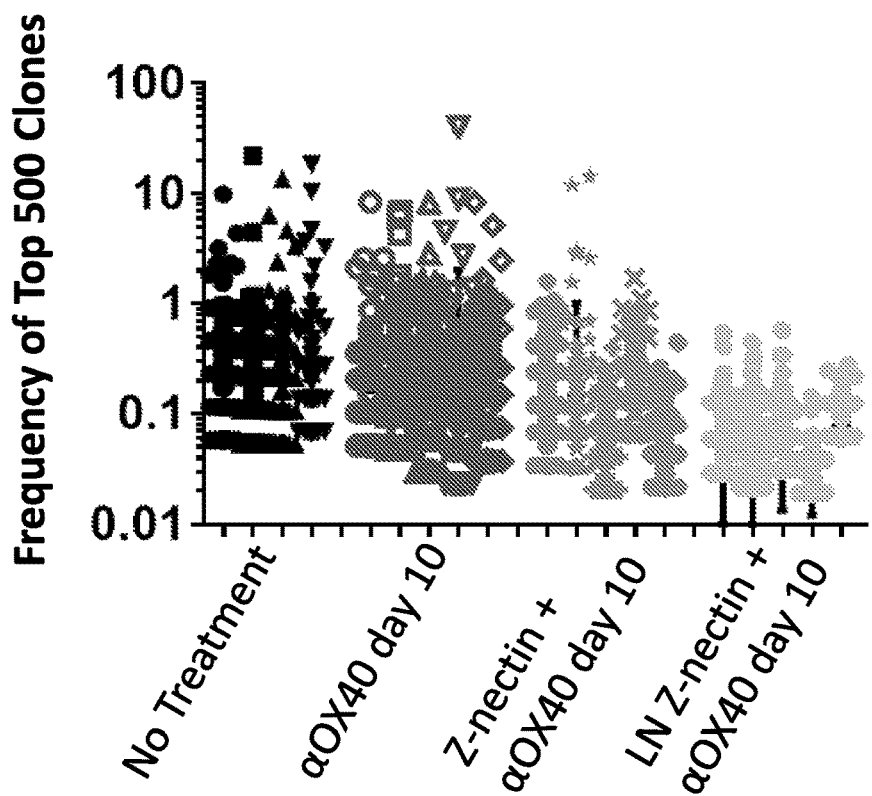

To assess if precomplexing αOX40 Ab with Z-nectin before administration led to the clonal expansion of T cells, TCRβ sequencing of total tumor T cells was performed. Mice treated with precomplexed Z-nectin:αOX40 Ab intratumorally trended towards decreased clonality compared to mice treated with αOX40 Ab or untreated mice, however T cell clonality was higher than that seen within the tumor draining lymph nodes (FIG. 22A). In addition, Z-nectin:αOX40 Ab treated mice had decreased frequency of the top 500 clones compared to mice treated with αOX40 Ab (FIG. 22B). These results suggest that precomplexing αOX40 Ab with Z-nectin before intratumoral administration decreases T cell clonality compared to αOX40 Ab treatment alone, suggesting that an expansion of T cell diversity is observed upon Z-nectin inclusion.

Figure 23A:
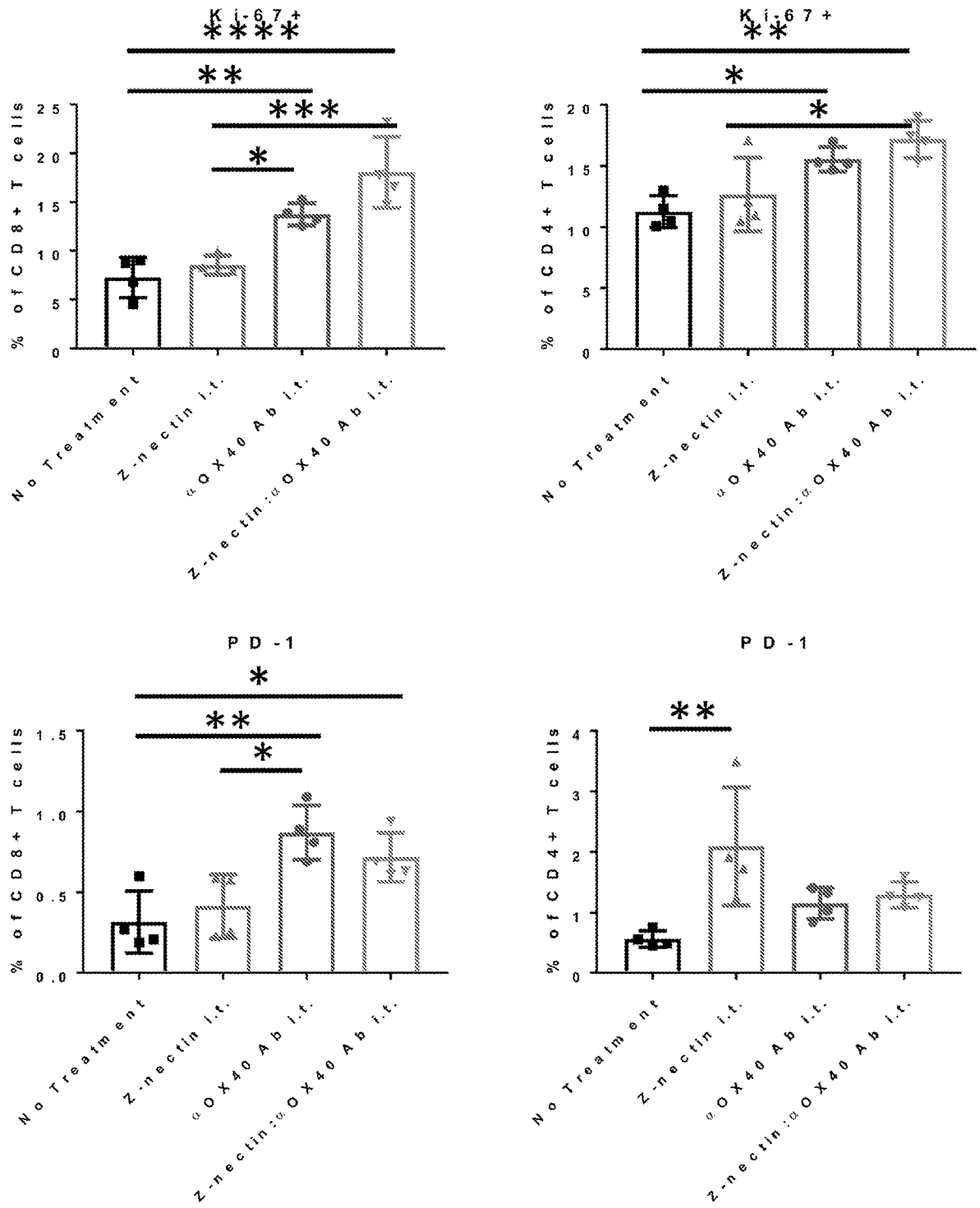
Figure 23B:
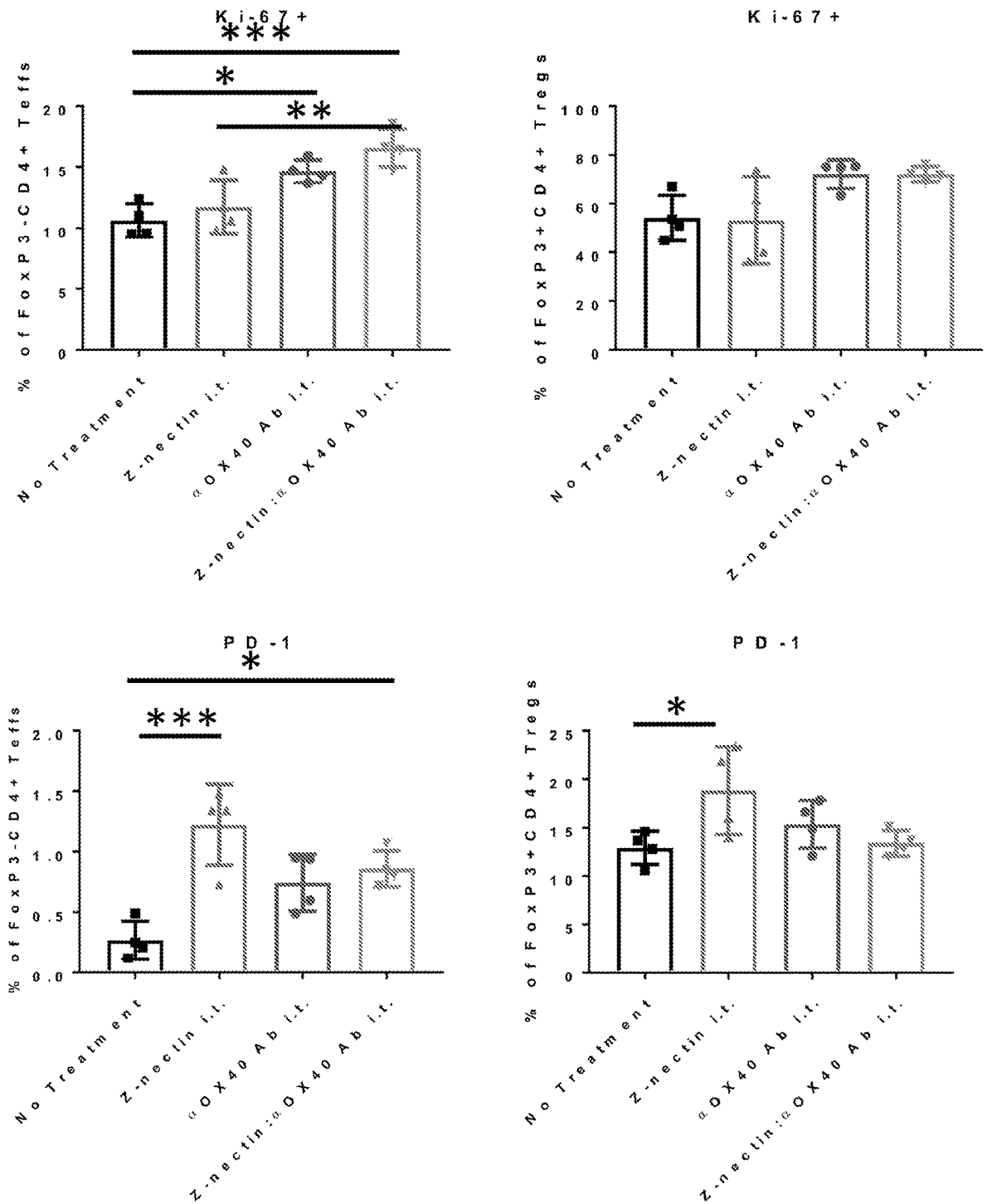

In the lymph nodes and spleens, Z-nectin:αOX40 Ab showed increased proliferation of CD8+ T cells and CD4+ T effector cells (FIGS. 23A-23D). Anti-OX40 Ab treatment alone or in combination with Z-nectin also increased the percent of PD-1+ T cells within the spleens (FIGS. 23C and 23D).

In view of the many possible embodiments to which the principles of the disclosure may be applied, it should be recognized that the illustrated embodiments are only examples and should not be taken as limiting the scope of the invention. Rather, the scope of the invention is defined by the following claims. We therefore claim as our invention all that comes within the scope and spirit of these claims.

We claim:

1. A fusion polypeptide, comprising:
   an amino acid sequence at least 90% identical to amino acids 12-435 of SEQ ID NO: 1;
   an amino acid sequence comprising the amino acid sequence of amino acids 12-345 of SEQ ID NO: 1;
   an amino acid sequence at least 90% identical to SEQ ID NO: 1; or
   an amino acid sequence comprising SEQ ID NO: 1.

2. A method of treating or inhibiting a tumor in a subject, inducing a memory T cell immune response to a tumor, or targeting one or more antibodies to a tumor cell, comprising administering to the subject one or more doses of the fusion polypeptide of claim 1 and one or more antibodies.

3. The method of claim 2, wherein the fusion polypeptide and the one or more antibodies are administered to the subject simultaneously.

4. The method of claim 2, wherein the subject has lung cancer, pancreatic cancer, breast cancer, head and neck squamous cell carcinoma, cervical cancer, melanoma, liver cancer, gastric cancer, brain cancer, prostate cancer or ovarian cancer or the tumor cell is a lung cancer cell, a pancreatic cancer cell, a breast cancer cell, a head and neck squamous cell carcinoma cell, a cervical cancer cell, a melanoma cell, a liver cancer cell, a gastric cancer cell, a brain cancer cell, a prostate cancer cell, or an ovarian cancer cell.

5. The method of claim 2, wherein the fusion polypeptide and one or more antibodies is administered locally to the tumor.

6. The method of claim 5, wherein the one or more antibodies are selected from anti-PD-1, anti-PD-L1, anti-CTLA-4, anti-LAG3 anti-GITR, anti-4-1BB, anti-CD40, anti-OX40, anti-TIGIT, anti-VISTA, anti-CD73, anti-CD39, anti-HVEM, anti-BTLA, and anti-CD27.

7. A protein complex comprising the fusion polypeptide of claim 1 and one or more antibodies.

8. The protein complex of claim 7, wherein the one or more antibodies is an immune checkpoint inhibitor antibody or an immunostimulatory antibody.

9. The protein complex of claim 8, wherein the immune checkpoint inhibitor antibody or immunostimulatory antibody is selected from anti-PD-1, anti-PD-L1, anti-CTLA-4, anti-LAG3, anti-GITR, anti-4-1BB, anti-CD40, anti-OX40, anti-TIGIT, anti-VISTA, anti-CD73, anti-CD39, anti-HVEM, anti-BTLA, and anti-CD27.

10. A method of treating or inhibiting a tumor in a subject, inducing a memory T cell immune response to a tumor, or targeting one or more antibodies to a tumor cell, comprising administering to a subject with a tumor one or more doses of the protein complex of claim 7.

11. The method of claim 10, wherein the subject has lung cancer, pancreatic cancer, breast cancer, head and neck squamous cell carcinoma, cervical cancer, melanoma, liver cancer, gastric cancer, brain cancer, prostate cancer, or ovarian cancer or the tumor cell is a lung cancer cell, a pancreatic cancer cell, a breast cancer cell, a head and neck squamous cell carcinoma cell, a cervical cancer cell, a melanoma cell, a liver cancer cell, a gastric cancer cell, a brain cancer cell, a prostate cancer cell, or an ovarian cancer cell.

12. A nucleic acid encoding a fusion polypeptide, the nucleic acid, comprising:
- a nucleic acid sequence at least 90% identical to nucleotides 34-1305 of SEQ ID NO: 2;
- the nucleic acid sequence of nucleotides 34-1305 of SEQ ID NO: 2;
- a nucleic acid sequence at least 90% identical to SEQ ID NO: 2; or
- the nucleic acid sequence of SEQ ID NO: 2.

13. A vector comprising the nucleic acid of claim 12.

14. A host cell comprising the vector of claim 13.

* * * * *